US008081870B2

(12) United States Patent
Ito et al.

(10) Patent No.: US 8,081,870 B2
(45) Date of Patent: Dec. 20, 2011

(54) RECEIVING APPARATUS AND METHOD

(75) Inventors: Masamichi Ito, Machida (JP); Koji Takahashi, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1514 days.

(21) Appl. No.: 11/466,515

(22) Filed: Aug. 23, 2006

(65) Prior Publication Data
US 2006/0282865 A1 Dec. 14, 2006

Related U.S. Application Data

(62) Division of application No. 09/451,870, filed on Dec. 1, 1999, now abandoned.

(30) Foreign Application Priority Data

Dec. 8, 1998 (JP) .................................... 10-366130
Dec. 8, 1998 (JP) .................................... 10-366131
Jan. 28, 1999 (JP) .................................... 11-020821

(51) Int. Cl.
G11B 27/00 (2006.01)

(52) U.S. Cl. ........................................................ 386/278

(58) Field of Classification Search ...................... 386/46
See application file for complete search history.

(56) References Cited

U.S. PATENT DOCUMENTS

| 5,317,391 A | 5/1994 | Banker et al. ................. 725/139 |
| 5,654,805 A | 8/1997 | Boon ............................. 358/426 |
| 5,673,401 A | 9/1997 | Volk et al. ..................... 395/327 |
| 5,699,472 A | 12/1997 | Ueda .............................. 386/46 |
| 5,754,242 A | 5/1998 | Ohkami ......................... 348/441 |
| 6,137,951 A | 10/2000 | Kawai et al. .................... 368/87 |
| 6,148,141 A | 11/2000 | Maeda et al. ................. 386/112 |
| 6,160,579 A | 12/2000 | Shiraiwa et al. ............ 348/224.1 |
| 6,166,780 A | 12/2000 | Bray ............................. 348/632 |
| 6,240,555 B1 * | 5/2001 | Shoff et al. ................... 725/110 |
| 6,243,139 B1 | 6/2001 | Takahashi et al. .......... 348/420.1 |

(Continued)

FOREIGN PATENT DOCUMENTS

EP 0 805 591 A2 11/1997

(Continued)

OTHER PUBLICATIONS

Toshio Miki, et al., "Standardization Trends in MPEG-4", The Journal of the Institute of Image Electronics Engineers of Japan (JP), vol. 27, No. 3, Jun. 25, 1998, pp. 205-210 (with translation).

(Continued)

*Primary Examiner* — William Vaughn, Jr.
*Assistant Examiner* — Daniel Tekle
(74) *Attorney, Agent, or Firm* — Fitzpatrick, Cella, Harper & Scinto

(57) ABSTRACT

Upon reproducing a TV program, it is a common practice to display video data sent from a broadcast station as it is, and the display pattern (layout) is not effectively changed (e.g., an object in video data is erased, or the object size is changed). A program ID from additional data contained in received TV information is detected, and when layout setting data corresponding to the detected program ID is stored in a memory, the corresponding layout setting data is read out from the memory to display program video data in the set layout. When a new layout is set, the user selects an object for which a layout is to be adjusted from objects that form image data in TV information, and adjusts movement, upscaling/downscaling, display ON/OFF of the selected object.

9 Claims, 46 Drawing Sheets

U.S. PATENT DOCUMENTS

| | | | |
|---|---|---|---|
| 6,256,071 B1 | 7/2001 | Hiroi | 348/553 |
| 6,273,535 B1 | 8/2001 | Inoue et al. | 347/3 |
| 6,285,408 B1 | 9/2001 | Choi et al. | 348/555 |
| 6,336,155 B1 | 1/2002 | Ito et al. | 710/37 |
| 6,337,928 B1 | 1/2002 | Takahashi et al. | 382/236 |
| 6,377,309 B1 | 4/2002 | Ito et al. | 348/554 |
| 6,446,261 B1 | 9/2002 | Rosser | 725/34 |
| 6,535,530 B1 | 3/2003 | Matsui | 370/536 |
| 6,567,427 B1 | 5/2003 | Suzuki et al. | 370/535 |
| 6,601,103 B1 | 7/2003 | Goldschmidt Iki et al. | 709/231 |
| 6,636,266 B2 | 10/2003 | Takahashi | 348/445 |
| 6,675,385 B1 | 1/2004 | Wang | 725/39 |
| 6,757,911 B1 | 6/2004 | Shimoji et al. | 725/136 |
| 2001/0000962 A1 | 5/2001 | Rajan | 715/500.1 |
| 2001/0052856 A1 | 12/2001 | Deniau et al. | 340/825.22 |
| 2003/0133502 A1* | 7/2003 | Yagasaki et al. | 375/240.13 |
| 2003/0164898 A1 | 9/2003 | Imai | 348/465 |
| 2004/0088739 A1 | 5/2004 | Shimoji et al. | 725/135 |

FOREIGN PATENT DOCUMENTS

| | | |
|---|---|---|
| EP | 0 823 815 A2 | 2/1998 |
| EP | 0 827 336 A2 | 3/1998 |
| EP | 0 843 482 A2 | 5/1998 |
| EP | 0 851 681 A1 | 7/1998 |
| EP | 0 858 220 A1 | 8/1998 |
| EP | 0 863 669 A1 | 9/1998 |
| GB | 2 298 554 A | 9/1996 |
| JP | 5-219455 | 8/1993 |
| JP | 6-98290 | 4/1994 |
| JP | 6-133238 | 5/1994 |
| JP | 6-225219 | 8/1994 |
| JP | 7-203433 | 8/1995 |
| JP | 7-298148 | 11/1995 |
| JP | 8-149466 | 6/1996 |
| JP | 8-234712 | 9/1996 |
| JP | 8-241068 | 9/1996 |
| JP | 8-256322 | 10/1996 |
| JP | 8-292781 | 11/1996 |
| JP | 10-23348 | 1/1998 |
| JP | 10-143636 | 5/1998 |
| JP | 10-164521 | 6/1998 |
| JP | 10-208327 | 8/1998 |
| JP | 10-313449 | 11/1998 |
| JP | 10-327114 | 12/1998 |
| JP | 11-98193 | 4/1999 |

OTHER PUBLICATIONS

Sukeichi Miki, All About MPEG-4, MPEG-4 Systems, Kogyo Chosakai Publishing Co., Ltd. (JP), 1$^{st}$ Ed., Sep. 30, 1998, pp. 153-177, 243, 246-248 (with translation).

Apr. 4, 2008 Japanese Official Action in Japanese Patent Appln. No. 10-366130 (with translation).

Mike Danielsen, "MPEG-4 for DTV", IS&T/SPIE Conference on Media Processors 1999, San Jose, California, SPIE vol. 3655, Jan. 1999, pp. 87-93.

Nov. 9, 2007 Japanese Official Action in Japanese Patent Appln. No. 11-020821 (with partial translation).

Avaro, O., et al., "The MPEG-4 systems and description languages: A way ahead in audio visual information representation", Signal Processing: Image Communication, vol. 9, No. 4, May 1997, pp. 385-431, Elsevier Science Publishers, Amsterdam, NL.

Nov. 8, 2005 Search Report in European Patent Appln. No. 99 30 9804.

Sep. 16, 2005 Search Report in European Patent Appln. No. 00 30 9804.

Alexander Erk, CustomTV Service and System Requirements, ACTS Project AC360, CustomTV vol. AC360, pp. 1-42 (Dec. 8, 1998).

Mar. 1, 2005 Japanese Office Action in Japanese Patent Application No. 11-007035 (with partial translation).

* cited by examiner

FRAME UNIT ENCODING (VLVB CORE)

a, b, c, x : QUANTIZATION COEFFICIENT OF DC COMPONENT
A, B, C, X : QUANTIZATION COEFFICIENT OF AC COMPONENT

| PERSPECTIVE TRANSFORMATION | $x'=(ax+by+c)/(gx+hy+1)$ <br> $y'=(dx+ey+f)/(gx+hy+1)$ |
|---|---|
| AFFINE TRANSFORMATION | $x'=ax+by+c$ <br> $y'=dx+cy+f$ |
| EQUIDIRECTIONAL UPSCALING(a)/ROTATION($\theta$)/ MOVEMENT(c,f) | $x'=a\cos\theta\, x+a\sin\theta\, y+c$ <br> $y'=-a\sin\theta\, x+a\cos\theta\, y+f$ |
| TRANSLATION | $x'=x+c$ <br> $y'=y+f$ |

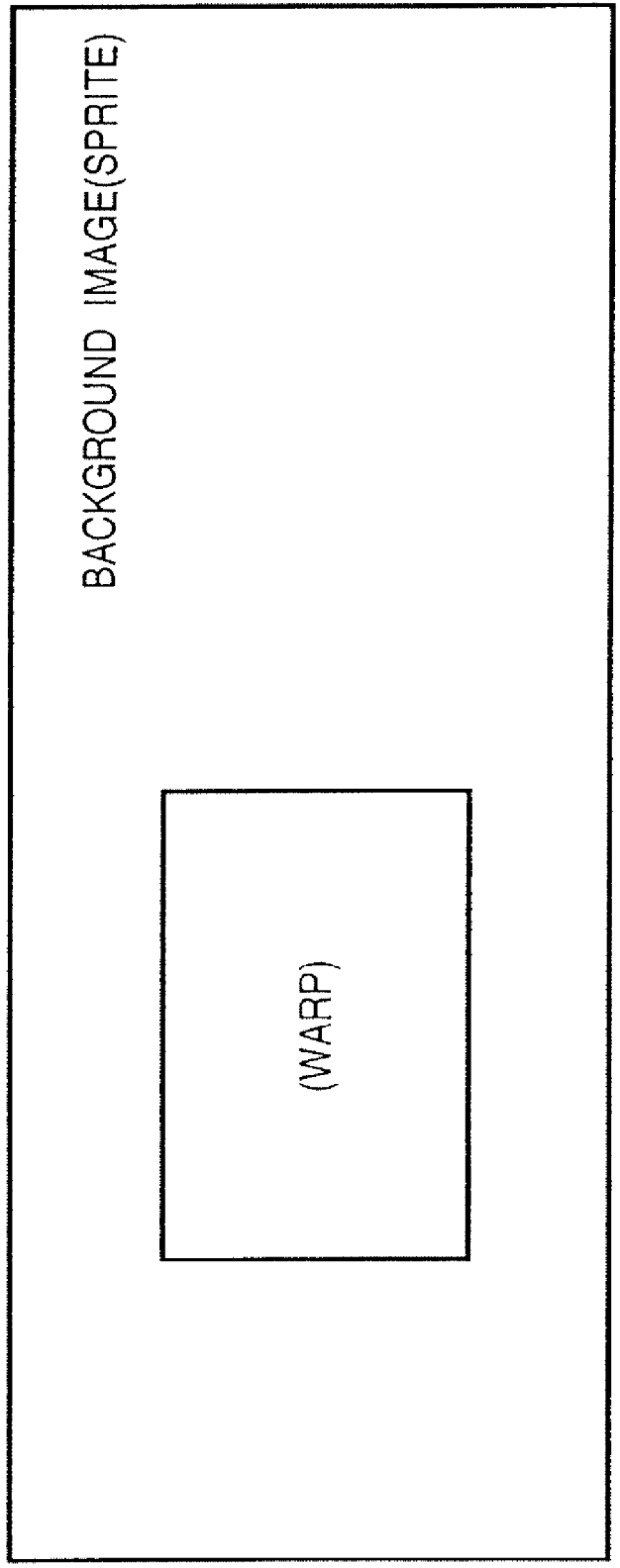

FIG. 13

| CODING SCHEME | | BIT RATE k bit/s |
|---|---|---|
| PARAMETRIC CODING | IL | 6 - 16 |
| | HVXC | 2 - 6 |
| CELP CODING | WB-CELP | 14 - 24 |
| | NB-CELP | 4 - 12 |
| TIME/FREQUENCY CONVERSION CODING(T/F CONVERSION) | AAC COMPATIBLE | 24 - 64 |
| | TwinVQ | 6 - 40 |
| SNHC | SA CODING (MUSIC TONE SYNTHESIS) | — |
| | TTS CODING (MUSIC TONE SYNTHESIS) | — |

CELP: Code Excited Linear Prediction
SNHC: Synthetic Natural Hybrid Coding

VS : Video Session
VO : Video Object
VOL : Video Object Layer
GOV : Group Of Video Object Plane
VOP : Video Object Plane

FIG. 17
DECODING UNDECODABLE → DISCARD
(ERROR)
IRREVERSIBLE DECODING BY NORMAL VLC
DECODING UNDECODABLE → DISCARD
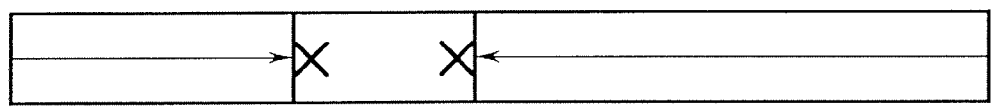
(ERROR) (ERROR) REVERSE DECODING

FIG. 24

| OBJECT 1 | OBJECT 2 | OBJECT 3 | OBJECT 4 | OBJECT 5 | SCENE DESCRIPTION | ADDITIONAL DATA |

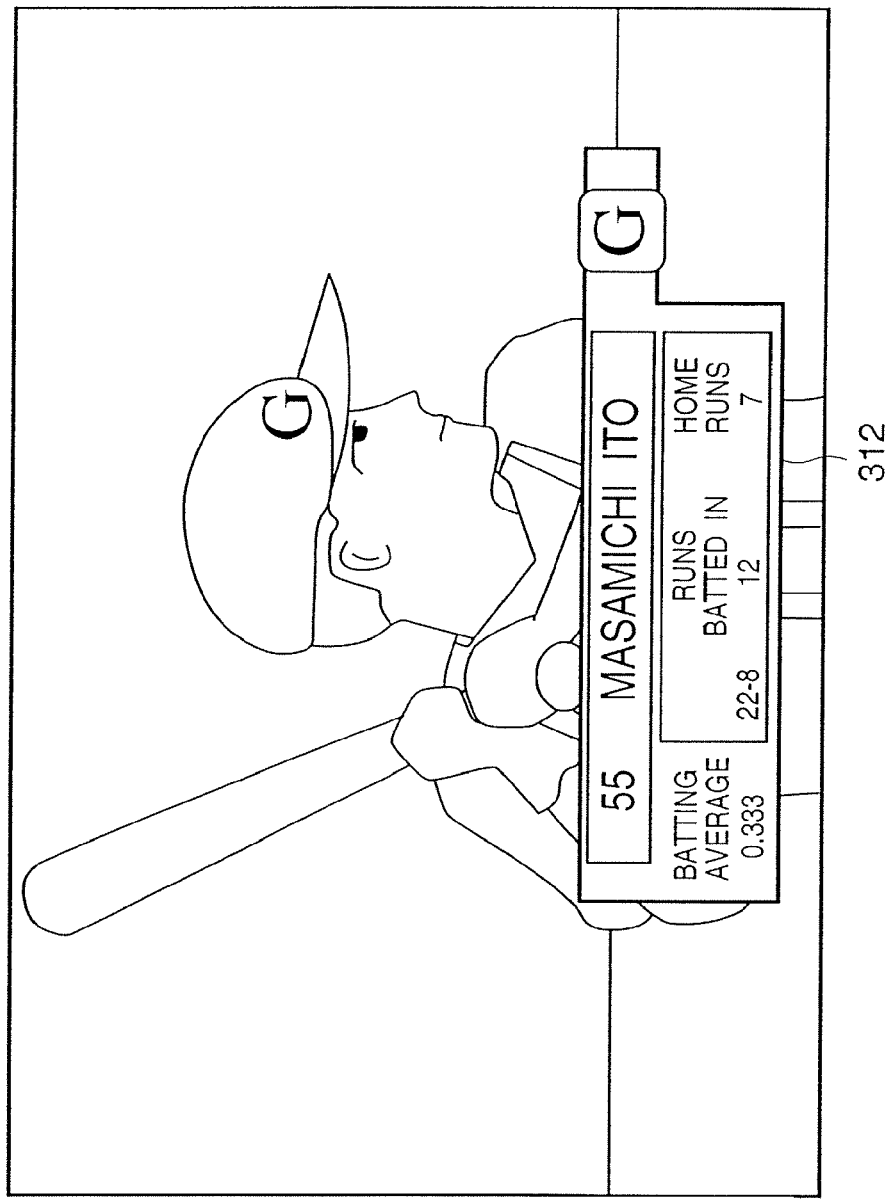
F I G. 34

FIG. 44

| MODE | | TIME BAND | OBJECT INFORMATION | | CONTROL DATA | BROADCAST STATION DATA |
|---|---|---|---|---|---|---|
| DEFAULT SETTING MODE | GOOD MORNING | 7:00 — 9:00 | OBJECT INFORMATION | DEFAULT POSITION DATA | CONTROL DATA | BROADCAST STATION DATA |
| | GOOD NIGHT | 22:00 — 24:00 | OBJECT INFORMATION | DEFAULT POSITION DATA | CONTROL DATA | BROADCAST STATION DATA |
| | GO OUT | 6:30 — 8:00 MONDAY, TUESDAY, WEDNESDAY, THURSDAY, FRIDAY | OBJECT INFORMATION | DEFAULT POSITION DATA | CONTROL DATA | BROADCAST STATION DATA |
| | HOLIDAY | 6:30 — 8:00 SATURDAY, MONDAY | OBJECT INFORMATION | DEFAULT POSITION DATA | CONTROL DATA | BROADCAST STATION DATA |
| USER SETTING MODE | USER 1 | 19:00 — 21:00 MONDAY | OBJECT INFORMATION | SET POSITION DATA | CONTROL DATA | BROADCAST STATION DATA |
| | USER 2 | 21:00 — 22:00 WEDNESDAY | OBJECT INFORMATION | SET POSITION DATA | CONTROL DATA | BROADCAST STATION DATA |
| | USER 3 | 12:00 — 13:00 MONDAY, WEDNESDAY, FRIDAY | OBJECT INFORMATION | SET POSITION DATA | CONTROL DATA | BROADCAST STATION DATA |
| | USER 4 | 7:30 — 8:30 | OBJECT INFORMATION | SET POSITION DATA | CONTROL DATA | BROADCAST STATION DATA |

RECEIVING APPARATUS AND METHOD

This application is a division of U.S. patent application Ser. No. 09/451,870 filed Dec. 1, 1999 now abandoned.

BACKGROUND OF THE INVENTION

1. Field of the Invention

The present invention relates to a receiving apparatus and method and, more particularly, to a receiving apparatus which can receive a digital television broadcast signal and can reproduce image and sound data, and its method.

2. Description of Related Art

In recent years, digital television broadcast using a satellite broadcast or cable broadcast system has been started. Upon implementation of digital broadcast, many effects such as improvement of qualities of image and sound data including audio data, increases in the number of kinds and volume of programs exploiting various compression techniques, provision of new services such as an interactive service and the like, advance of the receiving pattern, and the like, are expected.

FIG. 1 is a block diagram showing the arrangement of a digital broadcast receiver 10 using satellite broadcast.

A television (TV) broadcast wave transmitted from a broadcast satellite is received by an antenna 1. The received TV broadcast wave is tuned by a tuner 2 to demodulate TV information. After that, an error correction process, and a charging process, descramble process, and the like if necessary are done, although not shown. Various data multiplexed as the TV information are demultiplexed by a multiplexed signal demultiplexer 3. The TV information is demultiplexed into image information, sound information, and other additional data. The demultiplexed data are decoded by a decoder 4. Of the decoded data, image information and sound information are converted into analog data by a D/A converter 5, and these data are reproduced by a television receiver (TV) 6. On the other hand, the additional data has a role of program sub-data, and is associated with various functions.

Furthermore, a VTR 7 is used to record/reproduce the received TV information. The receiver 10 and VTR 7 are connected via a digital interface such as IEEE1394 or the like. The VTR 7 has a recording format such as a digital recording system, and records TV information as bitstream data based on, e.g., D-VHS. Note that TV information of digital TV broadcast can be recorded not only by bitstream recording based on D-VHS, but also by the digital Video (DV) format as another home-use digital recording scheme, or digital recording apparatuses using various disk media. In such case, format conversion may often be required.

When a TV program in ground wave broadcast or digital TV broadcast is reproduced by a home television, it is a common practice to directly display a video sent from a broadcast station. In other words, it is not a common practice to erase an object in a video or to change the object size so as to effectively change the display pattern (layout). Such a function of effectively changing the display layout is mandatory since a new function of an effective display method must be added as the numbers of channels and programs increase upon development of digital TV broadcast.

For example, the user wants to set a layout in the following situation. That is, live programs of baseball games have different display layouts depending on broadcast stations although they belong to an identical category. For this reason, in order to display an object such as a score indication or the like in a common layout independently of broadcast stations, it is desirable to be able to set a layout the user wants.

Furthermore, the user also wants to set a layout in the following situation. For example, the user may want to display necessary information in an enlarged scale or to quit display of unnecessary information in accordance with the days of week or time band. However, neither of such layout setups are possible in the status quo.

SUMMARY OF THE INVENTION

The present invention has been made to solve the aforementioned problems, and has as its object to provide a novel reproducing function of image information and/or sound information in digital TV broadcast.

In order to achieve the above object, a preferred embodiment of the present invention discloses a receiving apparatus capable of reproducing image data and/or sound data, comprising: reception means for receiving information consisting of image data, sound data, and additional system data; reproducing means for reproducing received image and sound data on the basis of the system data; and setting means for setting reproduction patterns in units of objects when the received image data has a data format segmented in units of objects.

Also, a preferred embodiment of the present invention discloses a computer program product comprising a computer readable medium having a computer program code, for a method of receiving information, and reproducing image data and/or sound data, the product comprising: a receiving process procedure code for receiving information consisting of image data, sound data, and additional system data; a reproducing process procedure code for reproducing received image and sound data on the basis of the system data; and a setting process procedure code for setting reproduction patterns in units of objects when the received image data has a data format segmented in units of objects.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 11 is a view for explaining warp;

FIG. 13 is a table showing different types of MPEG 4 audio coding schemes;

FIG. 17 is a view for explaining reversible decoding;

FIG. 24 shows the format of a general MPEG 4 bitstream;

FIGS. 31 to 34 shows video display layout examples according to the third embodiment;

FIG. 44 shows the concept of the structure of layout setting data;

DESCRIPTION OF THE PREFERRED EMBODIMENTS

Figure 1:
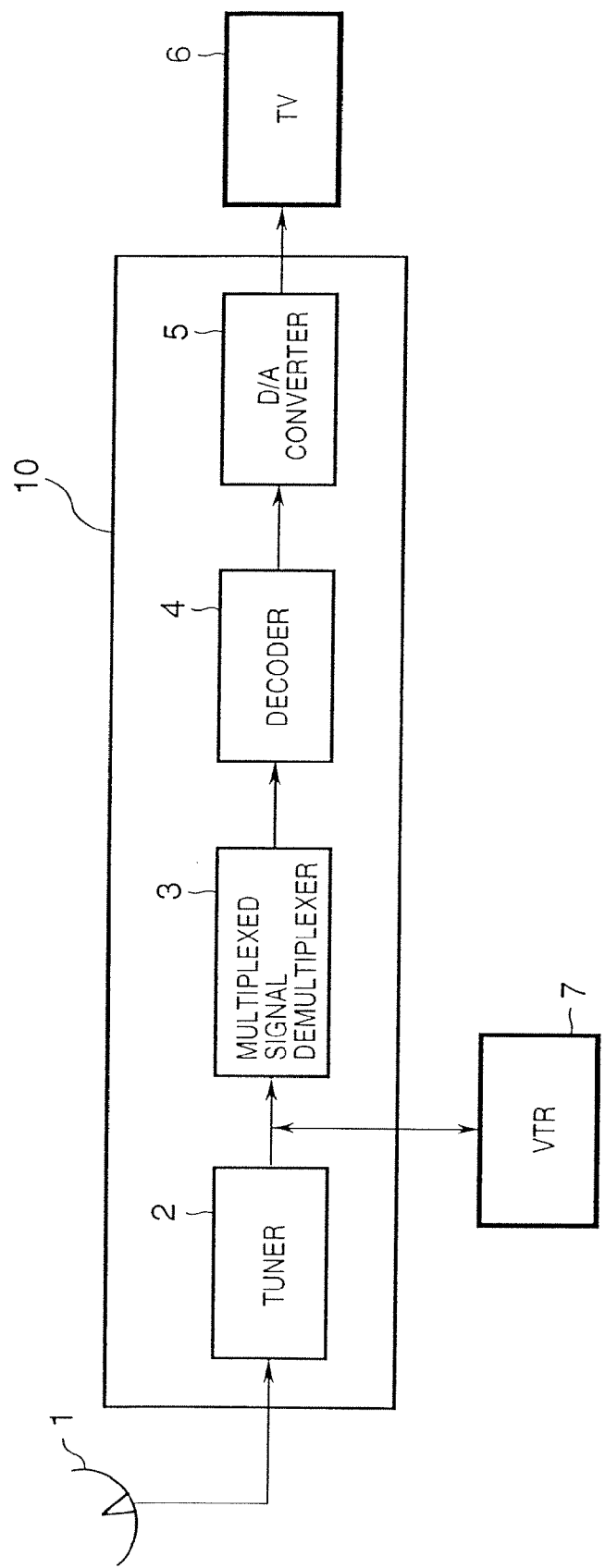
FIG. 1 is a block diagram showing the arrangement of a digital broadcast receiver using satellite broadcast.

The preferred embodiments of a receiving apparatus and method according to the present invention will now be described in detail with reference to the accompanying drawings.

Outline

This embodiment allows movement and deformation of an image in units of objects by exploiting the concept of objects as characteristic features of Motion Picture Experts Group layer 4(MPEG 4) coding. Objects include a background image, talking person, voice associated with this person, and the like, and MPEG 4 coding encodes/decodes individual objects and combines these objects to express one scene.

A display function of this embodiment can manipulate images to be displayed in units of objects in association with display of real-time image information in a broadcast system using MPEG 4. Furthermore, the display function of this embodiment can upscale/downscale the individual objects from a predetermined size, and can move them from a predetermined position. TV broadcast includes a program as TV information, and unique ID information specified for each program, and a reproduction (display) layout which is arbitrarily set can be set and updated in correspondence with each ID information.

According to this embodiment, the viewer of digital TV broadcast can set an arbitrary layout, i.e., can set the individual objects at desired positions to have desired sizes, thus improving the visual effect for the user and the quality of the user interface.

The arrangement of a receiving apparatus that receives digital TV broadcast using MPEG 4 coding will be exemplified below as a receiving apparatus according to an embodiment of the present invention. Techniques that pertain to MPEG 4 will be explained in detail below in units of fields.

Outline of MPEG 4

[Overall Configuration of Standards]

The MPEG 4 standards consist of four major items. Three out of these items are similar to those of Motion Picture Experts Group layer 2 (MPEG 2), i.e., visual part, audio part, and system part.

Visual Part

This part specifies object coding that processes a photo image, synthetic image, moving image, still image, and the like as standards. Also, this part includes a coding scheme, sync reproducing function, and hierarchical coding, which are suitable for correction or recovery of transmission path errors. Note that "video" means a photo image, and "visual" includes a synthetic image.

Audio Part

This part specifies object coding for natural sound, synthetic sound, effect sound, and the like as standards. The video and audio parts specify a plurality of coding schemes, and coding efficiency is improved by appropriately selecting a compression scheme suitable for the feature of each object.

System Part

This part specifies multiplexing of encoded video and sound objects, and their demultiplexing. Furthermore, this part includes control and re-adjustment functions of buffer memories and time bases. Video and sound objects encoded in the visual and audio parts are combined into a multiplexed stream of the system part together with scene configuration information that describes the positions, appearance and disappearance times of objects in a scene. As a decoding process, the individual objects are demultiplexed/decoded from a received bitstream, and a scene is reconstructed on the basis of the scene configuration information.

[Object Coding]

In MPEG 2, coding is done in units of frames or fields. However, in order to re-use or edit contents, MPEG 4 processes video and audio data as objects. The objects include.

sound photo image (background image: two-dimensional still image)

photo image (principal object image: without background)

synthetic image character image

Figure 2:
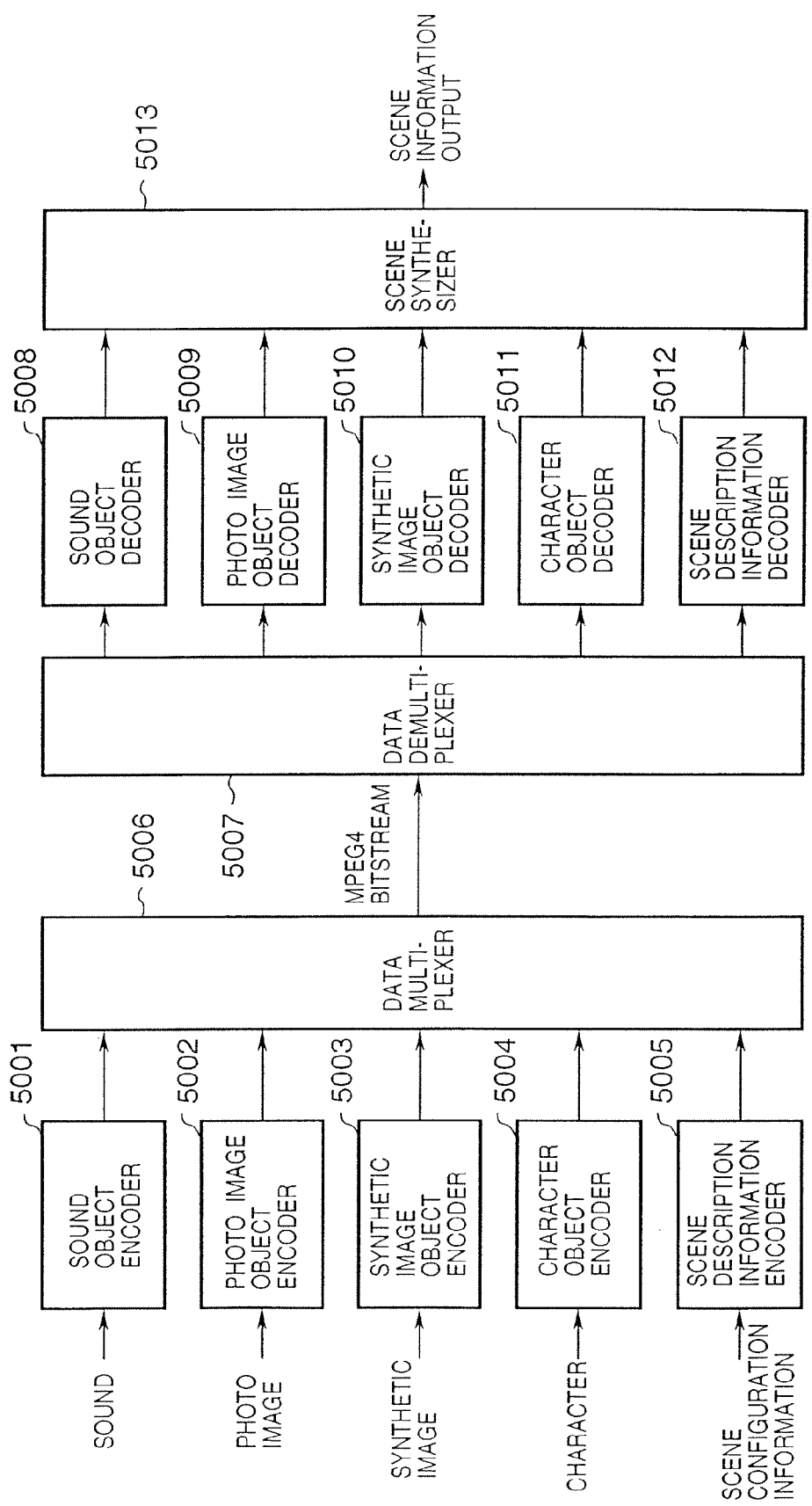
FIG. 2 is a block diagram showing the arrangement that simultaneously receives and encodes a plurality of kinds of objects.

FIG. 2 shows the system arrangement upon simultaneously receiving and encoding these objects. A sound object encoder 5001, photo image object encoder 5002, synthetic image object encoder 5003, and character object encoder 5004 respectively encode objects. Simultaneously with such encoding, scene configuration information that describes relations of the individual objects in a scene is encoded by a scene description information encoder 5005. The encoded object information and scene description information undergo an encode process to an MPEG 4 bitstream by a data multiplexer 5006.

In this manner, the encode side defines a plurality of combinations of visual and audio objects to express a single scene (frame). As for visual objects, a scene that combines a photo image and a synthetic image such as computer graphics or the like can be synthesized. With the aforementioned configuration, using, e.g., a text-to-speech synthesis function, an object image and its audio data can be synchronously reproduced. Note that the bitstream is transmitted/received or recorded/reproduced.

A decode process is a process opposite to the aforementioned encode process. A data demultiplexer 5007 demultiplexes the MPEG 4 bitstream into objects, and distributes the objects. The demultiplexed sound, photo image, synthetic image, character objects, and the like are decoded into object data by corresponding decoders 5008 to 5011. Also, the scene description information is simultaneously decoded by a decoder 5012. A scene synthesizer 5013 synthesizes an original scene using the decoded information.

On the decode side, the positions of visual objects contained in a scene, the order of audio objects, and the like can be partially changed. The object position can be changed by, e.g., dragging a mouse, and the language can be changed when the user changes an audio object.

In order to synthesize a scene by freely combining a plurality of objects, the following four items are specified:

Object Coding

Visual objects, audio objects, and AV (audiovisual) objects as their combination are to be encoded.

Scene Synthesis

In order to specify scene configuration information and a synthesis scheme that synthesize a desired scene by combining visual, audio and AV objects, a language obtained by modifying Virtual Reality Modeling Language (VRML) is used.

Multiplexing and Synchronization

The format and the like of a stream (elementary stream) that multiplexes and synthesizes the individual objects and the like are specified. The QOS (Quality of Service) upon delivering this stream onto a network or storing it in a recording apparatus can also be set. QOS parameters include transmission path conditions such as a maximum bit rate, bit error rate, transmission scheme, and the like, decoding capability, and the like.

User Operation (Interaction)

A scheme for synthesizing visual and audio objects on the user terminal side is defined. The MPEG 4 user terminal demultiplexes data sent from a network or a recording apparatus into elementary streams, and decodes them in units of objects. Also, the terminal reconstructs a scene from a plurality of encoded data on the basis of scene configuration information sent at the same time.

Figure 3:
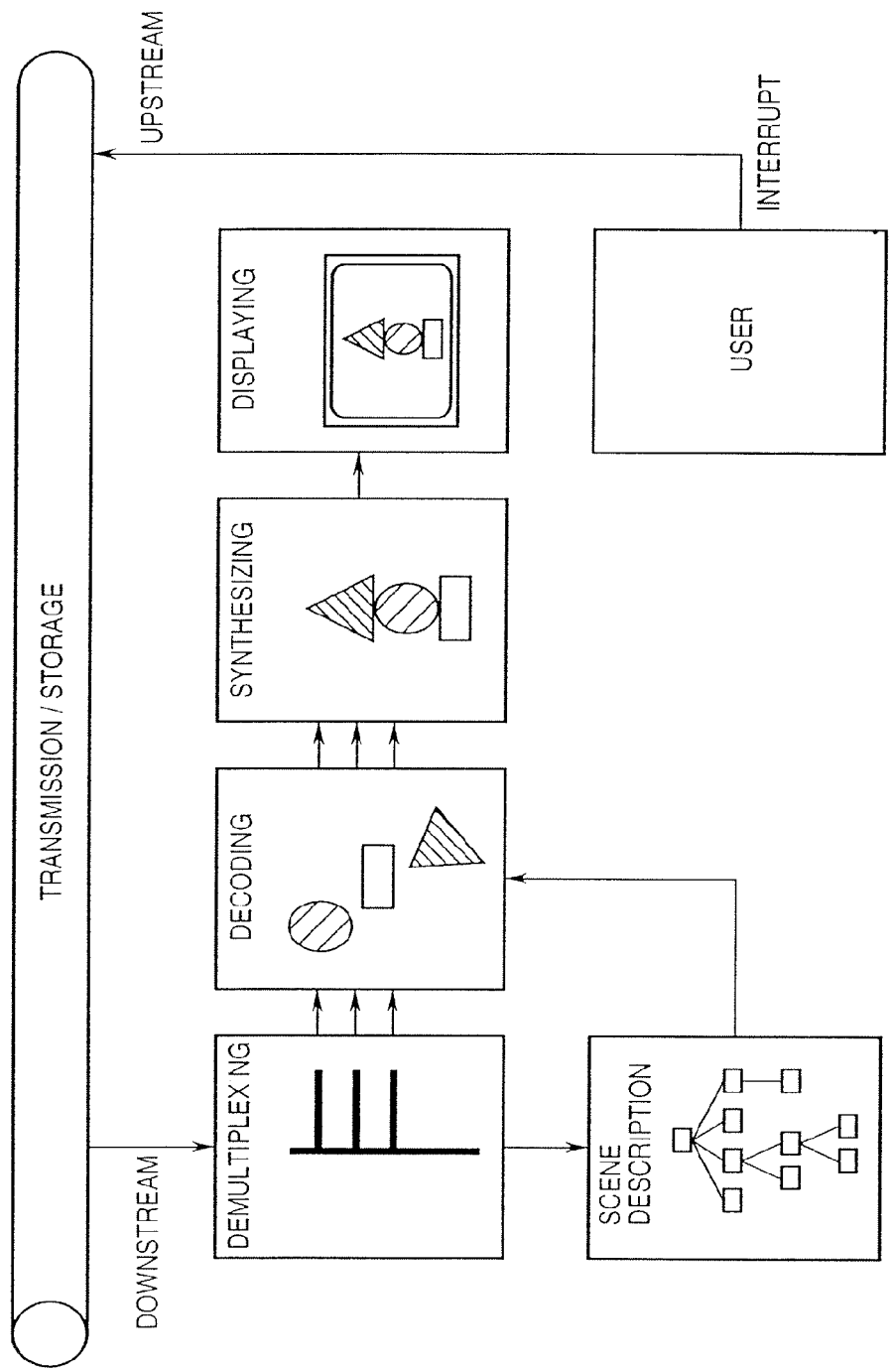
FIG. 3 is a view showing the arrangement of a system that takes user operation (edit) into consideration.
Figure 4:
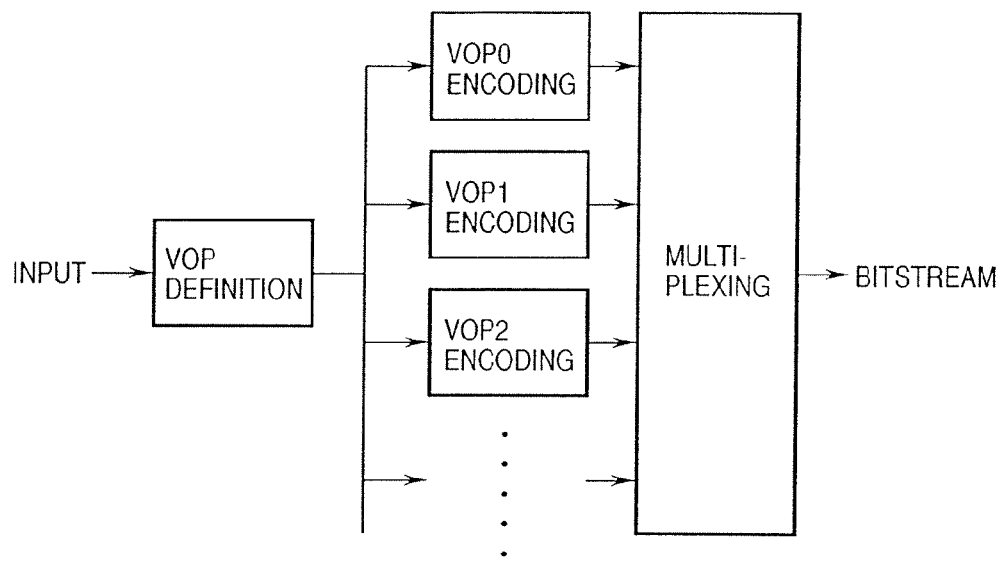
FIG. 4 is a block diagram of a VOP processor that pertains to a video object on the encoder side.
Figure 5:
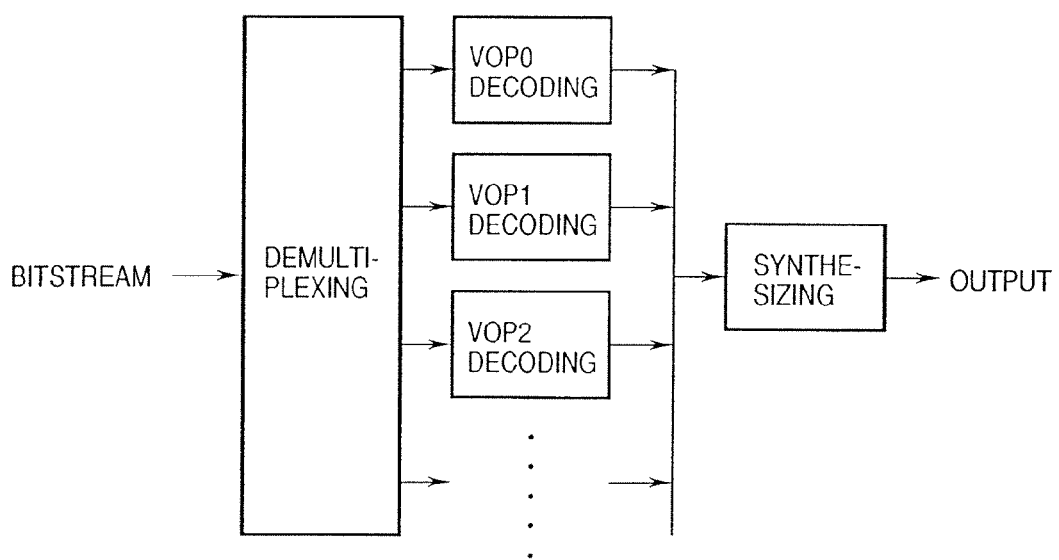
FIG. 5 is a block diagram of a VOP processor that pertains to a video object on the decoder side.

FIG. 3 shows the arrangement of a system that takes user operation (edit) into consideration. FIG. 4 is a block diagram of a VOP processor that pertains to a video object on the encoder side, and FIG. 5 is a block diagram on the decoder side.

Figure 6:
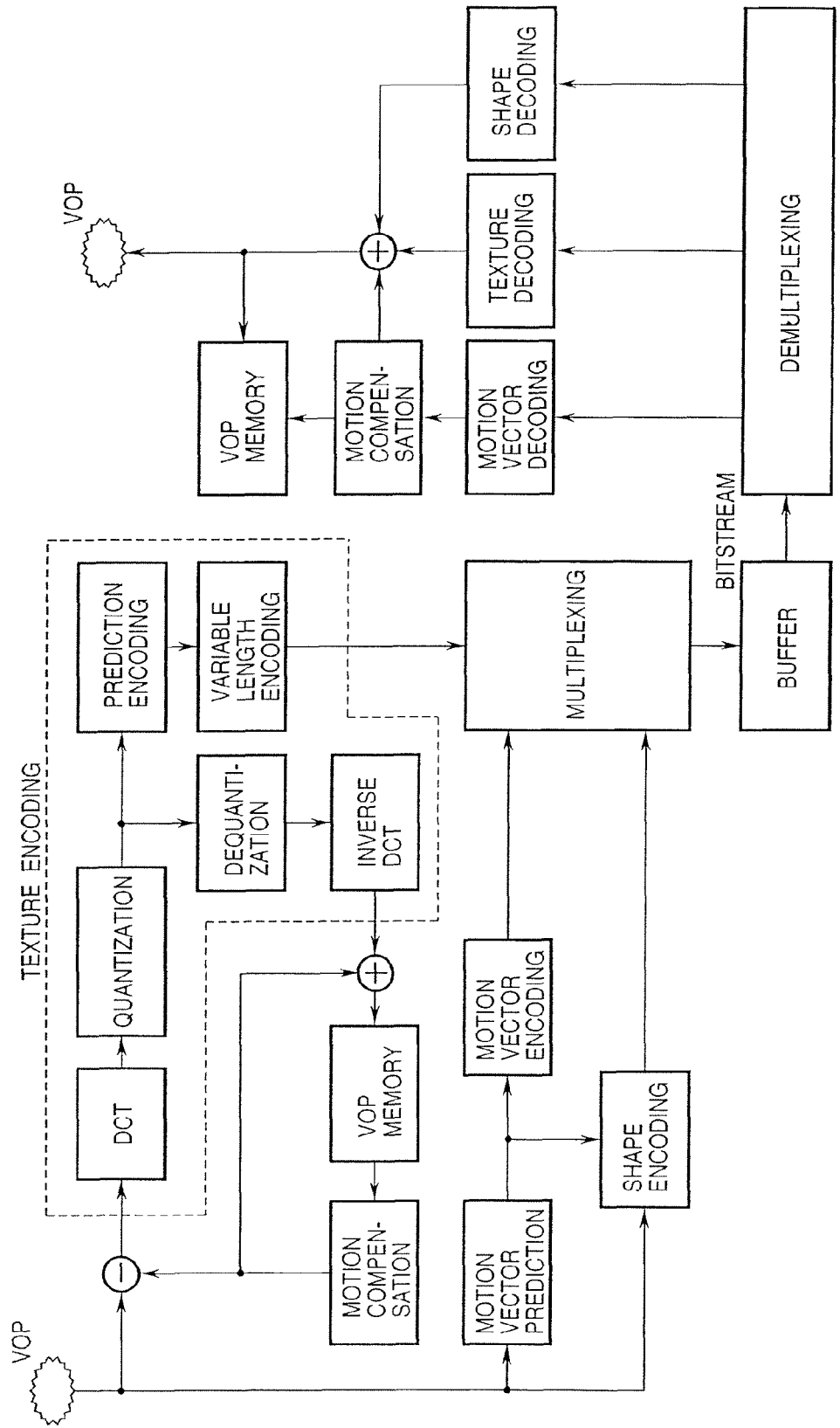
FIG. 6 is a block diagram showing the overall arrangement for encoding and decoding a VOP.

Upon encoding a video in MPEG 4, a video object to be encoded is separated into its shape and texture. This unit video data is called a video object plane (VOP). FIG. 6 is a block diagram showing the overall arrangement for encoding and decoding a VOP.

Figure 7A:
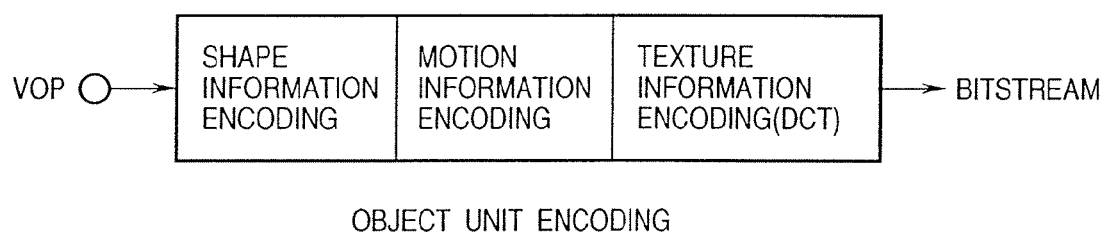
FIGS. 7A and 7B show information forming a VOP.

For example, when an image is composed of two objects, i.e., a person and background, each frame is segmented into two VOPs which are encoded. Each VOP is formed by shape information, motion information, and texture information of an object, as shown in FIG. 7A. On the other hand, a decoder demultiplexes a bitstream into VOPs, decodes the individual VOPs, and synthesizes them to form a scene.

Figure 7B:
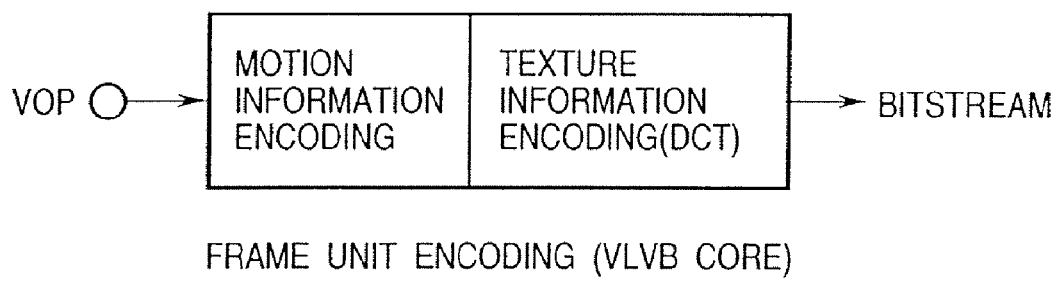

In this manner, since the VOP structure is adopted, when a scene to be processed is composed of a plurality of video objects, they can be segmented into a plurality of VOPs, and those VOPs can be individually encoded/decoded. When the number of VOPs is 1, and an object shape is a rectangle, conventional frame unit coding is done, as shown in FIG. 7B.

VOPs include those coded by three different types of predictive coding, i.e., an intra coded VOP (I-VOP), a forward predicted VOP (P-VOP), and a bi-directionally predicted (B-VOP). The prediction unit is a 16×16 pixel macroblock (MB).

Bi-directional predictive coding (B-VOP) is a scheme for predicting a VOP from both past and future VOPs like in B-picture of MPEG1 and MPEG 2. Four different modes, i.e., direct coding, forward coding, backward coding, and bi-directional coding can be selected in units of macroblocks. This mode can be switched in units of MBs or blocks. Bi-directional prediction is implemented by scaling the motion vectors of P-VOPs.

[Shape Coding]

In order to handle an image in units of objects, the shape of the object must be known upon encoding and decoding. In order to express an object such as glass through which an object located behind it is seen, information that represents transparency of an object is required. A combination of the shape information and transparency information of the object will be referred to as shape information hereinafter. Coding of the shape information will be referred to as shape coding hereinafter.

[Size Conversion Process]

Binary shape coding is a scheme for coding a boundary pixel by checking if each pixel is located outside or inside an object. Hence, as the number of pixels to be encoded is smaller, the generated code amount can be smaller. However, reducing the macroblock size to be encoded means deteriorated original shape code at the receiving side. Hence, the degree of deterioration of original information is measured by size conversion, and as long as the size conversion error stays equal to or smaller than a predetermined threshold value, the smallest possible macroblock size is selected. As examples of the size conversion ratio, an original size, ½ (vertical and horizontal), and ¼ (vertical and horizontal) are available.

Shape information of each VOP is described by an 8-bit α value, which is defined as follows.

α=0: outside the VOP of interest

α=1 to 254: display in semi-transparent state together with another VOP=

α=255: display range of only the VOP of interest

Binary shape coding is done when the α value assumes 0 or 255, and a shape is expressed by only the interior and exterior of the VOP of interest.

Multi-valued shape coding is done when the α value can assume all values from 0 to 255, and a state wherein a plurality of VOPs are superposed on each other in a semi-transparent state can be expressed.

As in texture coding, motion-compensated prediction with unit pixel precision is done in units of 16×16 pixel blocks. Upon intra coding the entire object, shape information is not predicted. As a motion vector, the difference of a motion vector predicted from a neighboring block is used. The obtained difference value of the motion vector is encoded and multiplexed on a bitstream. In MPEG 4, motion-compensated predicted shape information in units of blocks undergoes binary shape coding.

Feathering

In addition, even in case of a binary shape, when a boundary is to be smoothly changed from opaque to transparent, feathering (smoothing of a boundary shape) is used. As feathering, a linear feathering mode for linearly interpolating a boundary value, and a feathering filter mode using a filter are available. For a multi-valued shape with constant opacity, a constant alpha mode is available, and can be combined with feathering.

[Texture Coding]

Texture coding encodes the luminance and color difference components of an object, and processes in the order of DCT (Discrete Cosine Transform), quantization, predictive coding, and variable-length coding in units of fields/frames.

The DCT uses an 8×8 pixel block as a processing unit. When an object boundary is located within a block, pixels outside the object are padded by the average value of the object. After that, a 4-tap two-dimensional filter process is executed to prevent any large pseudo peaks from being generated in DCT coefficients.

Quantization uses either an ITU-T recommendation H.263 quantizer or MPEG 2 quantizer. When the MPEG 2 quantizer is used, nonlinear quantization of DC components and frequency weighting of AC components can be implemented.

Intra-coding coefficients after quantization undergo predictive coding between neighboring blocks before variable-length coding to remove redundancy components. Especially, in MPEG 4, both DC and AC components undergo predictive coding.

Figure 8:
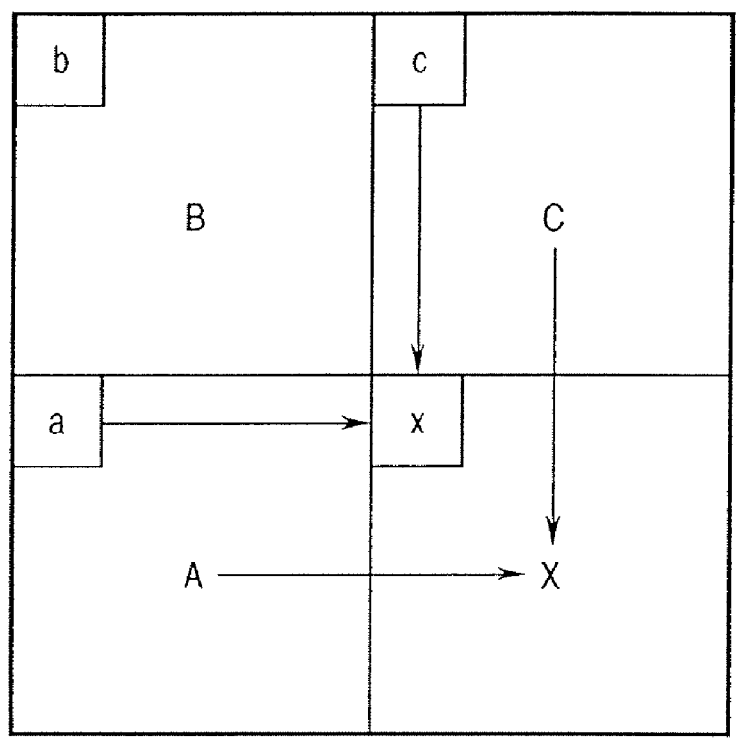
FIG. 8 is a view for explaining AC/DC predictive coding in texture coding.

AC/DC predictive coding in texture coding checks the difference (gradient) between corresponding quantization coefficients between the block of interest and its neighboring block, and uses a smaller quantization coefficient in prediction, as shown in FIG. 8. For example, upon predicting DC coefficient x of the block of interest, if corresponding DC coefficients of the neighboring block are a, b, and c, the DC coefficient to be used in prediction is determined as per:

if $|a-b|<|b-c|$, DC coefficient c is used in prediction; or if $|a-b|\geq|b-c|$, DC coefficient a is used in prediction.

Upon predicting AC coefficient x of the block of interest as well, a coefficient to be used in prediction is selected in the same manner as described above, and is normalized by a quantization scale value QP of each block.

Predictive coding of DC components checks the difference (vertical gradient) between DC components of the block of interest and its vertically neighboring block and the difference (horizontal gradient) between DC components of the block of interest and its horizontally neighboring block among neighboring blocks, and encodes the difference from the DC component of the block in a direction with a smaller gradient as a prediction error.

Predictive coding of AC components uses corresponding coefficients of neighboring blocks in correspondence with predictive coding of DC components. However, since quantization parameter values may be different among blocks, the difference is calculated after normalization (quantization step scaling). The presence/absence of prediction can be selected in units of macroblocks.

After that, AC components are zigzag-scanned, and undergo three-dimensional (Last, Run, and Level) variable-length coding. Note that Last is a 1-bit value indicating the end of coefficients other than zero, Run is a zero run length, and Level is a non-zero coefficient value.

Variable-length coding of DC components encoded by intra coding uses either a DC component variable-length coding table or AC component variable-length coding table.

[Motion Compensation]

In MPEG 4, a video object plane (VOP) having an arbitrary shape can be encoded. VOPs include those coded by three different types of predictive coding, i.e., an intra coded VOP (I-VOP), a forward predicted VOP (P-VOP), and a bi-directionally predicted (B-VOP), as described above, and the prediction unit uses a macroblock of 16 lines×16 pixels or 8 lines×8 pixels. Hence, some macroblocks extend across the boundaries of VOPs. In order to improve the prediction efficiency at the VOP boundary, macroblocks on a boundary undergo padding and polygon matching (matching of only an object portion).

[Wavelet Coding]

The wavelet transform is a transformation scheme that uses a plurality of functions obtained by upscaling, downscaling, and translating a single isolated wave function as transformation bases. A still image coding mode (Texture Coding Mode) using this wavelet transform is suitable as a high image quality coding scheme having various spatial resolutions ranging from high resolutions to low resolutions, when an image obtained by synthesizing a computer graphics (CG) image and natural image is to be processed. Since wavelet coding can simultaneously encode an image without segmenting it into blocks, block distortion can be prevented from being generated even at a low bit rate, and mosquito noise can be reduced. In this manner, the MPEG 4 still image coding mode can adjust the trade off among broad scalability from low-resolution, low-quality images to high-resolution, high-quality images, complexity of processes, and coding efficiency in correspondence with applications.

[Hierarchical Coding (Scalability)]

Figure 9A:
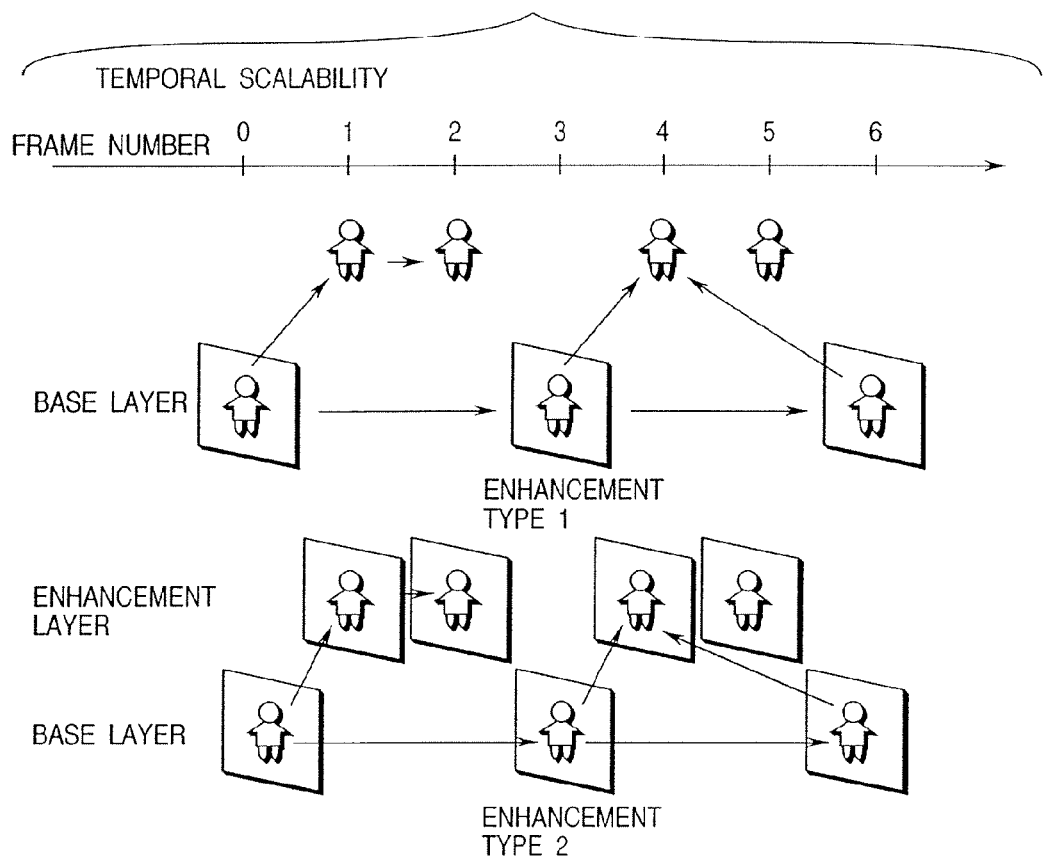
FIGS. 9A and 9B are views for explaining the hierarchical structure of a syntax that implements scalability.
Figure 9B:
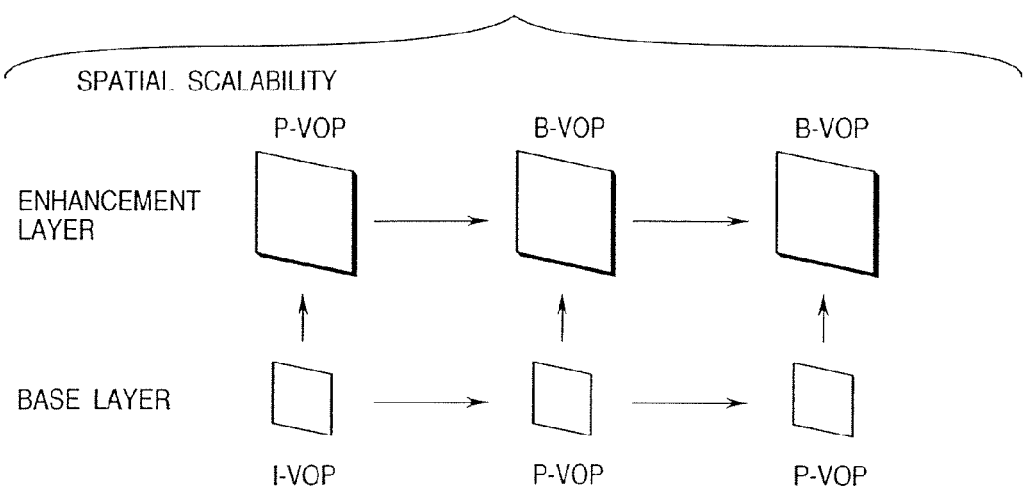

In order to implement scalability, the hierarchical structure of a syntax is constructed, as shown in FIGS. 9A and 9B. Hierarchical coding is implemented by using, e.g., base layers as lower layers, and enhancement layers as upper layers, and coding "difference information" that improves the image quality of a base layer in an enhancement layer. In case of spatial scalability, "base layer+enhancement layer" expresses a high-resolution moving image.

Furthermore, scalability has a function of hierarchically improving the image quality of the entire image, and improving the image quality of only an object region in the image. For example, in case of temporal scalability, a base layer is obtained by encoding the entire image at a low frame rate, and an enhancement layer is obtained by encoding data that improves the frame rate of a specific object in the image.

Temporal Scalability

Temporal scalability shown in FIG. 9A specifies a hierarchy of frame rates, and can increase the frame rate of an object in an enhancement layer. The presence/absence of hierarchy can be set in units of objects. There are two types of enhancement layers: type 1 is composed of a portion of an object in a base layer, and type 2 is composed of the same object as a base layer.

Spatial Scalability

Spatial scalability shown in FIG. 9B specifies a hierarchy of spatial resolutions. A base layer allows downsampling of an arbitrary size, and is used to predict an enhancement layer.

[Sprite Coding]

A sprite is a two-dimensional object such as a background image or the like in a three-dimensional spatial image, which allows the entire object to integrally express movement, rotation, deformation, and the like. A scheme for coding this two-dimensional object is called sprite coding.

Sprite coding is classified into four types, i.e., static/dynamic and online/offline: a static sprite obtained by direct transformation of a template object by an arrangement that sends object data to a decoder in advance and sends only global motion coefficients in real time; a dynamic sprite obtained by predictive coding from a temporally previous sprite; an offline sprite encoded by intra coding (I-VOP) in advance and sent to the decoder side; and an online sprite simultaneously generated by an encoder and decoder during coding.

Techniques that have been examined in association with sprite coding include static sprite coding, dynamic sprite coding, global motion compensation, and the like.

Static Sprite Coding

Figures 10A, 10B:
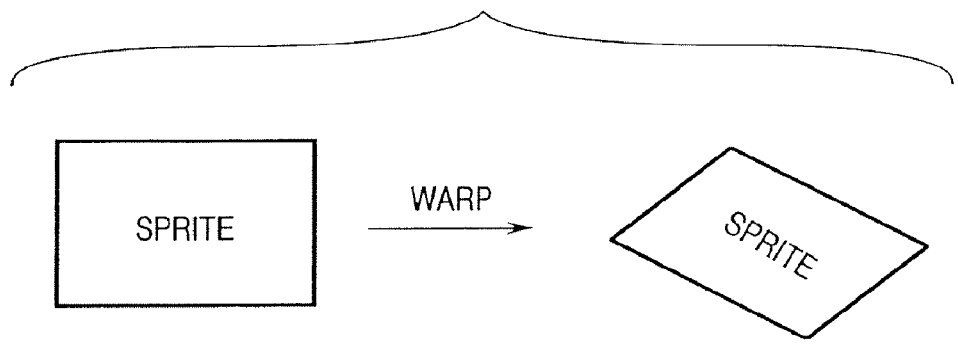
FIG. 10A is a view for explaining warp.
FIG. 10B is a table for explaining different types of warp.

Static sprite coding is a method of encoding the background (sprite) of the entire video clip in advance, and expressing an image by geometric transformation of a portion of the background. The extracted partial image can express various deformations such as translation, upscaling/downscaling, rotation, and the like. As shown in FIG. 10A, viewpoint movement in a three-dimensional space expressed by movement, rotation, upscaling/downscaling, deformation, or the like of an image is called "warp".

There are four types of warp: perspective transformation, affine transformation, equidirectional upscaling (a)/rotation (θ)/movement (c, f), and translation, which are respectively given by equations in FIG. 10B. Also, coefficients of equations shown in FIG. 10B define movement, rotation, upscaling/downscaling, deformation, and the like. A sprite is generated offline before the beginning of coding.

In this manner, static sprite coding is implemented by extracting a partial region of a background image and warping the extracted region. A partial region included in a sprite (background) image shown in FIG. 11 is warped. For example, the background image is an image of, e.g., a stand in a tennis match, and the region to be warped is an image including an object with motion such as a tennis player. In static sprite coding, only geometric transform parameters are encoded, but prediction errors are not encoded.

Dynamic Sprite Coding

In static sprite coding, a sprite is generated before coding. By contrast, in dynamic sprite coding, a sprite can be updated online during coding. Also, dynamic sprite coding encodes prediction errors unlike static sprite coding.

Global Motion Compensation (GMC)

Global motion compensation is a technique for implementing motion compensation by expressing motion of the entire object by one motion vector without segmenting it into blocks, and is suitable for motion compensation of a rigid body. Also, a reference image serves as an immediately preceding decoded image in place of a sprite, and prediction errors are coded like in static sprite coding. However, unlike static and dynamic sprite coding processes, neither a memory for storing a sprite nor shape information are required. Global motion compensation is effective for expressing motion of the entire frame and an image including zoom.

[Scene Description Information]

Objects are synthesized based on scene configuration information. In MPEG 4, configuration information which is used to synthesize the individual objects into a scene is sent. Upon receiving the individually encoded objects, they can be synthesized into a scene the transmitting side intended using the scene configuration information.

Figure 12:
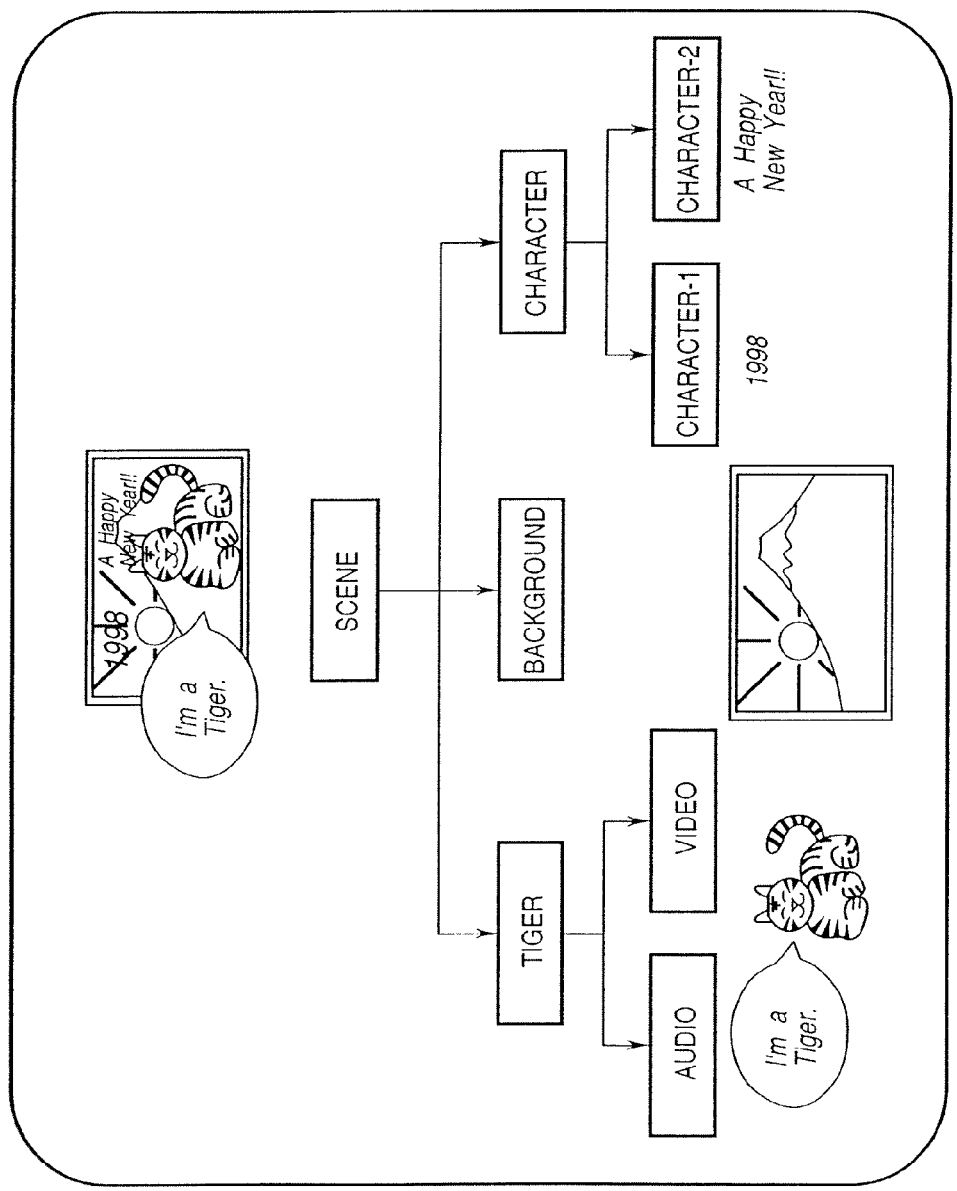
FIG. 12 is a view showing an example of the format of scene description information.

The scene configuration information contains the display times and positions of the objects, which are described as nodes in a tree pattern. Each node has relative time information and relative spatial coordinate position information on the time base with respect to a parent node. As a language that describes the scene configuration information, BIFS (Binary Format for Scenes) obtained by modifying VRML, and AAVS (Adaptive Audio-Visual Session Format) using Java™ are available. BIFS is a binary description format of MPEG 4 scene configuration information. AAVS is developed based on Java™, has a high degree of freedom, and compensates for BIFS. FIG. 12 shows an example of the configuration of the scene description language.

[Scene Description]

Scene description uses BIFS. Note that a scene graph and node as concepts common to VRML and BIFS will be mainly explained below.

A node designates grouping of lower nodes which have attributes such as a light source, shape, material, color, coordinates, and the like, and require coordinate transformation. By adopting the object-oriented concept, the location of each object in a three-dimensional space and the way its looks in that space are determined by tracing a tree called a scene graph from the top node and acquiring attributes of upper nodes. By synchronously assigning media objects, e.g., a MPEG 4 video bitstream, to nodes as leaves of the tree, a moving image or picture can be synthesized and displayed in a three-dimensional space together with other graphics data.

Differences from VRML are as follows. The MPEG 4 system supports the following items in BIFS:

(1) two-dimensional overlap relationship description of MPEG 4 video VOP coding, and synthesis description of MPEG 4 audio;

(2) sync process of continuous media stream;

(3) dynamic behavior expression (e.g., sprite) of an object;

(4) standardization of the transmission format (binary); and (5) dynamic change of scene description in session.

Almost all VRML nodes except for Extrusion, Script, Proto, and ExtemProto are supported by BIFS. New MPEG 4 special nodes added in BIFS are:

(1) node for 2D/3D synthesis (2) node for 2D graphics and text (3) animation node (4) audio node Note that VRML does not support 2D synthesis except for a special node such as a background, but BIFS expands description to allow text/graphics overlay and MPEG 4 video VOP coding in units of pixels.

In the animation node, a special node for an MPEG 4 CG image such as a face composed of 3D meshes is specified. A message (BIFS Update) that allows transposition, deletion, addition, and attribute change of nodes in the scene graph is prepared, so that a new moving image can be displayed or a button can be added on the screen during a session. BIFS can be implemented by replacing reserved words, node identifiers, and attribute values of VRML by binary data in nearly one to one correspondence.

[MPEG 4 Audio]

FIG. 13 shows the types of MPEG 4 audio coding schemes. Audio and sound coding schemes include parametric coding, CELP (Code Excited Linear Prediction) coding, and time/frequency conversion coding. Furthermore, an SNHC (Synthetic Natural Hybrid Coding) audio function is adopted, which includes SA (Structured Audio) coding and TTS (Text to Speech) coding. SA is a structural description language of synthetic music tones including MIDI (Music Instrument Digital Interface), and TTS is a protocol that sends intonation, phoneme information, and the like to an external text-to-speech synthesis apparatus.

Figure 14:
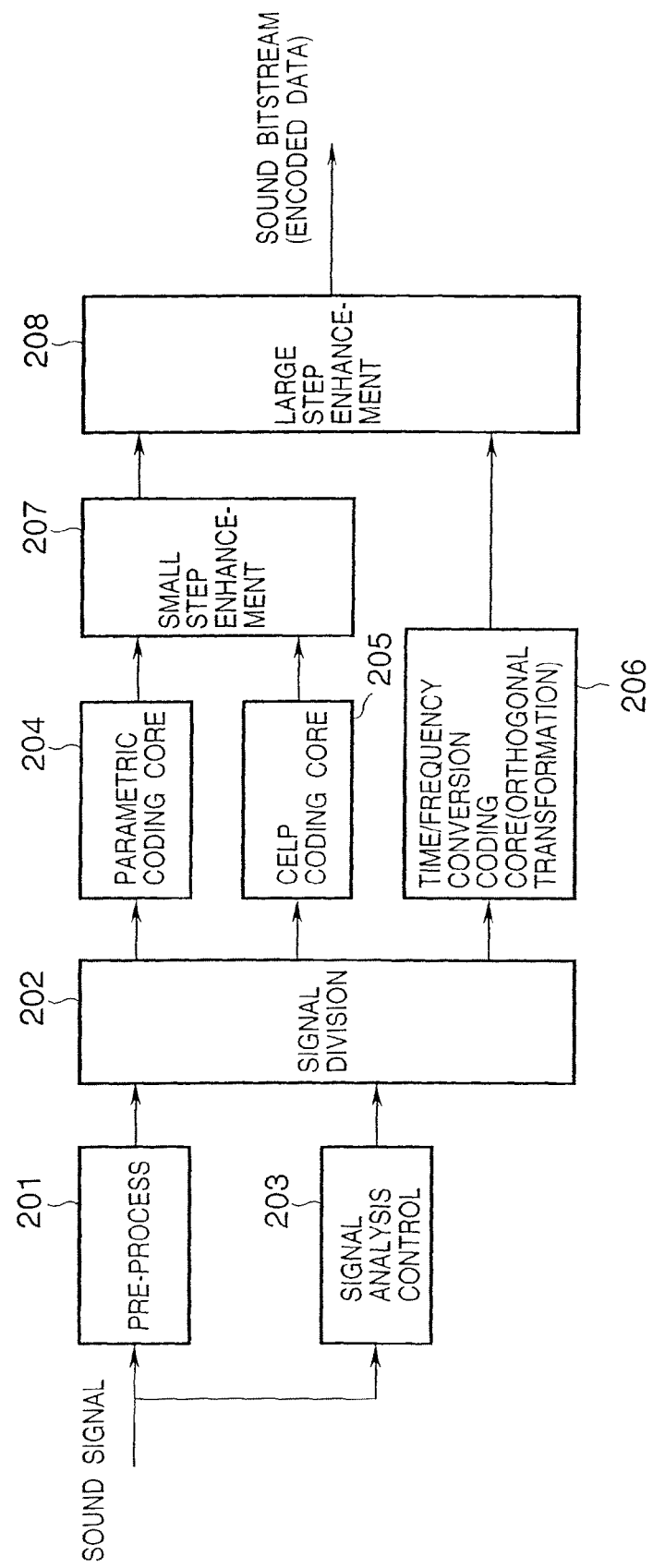
FIG. 14 is a diagram showing the arrangement of an audio coding scheme.

FIG. 14 shows the arrangement of an audio coding system. Referring to FIG. 14, an input sound signal is pre-processed (201), and is divided (202) in accordance with the frequency band so as to selectively use three different coding schemes, i.e., parametric coding (204), CELP coding (205), and time/frequency conversion coding (206). The divided signal components are input to suitable encoders. Signal analysis control (203) analyzes the input audio signal to generate control information and the like for assigning the input audio signal to the individual encoders.

Subsequently, a parametric coding core (204), CELP coding core (205), and time/frequency conversion coding core (206) as independent encoders execute encoding processes based on their own coding schemes. These three different coding schemes will be explained later. Parametric- and CELP-coded audio data undergo small-step enhancement (207), and time/frequency conversion-coded and small-step-enhanced audio data undergo large-step enhancement (208). Note that small-step enhancement (207) and large-step enhancement (208) are tools for reducing distortion produced in the respective encoding processes. The large-step-enhanced audio data becomes an encoded sound bitstream.

The arrangement of the sound coding system shown in FIG. 14 has been explained. The respective coding schemes will be explained below with reference to FIG. 13.

Parametric Coding

Parametric coding expresses a sound signal including an audio signal and music tone signal, by parameters such as frequency, amplitude, pitch, and the like, and encodes these parameters. Parametric coding includes HVXC (Harmonic Vector Excitation Coding) for an audio signal, and IL (Individual Line) coding for a music tone signal.

HVXC coding mainly aims at audio coding ranging from 2 kbps to 4 kbps, classifies an audio signal into voiced and unvoiced tones, and encodes voiced tones by vector-quantizing the harmonic structure of a residual signal of an LPC (Linear Prediction Coefficient). Also, HVXC coding directly encodes unvoiced tones by vector excitation coding of a prediction residual.

IL coding aims at coding of music tones ranging from 6 kbps to 16 kbps, and encodes a signal by modeling a signal by a line spectrum.

CELP coding

CELP coding is a scheme for encoding an input sound signal by separating it into spectrum envelope information and sound source information (prediction error). The spectrum envelope information is expressed by an LPC calculated from an input sound signal by linear prediction analysis. MPEG 4 CELP coding includes narrowband (NB) CELP having a bandwidth of 4 kHz, and wideband (WB) CELP having a bandwidth of 8 kHz. NB CELP can select a bit rate from 3.85 to 12.2 kbps, and WB CELP can select a bit rate from 13.7 to 24 kbps.

Time/Frequency Conversion Coding

Time/frequency conversion coding is a coding scheme that aims at high sound quality. This coding includes a scheme complying with AAC (Advanced Audio Coding), and TwinVQ (Transform-domain Weighted Interleave Vector Quantization). This time/frequency conversion coding contains a psychoacoustic model, and makes adaptive quantization exploiting an auditory masking effect.

The scheme complying with AAC frequency-converts an audio signal by, e.g., the DCT, and adaptively quantizes the converted signal exploiting an auditory masking effect. The adaptive bit rate ranges from 24 kbps to 64 kbps.

The TwinVQ scheme smoothes an MDCT coefficient of an audio signal using a spectrum envelope obtained by linear prediction analysis of an audio signal. After the smoothed signal is interleaved, it is vector-quantized using two code lengths. The adaptive bit rate ranges from 6 kbps to 40 kbps.

[System Structure]

Figure 15:
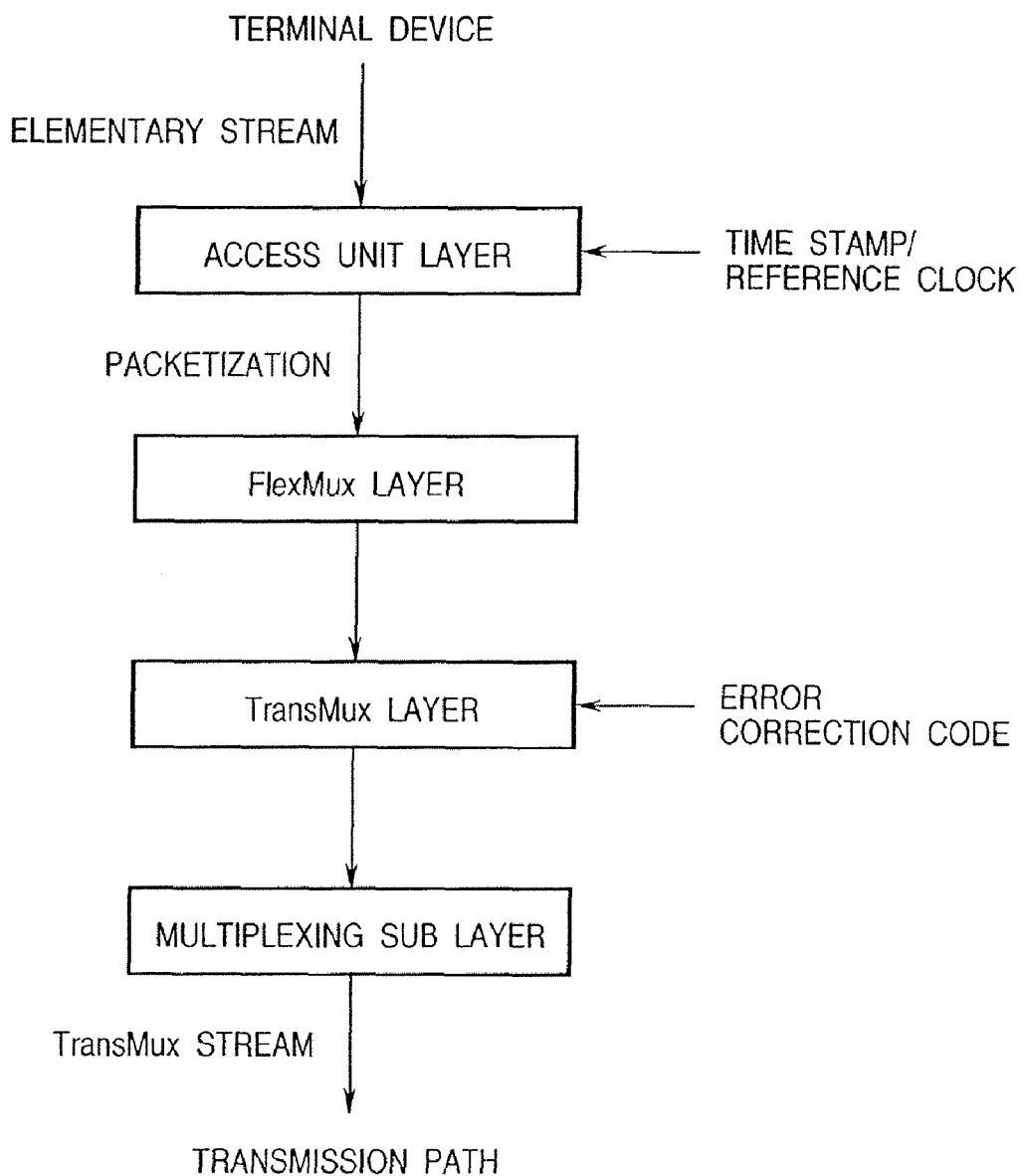
FIG. 15 is a view for explaining the MPEG 4 system structure.

The system part in MPEG 4 defines multiplexing, demultiplexing, and synthesis. The system structure will be explained below with reference to FIG. 15.

In multiplexing, each elementary stream including individual objects as outputs from video and audio encoders, scene configuration information that describes the spatial layout of the individual objects, and the like is packetized by an access unit layer. The access unit layer appends, as a header, a time stamp, reference clock, and the like for establishing synchronization for each access unit. Obtained packetized streams are multiplexed by a FlexMux layer in a unit that considers a display unit and error robustness, and is sent to a TransMux layer.

The TransMux layer appends an error correction code in a protection sub layer in correspondence with the necessity of error robustness. Finally, a multiplex sub layer (Mux Sub Layer) outputs a single TransMux stream onto a transmission path. The TransMux layer is not defined in MPEG 4, and can use existing network protocols such as UDP/IP (User Datagram Protocol/Internet Protocol) as an Internet protocol, MPEG 2 transport stream (TS), ATM (Asynchronous Transfer Mode) AAL2 (ATM Adaptation layer 2), videophone multiplexing scheme (ITU-T recommendation H.223) using a telephone line, digital audio broadcast, and the like.

In order to reduce the overhead of the system layer, and to allow easy embedding in a conventional transport stream, the access unit layer or FlexMux layer may be bypassed.

On the decode side, in order to synchronize individual objects, a buffer (DB: Decoding Buffer) is inserted after demultiplexing to absorb arrival and decoding time differences of the individual objects. Before synthesis, a buffer (CB: Composition Buffer) is also inserted to adjust the display timing.

[Basic Structure of Video Stream]

Figure 16:
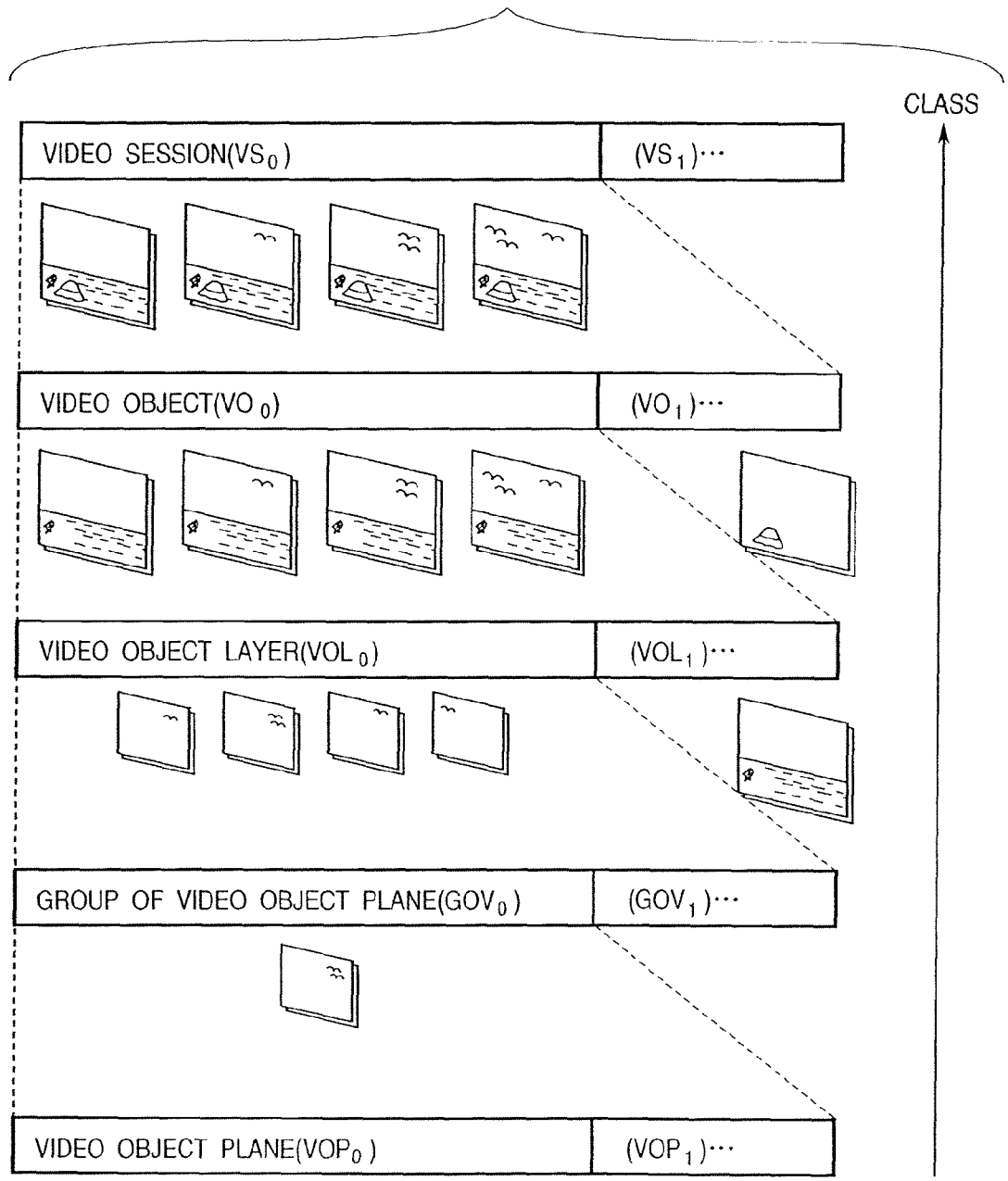
FIG. 16 is a view for explaining the MPEG 4 layer structure.

FIG. 16 shows the layer structure. Respective layers are called classes, and each class has a header. The header contains various kinds of code information, such as startcode, endcode, ID, shape, size, and the like.

Video Stream

A video stream consists of a plurality of sessions. A session means one complete sequence.

A video session (VS) is formed by a plurality of video objects (VOs).

Each video object (VO) consists of a plurality of video object layers (VOLs).

Each video object layer (VOL) is a sequence including a plurality of layers in units of objects.

A group of video object plane (GOV) consists of a plurality of VOPs.

Note that a plane indicates an object in units of frames.

[Bitstream Structure Having Error Robustness]

In MPEG 4, the coding scheme itself has resilience or robustness against transmission errors to achieve error-prone mobile communications (radio communications). Error correction in an existing standard scheme is mainly done on the system (sender) side. However, in a network such as PHS (Personal Handyphone System), the error rate is very high, and errors that cannot be corrected by the system may mix in a video encoded portion. In consideration of such errors, MPEG 4 assumes various error patterns that cannot be corrected by the system, and adopts an error robust coding scheme that can suppress propagation of errors as much as possible in such environment. An example of error robustness that pertains to image coding, and a bitstream structure therefor will be explained below.

Reversible VLC (RVLC) and Reversible Decoding

As shown in FIG. 17, when an error is detected during decoding, the decoding process is paused there, and the next sync signal is detected. When the next sync signal has been detected, the bitstream is decoded in an opposite direction from the detection position of the sync signal. The number of decoding start points is increased without any new additional information, and the decodable information size upon production of errors can be increased compared to the conventional system. Such variable-length coding that can decode from both the forward and reverse directions implements "reversible decoding".

Multiple Transmission of Important Information

Figure 18:
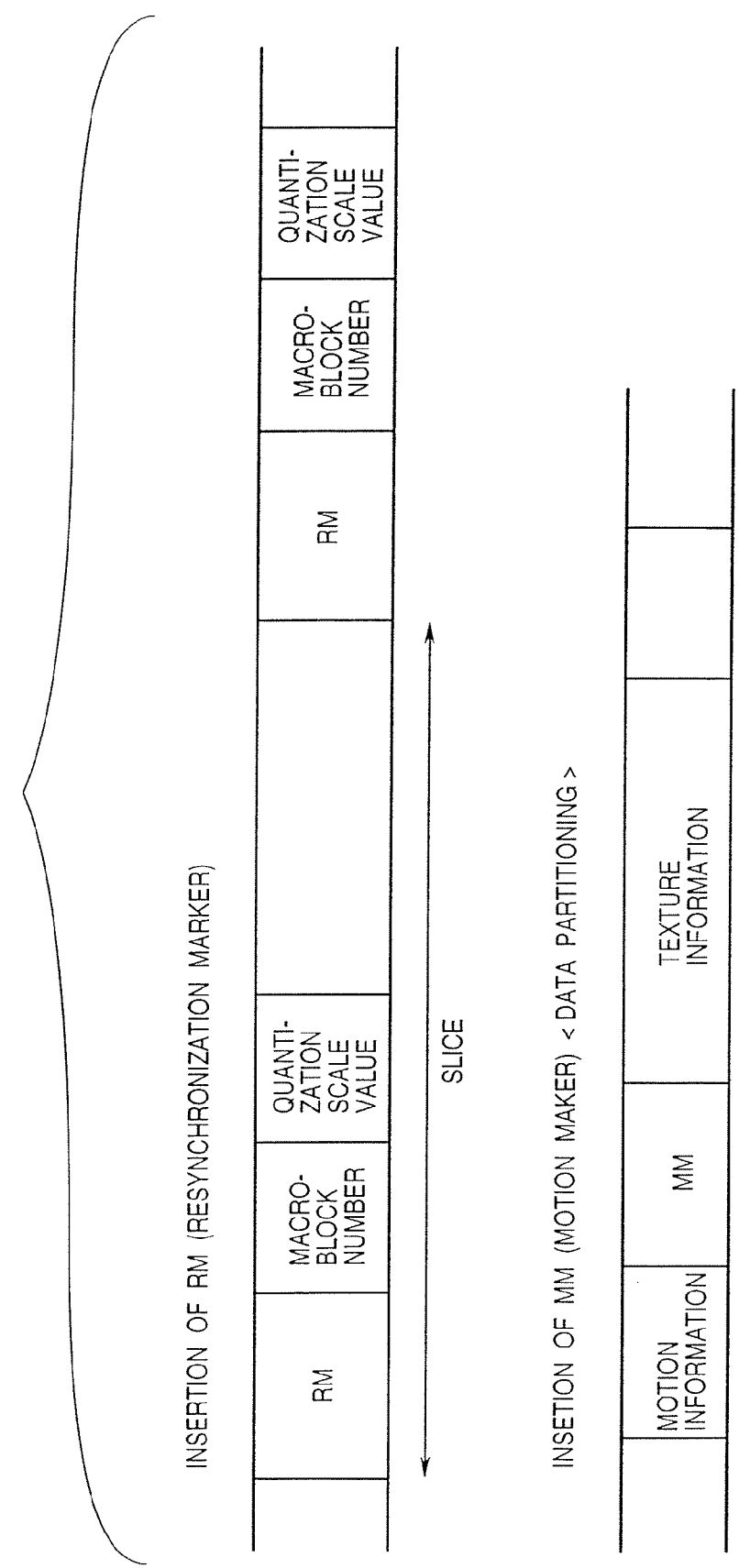
FIG. 18 is a view for explaining multiple transmissions of important information.

As shown in FIG. 18, a structure that can transmit important information a plurality of times is introduced to reinforce error robustness. For example, in order to display individual VOPs at correct timings, time stamps are required, and such information is contained in the first video packet. Even if this video packet is lost by errors, decoding can be restarted from the next video packet by the aforementioned reversible decoding structure. However, since this video packet contains no time stamp, the display timing cannot be detected after all. For this reason, a structure in which a flag called HEC (Header Extension Code) is set in each video packet, and important information such as a time stamp and the like can be appended after that flag is introduced. After the HEC flag, the time stamp and VOP coding mode type can be appended.

If synchronization has an error, decoding is started from the next resynchronization marker (RM). In each video packet, information required for that process, i.e., the number of the first MB contained in that packet and the quantization step size for that MB, are set immediately after RM. The HEC flag is inserted after such information; when HEC='1', TR and VCT are appended immediately thereafter. With such HEC information, even when the first video packet cannot be decoded and is discarded, video packets starting from one set with HEC='1' can be normally decoded and displayed. Whether or not HEC is set at '1' can be freely set on the encoder side.

Data Partitioning

Since the encoder side forms a bitstream by repeating encoding processes in units of MBs, if an error has corrupted a portion of the stream, MB data after the error cannot be decoded. On the other hand, a plurality of pieces of MB information are classified into some groups, these groups are set in a bitstream, and marker information is inserted at the boundaries of groups. With this format, even when an error mixes in the bitstream and data after that error cannot be decoded, synchronization is established again using the marker inserted at the end of the group, and data in the next group can be normally decoded.

Based on the aforementioned concept, data partitioning that classifies motion vectors and texture information (DCT coefficients and the like) in units of video packets is adopted. A motion marker (MM) is set at the boundaries of groups.

Even when an error mixes in the middle of motion vector information, the DCT coefficient after MM can be normally decoded. Hence, MB data corresponding to a motion vector before mixing of the error can be accurately reconstructed as well as the DCT coefficient. Even when an error mixes in texture information, an image which is accurate to some extent can be reconstructed by interpolation (concealment) using motion vector information and decoded previous frame information as long as the motion vector is normally decoded.

Variable-length Interval Synchronization Scheme

A resynchronization scheme for variable-length packets will be explained below. An MB group containing a sync signal at the head of the group is called a "video packet", and the number of MBs contained in that packet can be freely set on the encoder side. When an error mixes in a bitstream that uses VLCs (Variable Length Codes), the subsequent codes cannot be synchronized and cannot be decoded. Even in such case, by detecting the next resynchronization marker, the following information can be normally decoded

[Byte Alignment]

In order to attain matching with the system, information is multiplexed in units of integer multiples of bytes. A bitstream has a byte alignment structure. In order to achieve byte alignment, stuffing bits are inserted at the end of each video packet. The stuffing bits are also used as an error check code in a video packet.

The stuffing bits consist of a code like '01111', i.e., the first bit='0' and other bits='1'. More specifically, if MBs in a given video packet are normally decoded up to the last MB, a code that appears after that MB is always '0', and a run of '1's having a length 1 bit shorter than that of the stuffing bits should appear after '0' If a pattern that violates this rule is detected, this means that decoding before that pattern is not normal, and an error in a bitstream can be detected.

The MPEG 4 technology has been explained with reference to "Outline of MPEG 4 International Standards Determined", *Nikkei Electronics*, 1997.9.22 issue, p. 147-168, "Full Story of Upcoming MPEG 4", The Institute of Image Information and Television Engineers Text, Oct. 2, 1997, "Latest Standardization Trend of MPEG 4 and Image Compression Technique", Japan Industry Engineering Center Seminar Reference, Feb. 3, 1997, and the like.

First Embodiment

[Arrangement]

Figure 19:
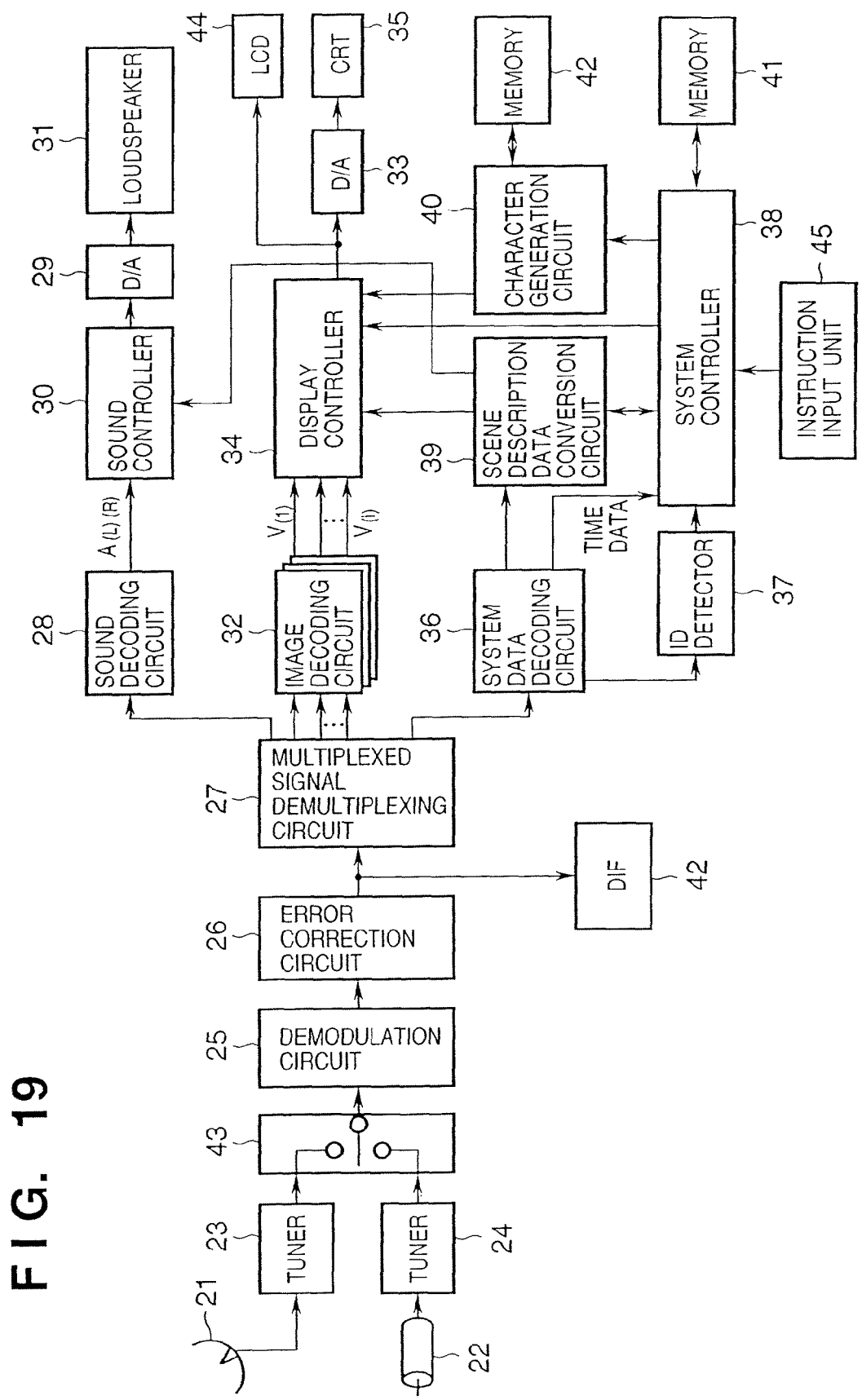
FIG. 19 is a block diagram showing the arrangement of a TV broadcast receiving apparatus according to the first embodiment of the present invention.

A TV broadcast receiving apparatus according to the first embodiment of the present invention will be described below with reference to the accompanying drawings. FIG. 19 is a block diagram showing the arrangement of a TV broadcast receiving apparatus of the first embodiment.

A digital TV broadcast signal is tuned in and received depending on its broadcast pattern, e.g., by a satellite antenna 21 and tuner 23 in case of satellite broadcast or by a tuner 24 via a cable 22 in case of cable broadcast. TV information received from satellite or cable broadcast is input to a data selector 43 to select one data sequence. The selected data sequence is demodulated by a demodulation circuit 25, and the demodulated data undergoes error correction in an error correction circuit 26.

Subsequently, the TV information is demultiplexed by a multiplexed signal demultiplexing circuit 27 into image data, sound data, and other system data (additional data). Of these data, sound data is decoded by a sound decoding circuit 28 to obtain stereo audio data A(L) and A(R), which are input to a sound controller 30 to adjust the sound volume and sound field lateralization and to make a multi-sound channel process such as a main/sub sound channel. After that, the sound data to be output is selected, and is converted by a digital-analog converter (D/A) 29 into an analog signal. The analog signal is reproduced via a loudspeaker 31.

On the other hand, image data is decoded by an image decoding circuit 32 including a plurality of decoders which make decoding processes in correspondence with individual objects in the image data. This decoding scheme decodes in units of objects on the basis of the aforementioned MPEG 4 image coding scheme. Decoded image data are images v(1) to v(i) corresponding to the number of objects, which undergo various processes on the basis of display by a display controller 34.

Display control done by the display controller 34 includes a process for determining whether or not each object is displayed, a process for upscaling/downscaling each object, a process for determining the display position of each object on the frame, and the like. Furthermore, the display control includes various display processes such as synthesis of objects and character images (time indication, index title, and the like) generated by a character generation circuit 40, and the like. Such display control processes are done under the control of a system controller 38 on the basis of layout information of individual objects, i.e., scene description information from a scene description data conversion circuit 39.

The formed display image is converted into an analog signal by a D/A converter 33, and is displayed on a CRT 35, or is sent to and displayed on a liquid crystal display (LCD) 44 or the like as a digital signal.

On the other hand, the system data (including additional data) is decoded by a system data decoding circuit 36. From the decoded system data, an ID detector 37 detects a program ID appended to a program. The detected program ID is input to the system controller 38 to serve as a dedicated command for program discrimination. Also, of the decoded system data, data that pertains to scene description is input to the scene description data conversion circuit 39. The remaining system data (including time data) are input as various commands to the system controller 38. Note that the additional data may include a document or the like such as a title index of a program or the like.

The display controller 34 sets a layout of the individual objects and the sound controller 30 sets the sound volume, sound field lateralization, and the like using scene description data obtained by the scene description data conversion circuit 39. By adjusting the scene description data conversion circuit 39 and controlling the display controller 34 under the control of the system controller 39, an arbitrary layout of individual objects that the user desired and is different from a basic layout can be set. The layout setting method will be described later.

When a display image which is not handled as an object, e.g., a time indication frame, title index, or the like, is generated, the character generation circuit 40 is used. Under the control of the system controller 38, time indication character data is generated on the basis of time data contained in the additional data, time information generated inside the receiver, or the like using a memory 42 such as a ROM or the like that saves character data. The same applies to title index data. The generated image is synthesized with objects by the display controller 34.

The user can input various commands via an instruction input unit 45. As for objects for which a layout is to be changed based on the user instruction input, their positions, sizes, and the like are adjusted, and those objects are displayed in a layout that the user desired. That is, layout correction and input of new setting values are made via the instruction input unit 45. The system controller 38 appropriately controls the operations of the respective units in accordance with input instruction values to obtain a desired output (display, reproduction) pattern.

[Layout Setups]

Figure 20:
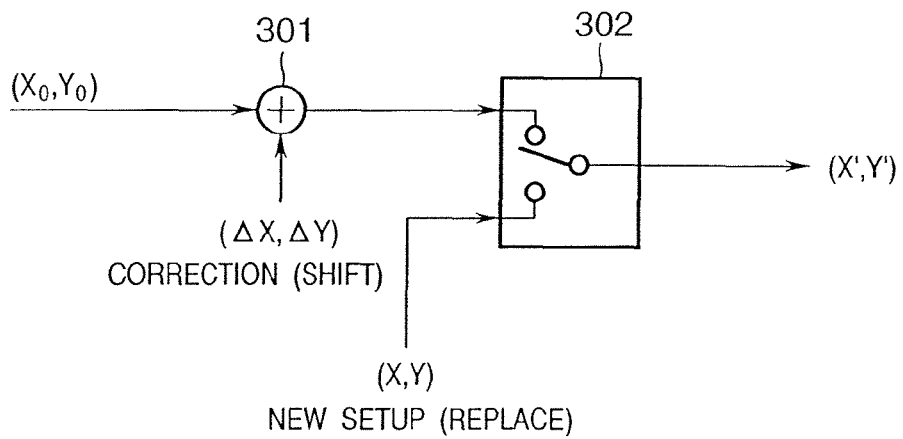
FIG. 20 is a diagram for explaining a method of setting position data upon setting a layout.
Figure 21:
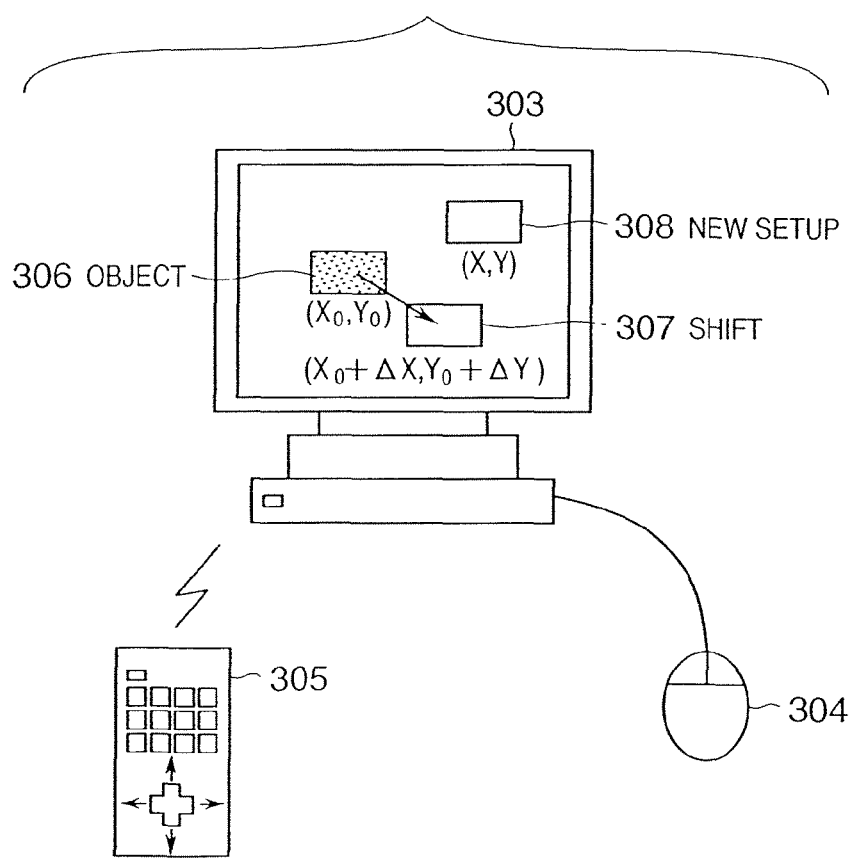
FIG. 21 is a view for explaining a method of inputting an image and instruction upon setting a layout.

An example of the layout setting method will be explained below. FIG. 20 is a diagram for explaining the method of setting position data upon layout setups, and FIG. 21 is a view for explaining the method of inputting an image and instruction upon layout setups.

There are two methods of setting the position of an object. The first method shifts the position of a basic layout specified by scene description data, and the second method allows the user to set a new object position at an arbitrary location. One of these methods can be selected by a selector 302 shown in FIG. 20 in accordance with user operation.

The method of shifting the basic layout as the first method will be explained first. Image data is input as an object, and the basic position of that object is expressed by position data (X0, Y0) designated by scene description data. When the user wants to shift that object, a correction amount ($\Delta X$, $\Delta Y$) is added to the position data (X0, Y0) by an adder 301, and new position data (X', Y') is used as layout setting data of the object.

The object size is adjustable by increasing/decreasing the upscaling/downscaling factor of a given object by a prescribed value (e.g., an integer) in the display controller 34. The object whose upscaling/downscaling factor has been arbitrarily changed is synthesized with a background image. When a given object is not displayed, the object which is not to be displayed is processed not to be synthesized with the display frame upon synthesizing objects.

The method of setting the new object position as the second method will be described. A new object position (x, Y) is set independently of basic position data, and is used as position data (X', Y') that replaces the basic position data. In this manner, an object is moved.

The system controller 38 controls the display controller 34 to implement a process for determining whether or not a given object is synthesized with the display frame (to turn on/off object display) and a process for upscaling/downscaling a given object by interpolating/decimating pixels. The control data used at that time is held as layout setting data.

As for sound data, the system controller 38 controls the scene description data conversion circuit 39 to adjust or change scene description data for sound, so as to obtain an audio output that the user desired. Such data is called a sound layout, and control data at that time is called layout setting data for sound.

FIG. 21 depicts the aforementioned position setting methods. On a display device 303 such as a CRT or the like, when an object 306 located at a basic position (X0, Y0) is shifted to a shift position 307, layout setting data (X', Y') as final position data obtained by adding the shift amount to the basic position data is (X0+$\Delta X$, Y0+$\Delta Y$). On the other hand, when the user arbitrarily lays out an object at a new setting position 308, the layout setting data (X', Y') is (X, Y).

FIG. 21 illustrates a mouse 304 and remote controller 305 as examples of pointing devices included in the instruction input unit 45. Using the mouse 304 or direction input keys (or a cross-cursor key, joystick, joypad, or the like) of the remote controller 305, movement of a given object can be freely and easily implemented. Note that the shift position or new position of a given object may be selected from some preset positions such as the four corners and center of the frame.

TV broadcast data includes a program ID. Using such program IDs, the set layouts are converted into data in correspondence with program IDs in units of programs, and the converted data may be stored as layout setting data. As the storage location of layout setting data, a nonvolatile memory 41 such as an EEPROM or the like is used. Upon detecting a program ID stored in the memory 41 from TV broadcast data, the system controller 38 controls the scene description data conversion circuit 39 and display controller 34 on the basis of the layout setting data corresponding to the detected program ID to make image display and sound reproduction in a layout set by the user.

Subsequently, layout setting data will be explained below. Basically, the shift amount or change information (e.g., display ON/OFF or new position) of an object upon layout setups by the user are converted into data in addition to object layout information on the basis of the object layout information obtained from scene description data, and the converted data can be stored as layout setting data. As has already been described previously with reference to FIG. 12, the scene description data is information for laying out objects that form each scene in a tree pattern, and designating the display times and positions of the individual objects.

Figure 22:
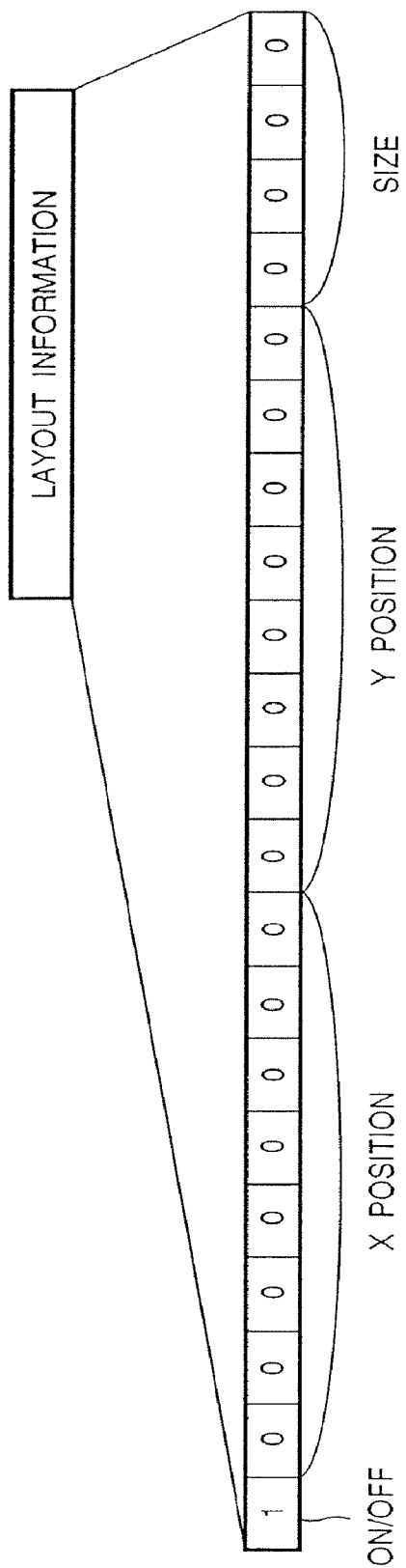
FIG. 22 is a view for explaining the format of layout setting data.

As another format of layout setting data, as shown in FIG. 22, when ON/OFF data indicating whether or not the object of interest is displayed, display position data obtained when the display position is two-dimensionally expressed by the x- and y-axes, and data indicating the size are held, they can be used as layout setting data.

Figure 23:
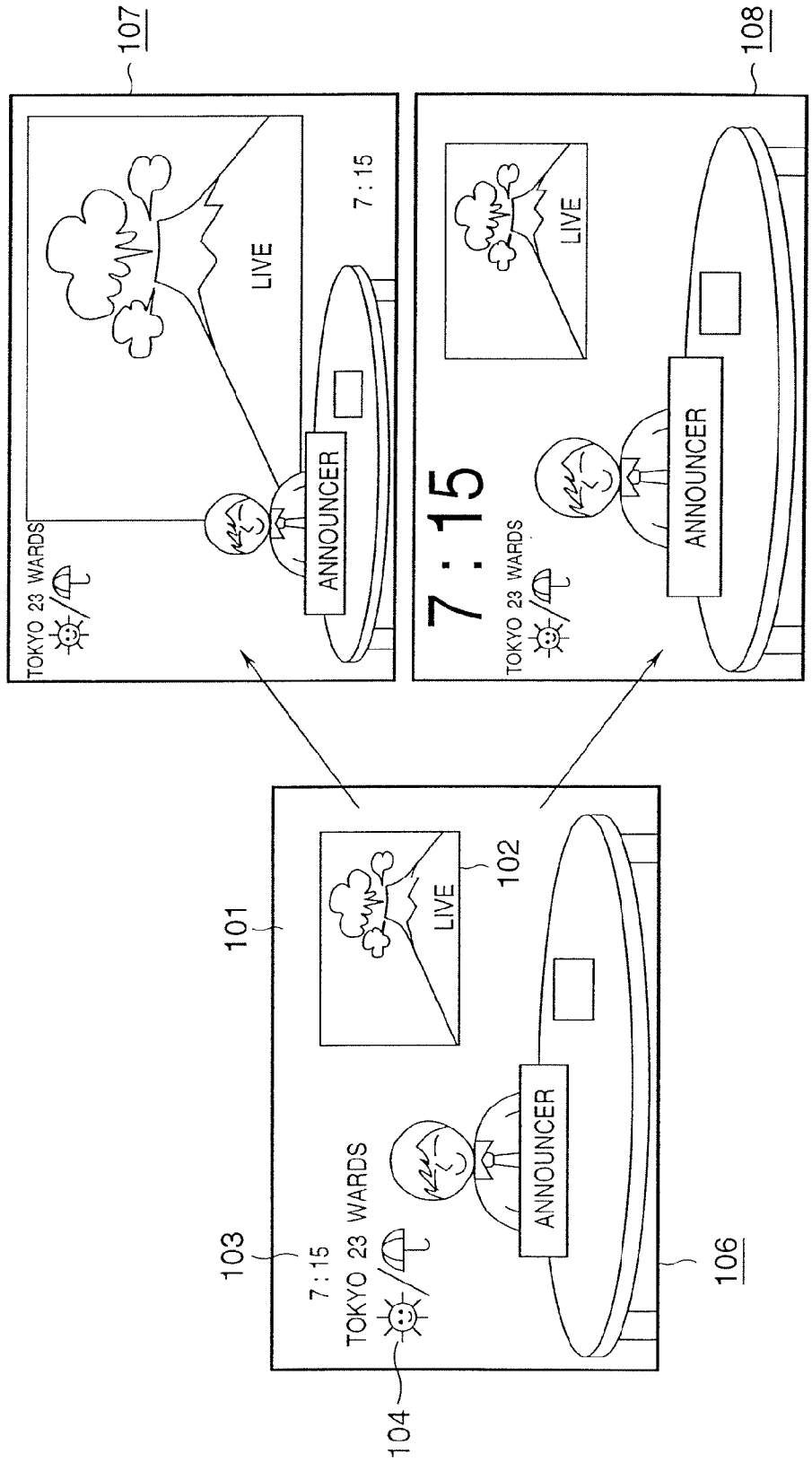
FIG. 23 is a view showing an example of a video display layout according to the first embodiment.

FIG. 23 shows an example of a video display layout according to this embodiment.

When a video signal sent from the broadcast station is normally displayed without any changes, a basic image 106 shown in FIG. 23 is displayed. In this case, the basic image 106 consists of an entire image (background: sprite) 101, spot relay image 102, time indication image 103, weather forecast image 104, and sound object. In the display example shown in FIG. 23, the time indication image 103 is contained in image data as an object.

FIG. 24 shows the format of a general MPEG 4 bitstream. Objects contained in the display example in FIG. 23 are multiplexed in a database of objects 1 to 4 in FIG. 24. Objects 1 to 5 respectively correspond to the entire image 101, spot relay image 102, time indication image 103, weather forecast image 104, and sound data, and additional data containing scene description information, program ID, and the like are multiplexed as system data, thus forming a bitstream.

Using this embodiment, the entire image 101 can be downscaled, the relay image 102 can be upscaled, and the time indication image 103 and weather forecast image 104 can be moved, as shown in a setting example 107 in FIG. 23. Also, the time indication image 103 can be upscaled, as shown in a setting example 108. Such setups can be freely made in units of program IDs. After such display layout is set, when the corresponding program ID is detected, the stored setup information is read out from the memory 41, and the video data of that program is displayed in the set layout.

[Operation Sequence]

Figure 25:
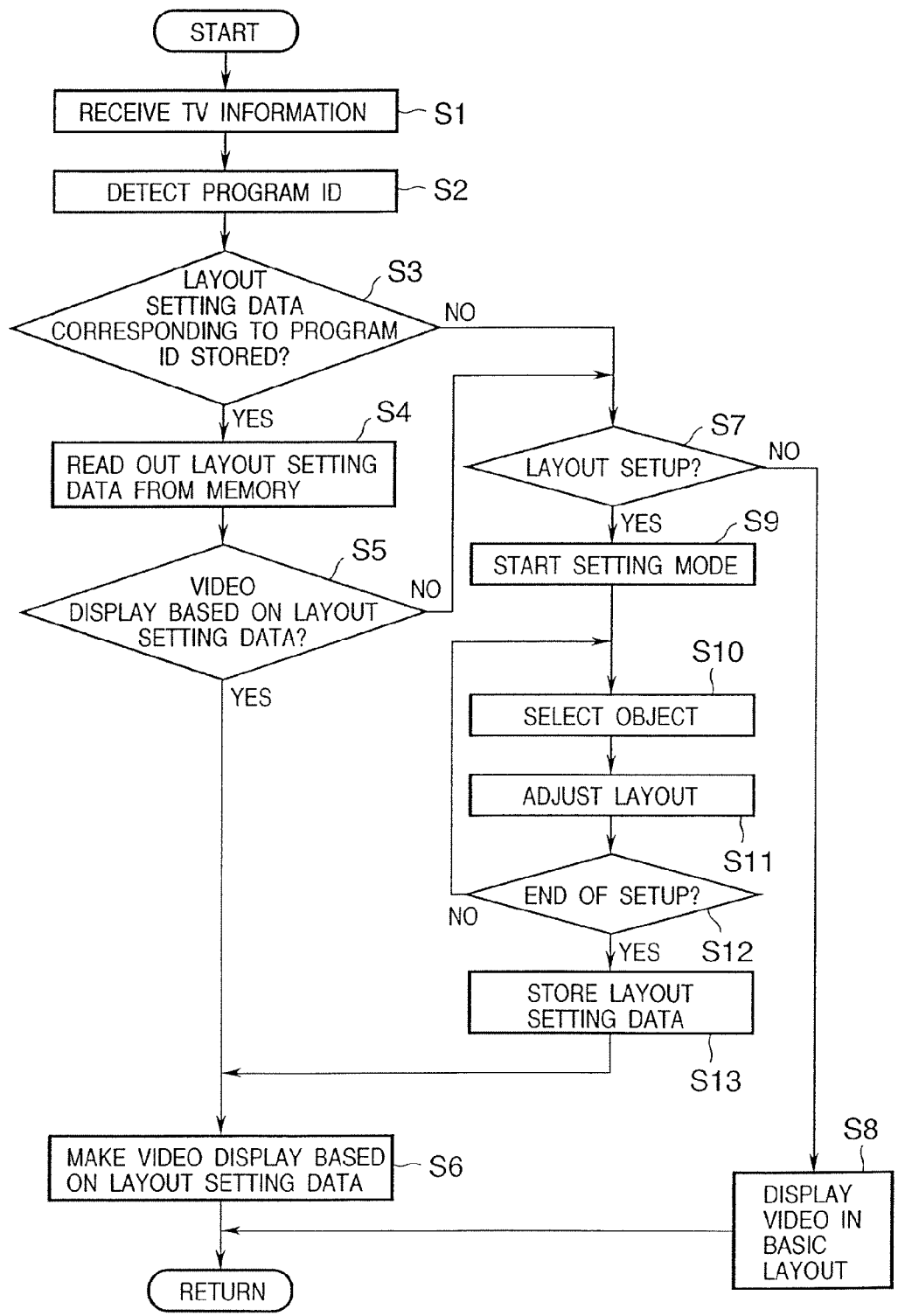
FIG. 25 is a flow chart for explaining the operation sequence of the TV broadcast receiving apparatus of the first embodiment.

FIG. 25 is a flow chart showing the operation sequence of the TV broadcast receiving apparatus of this embodiment. The operation sequence shown in FIG. 25 is implemented by executing a program stored in the memory 41 or 42 by the system controller 38. Note that the program may be pre-stored in the memory 41 or 42. Also, the program downloaded via a satellite or cable broadcast channel may be stored in the memory 41 or 42.

TV information is received (step S1), and a program ID is detected from additional data appended to the TV information (step S2). As for the program ID, those different in units of programs are appended by the broadcast station, and each program ID is multiplexed on TV information together with other additional data. Based on the detected program ID, it is checked if layout setting data corresponding to that program ID is stored (step S3).

If layout setting data is saved in correspondence with the program ID, that layout setting data is read out from the memory 41 (step S4), and the user is inquired as to whether or not video display based on the saved layout setting data is to be made (step S5). If such video display is permitted, video data of the program is displayed in the set layout (step S6).

If no layout setting data is saved in correspondence with the program ID, and if the user rejects video display based on the saved layout setting data, it is checked if a new layout is set for that program (step S7). If a new layout is not set or need not be set, video data of the program is displayed in a basic layout as it is sent from the broadcast station (step S8).

If a new layout is set, the control enters the layout setting mode (step S9). Then, the user selects an object for which a layout is to be adjusted, audio output format, or the like from objects that form image data in the TV information (step S10), and makes adjustment that pertains to a layout such as movement, upscaling/downscaling, display ON/OFF, and the like of the selected object, or adjusts the audio output format such as the sound volume, sound field lateralization, or the like (step S11).

Upon completion of adjustment for the selected object, the user decides if layout setups are to end (step S12). If the user wants to adjust another object, the flow returns to step S10 to repeat selection and adjustment of an object. If the user wants to quit setups, layout setting data is stored in the memory 41 in correspondence with the program ID upon completion of the setting mode (step S13). Video data of the program is displayed in the newly set layout (step S6).

The TV broadcast receiving apparatus of this embodiment displays video data of a TV program in the aforementioned sequence, and repeats the sequence shown in FIG. 25 every time a new program ID is detected.

As described above, according to this embodiment, the user who watches digital TV broadcast can adjust (also can turn on/off) the layout of each object, and the sound volume and sound field lateralization of audio data, and can set an arbitrary layout in correspondence with video display of a program. Hence, video display and sound reproduction according to user's favor can be made, the quality of the audiovisual user interface can be improved, and more flexible TV program display can be presented to the user.

Layouts are set in units of IDs appended to programs, and layout setting data are stored in correspondence with IDs. Hence, once the layout is set, video display of a given program can be automatically made in the set layout by recognizing the layout setting data corresponding to the ID of that program, thus very effectively adding a new function to TV broadcast display.

The layout setting data is not always set by the user. For example, the user may select optional layout setting data, which is sent together with TV information, to adjust video display, and the selected optional layout setting data may be stored in the memory 41.

Second Embodiment

A TV broadcast receiving apparatus according to the second embodiment of the present invention will be described below. Note that the same reference numerals in the second embodiment denote the same parts as those in the first embodiment, and a detailed description thereof will be omitted.

In TV broadcast that uses an image encoded by a coding scheme other than MPEG 4 as one MPEG 4 object, the second embodiment makes video display of a TV program with high degree of freedom in layout using a layout (movement, upscaling/downscaling, and the like of an object) set by the user.

A case will be exemplified below wherein MPEG 2 is used as a photo image coding scheme. That is, a TV broadcast receiving apparatus which receives and displays an image encoded by MPEG 2 (to be also referred to as an "MPEG 2 image" hereinafter) multiplexed on an MPEG 4 bitstream will be explained below. Note that the layout setting method in the second embodiment is the same as that described in the first embodiment, and the basic arrangement and operation of the TV broadcast receiving apparatus are the same as those described above using FIG. 19. In the second embodiment, however, since details of the sound decoding circuit 28, image decoding circuit 32, and system data decoding circuit 36 in FIG. 19 are different in terms of the TV broadcast decoding method in the second embodiment, they will be explained using FIGS. 26 and 27.

Figure 26:
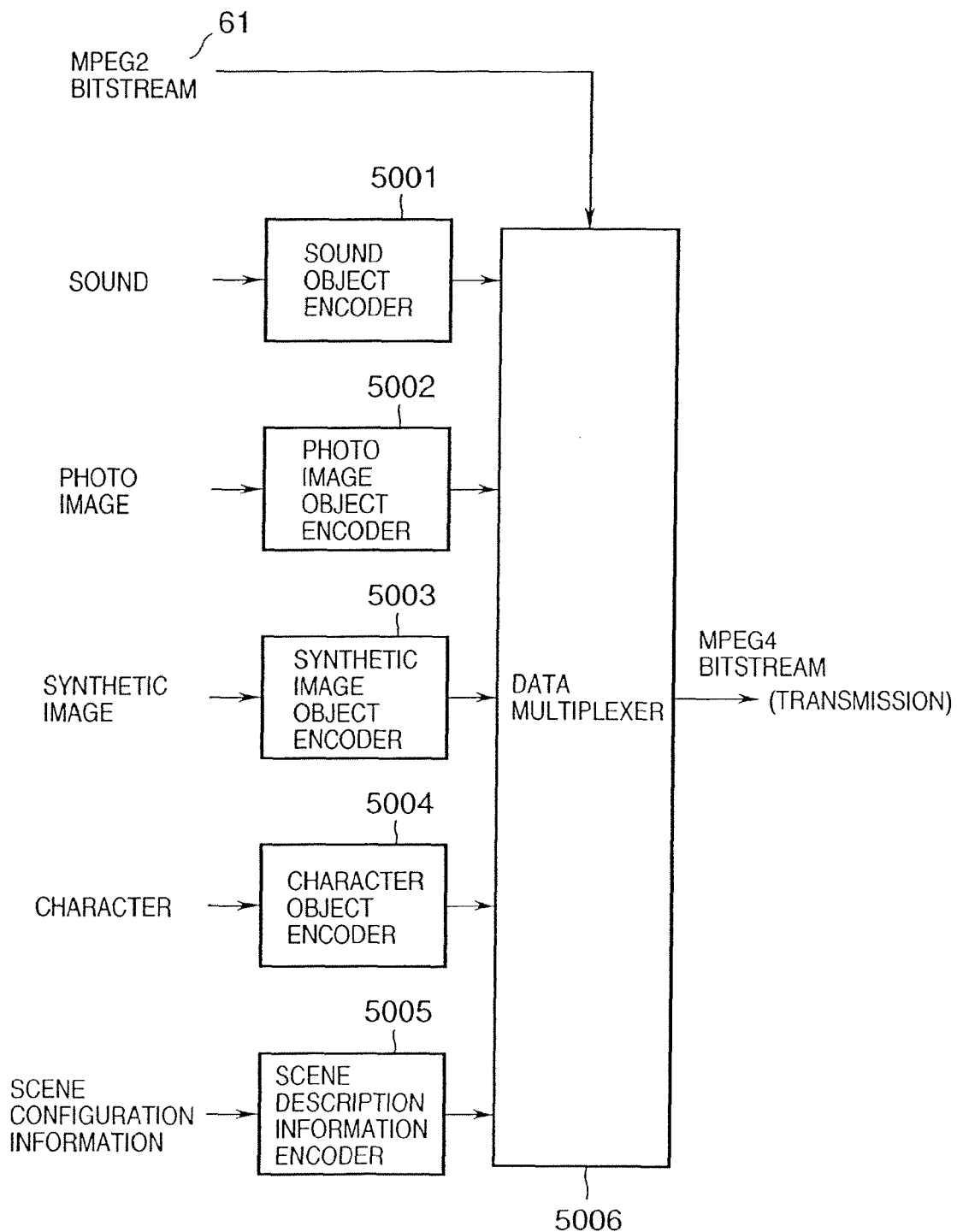
FIG. 26 is a block diagram showing the arrangement of an encoding unit mounted in an MPEG 4 TV broadcasting system.

FIG. 26 shows an encoding unit used in a system for receiving MPEG 4 TV broadcast in a broadcast station as the sender side. A data multiplexer 5006 multiplexes the outputs from sound object, photo image object, synthetic image object, character object, and scene description information encoders 5001 to 5005, that have been explained previously using FIG. 2, into an MPEG 4 bitstream, and also multiplexes an MPEG 2 bitstream 61 extracted by an MPEG 2 commercial broadcast equipment or relay system or upon reproducing a DVD (Digital Video Disc) into the MPEG 4 bitstream.

Figure 27:
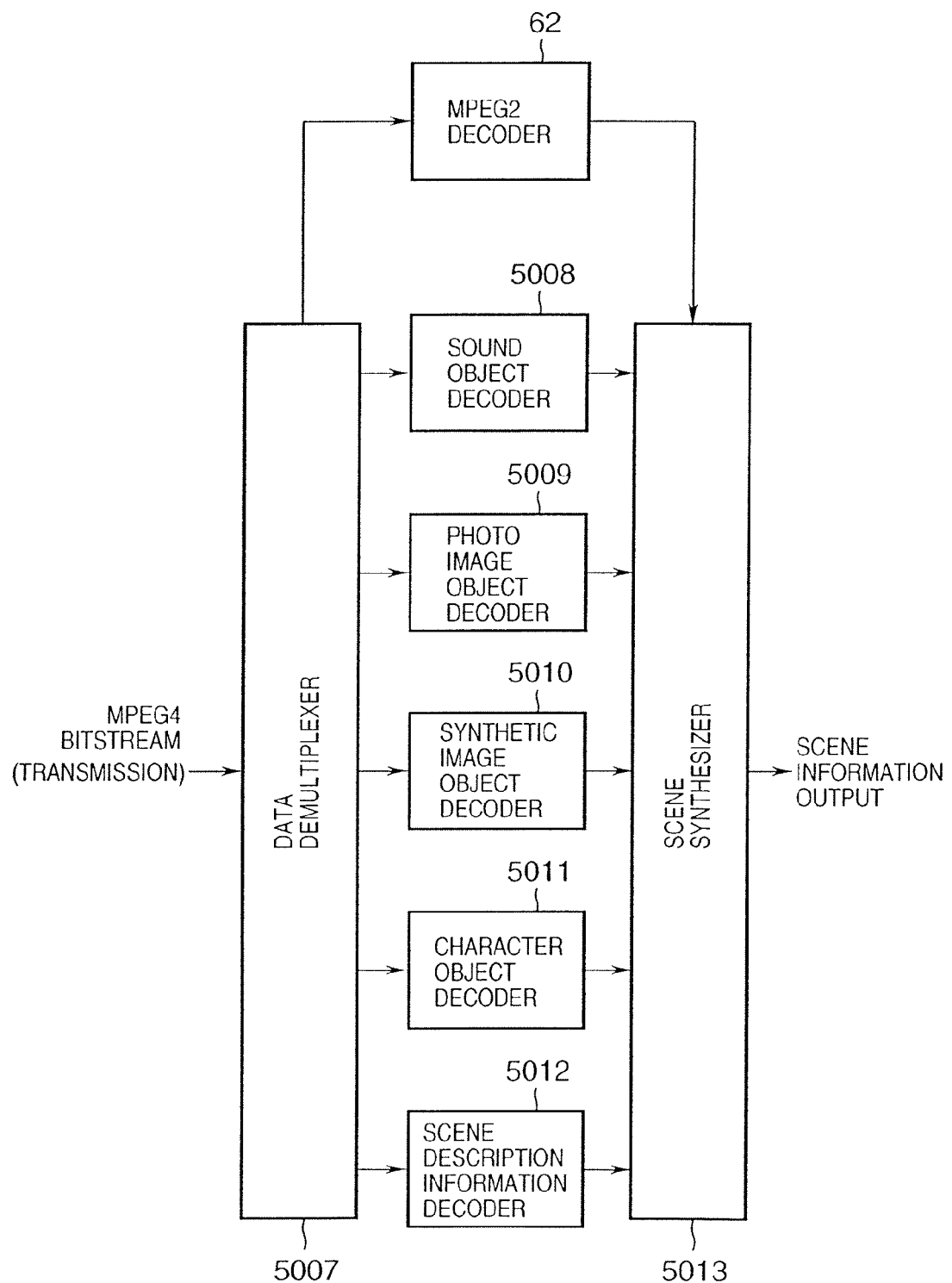
FIG. 27 is a block diagram showing the arrangement of a decoding unit mounted in the TV broadcast receiving apparatus.

FIG. 27 shows the arrangement of a decoding unit used in the MPEG 4 bitstream decoding side, i.e., in the TV broadcast receiving apparatus. The decoding unit shown in FIG. 27 is included in the sound decoding circuit 28, image decoding circuit 32, system data decoding circuit 36, scene description data conversion circuit 39, and the like, which are decoding systems and their associated circuit that construct the TV broadcast receiving apparatus of the second embodiment.

The received MPEG 4 bitstream is demultiplexed by a data demultiplexer 5007 into individual data before decoding. Of the demultiplexed data, the sound object, photo image object, synthetic image object, character object, and scene description information as MPEG 4 objects are decoded by corresponding decoders 5008 to 5012. Also, MPEG 2 data multiplexed together with the MPEG 4 objects is decoded by a dedicated MPEG 2 decoder 62 provided independently of those for the MPEG 4 objects. Note that the MPEG 2 decoder 62 may use some components of the MPEG 4 image decoding circuit 32.

Information for displaying video data of a TV program is formed based on the decoded sound and image data, and scene description data as system data, and the individual objects and MPEG 2 data are synthesized by a scene synthesizer 5013 into a scene to be output to the TV, thus outputting scene information.

Figure 28:
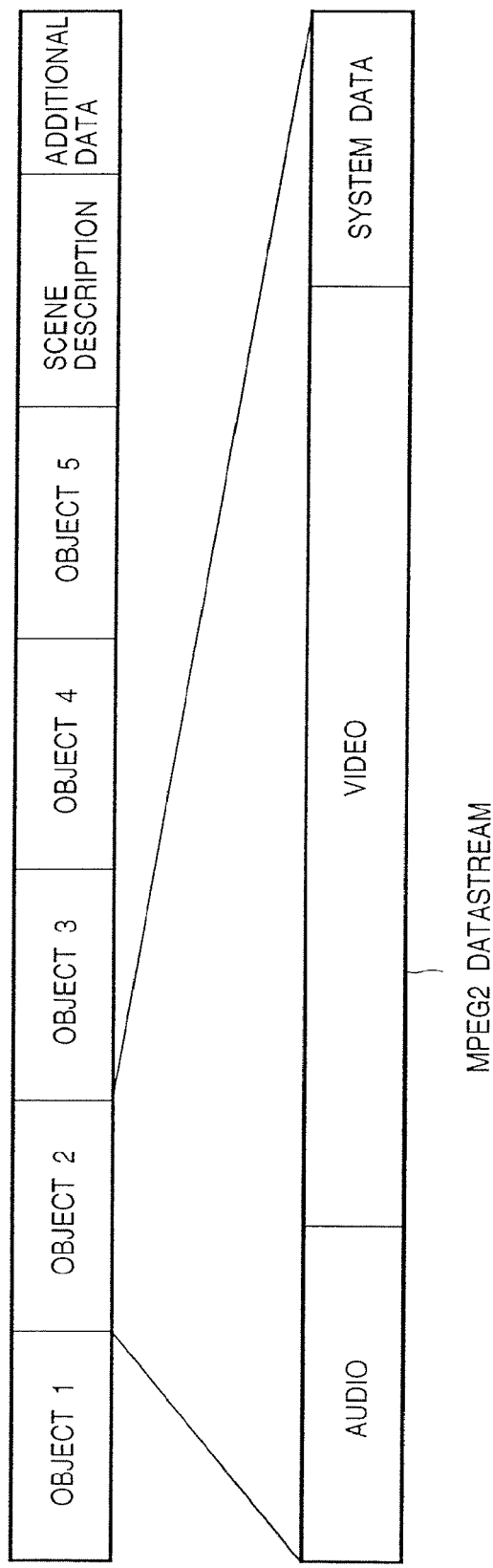
FIG. 28 is a view showing an example of an MPEG 4 bitstream containing an MPEG 2 image.

A case will be explained below using FIG. 23 wherein video data of MPEG 4 TV broadcast containing an MPEG 2 image is displayed using the layout setting method described in the first embodiment. In the second embodiment, assume that the spot relay image 102 shown in FIG. 23 is an MPEG 2 image. That is, FIG. 23 shows a video display example of MPEG 4 TV broadcast containing an MPEG 2 image. FIG. 28 shows an example of an MPEG 4 bitstream at that time.

The MPEG 4 bitstream shown in FIG. 28 is multiplexed with data (an MPEG 2 datastream) of the spot relay image 102 as object 2. The MPEG 2 datastream normally consists of three types of data, i.e., audio data, video data, and system data (MPEG 2 additional information). In object 2, the MPEG 2 datastream segments each having a predetermined size are multiplexed in accordance with predetermined timing adjustment that pertains to transmission. Since some MPEG 4 encoding/decoding circuits have downward compatibility to MPEG 2, common circuits are used if necessary so as to avoid wasteful use of resources that pertain to encoding/decoding.

In this manner, a layout can be set even for MPEG 4 TV broadcast containing image and sound data encoded by MPEG 2, as has been described in the first embodiment.

Also, the time indication image 103 shown in FIG. 23 may be the one generated by the TV broadcast receiving apparatus. In such case, the character generation circuit 40 can generate the time indication image 103 using time data serving as basis of time indication, which is sent from the sender side such as the broadcast station or clock signals in the TV broadcast receiving apparatus. The time data is contained in the additional data, and the time indication image 103 is generated using this time data. Furthermore, when the additional data includes a time indication command that instructs time indication using internal clocks of the TV broadcast receiving apparatus, or when the system controller 38 has issued a unique time indication command, the time indication image 103 is generated based on the internal clocks. Note that the character generation circuit 40 and the memory 42 that stores character data actually generate the time indication image 103, i.e., have a role of character generation, the display controller 34 synthesizes the generated images, and the system controller 38 controls them to generate and display the time indication image 103.

Note that the same operation can be implemented using time stamp data contained as one information in a sub code of the MPEG 2 datastream.

Furthermore, since a relatively simple image such as the weather forecast image 104 shown in FIG. 23 can be displayed using CG data, the sender side need only send a command indicating an object to be displayed, and the receiver side makes operations for generating character and CG data so as to appropriately generate and display a weather forecast image or the like. In this manner, the load on transmission (communication) can be reduced, and the transmission efficiency can be improved.

Of course, according to this embodiment, a display image generated by character &CG generation can be handled in the same manner as other objects, and can be freely laid out.

As for layout setups of a display image, when the size of an object is adjusted or the sound volume, sound field lateralization, or the like is set by converting into data the shift amount or change point of an object for which layout has been changed by the user on the basis of object layout information basically obtained from scene description information, position data or control data of each unit used at that time is stored as layout setting data in the same manner as in the first embodiment described with reference to FIGS. 20 and 21.

Figure 29:
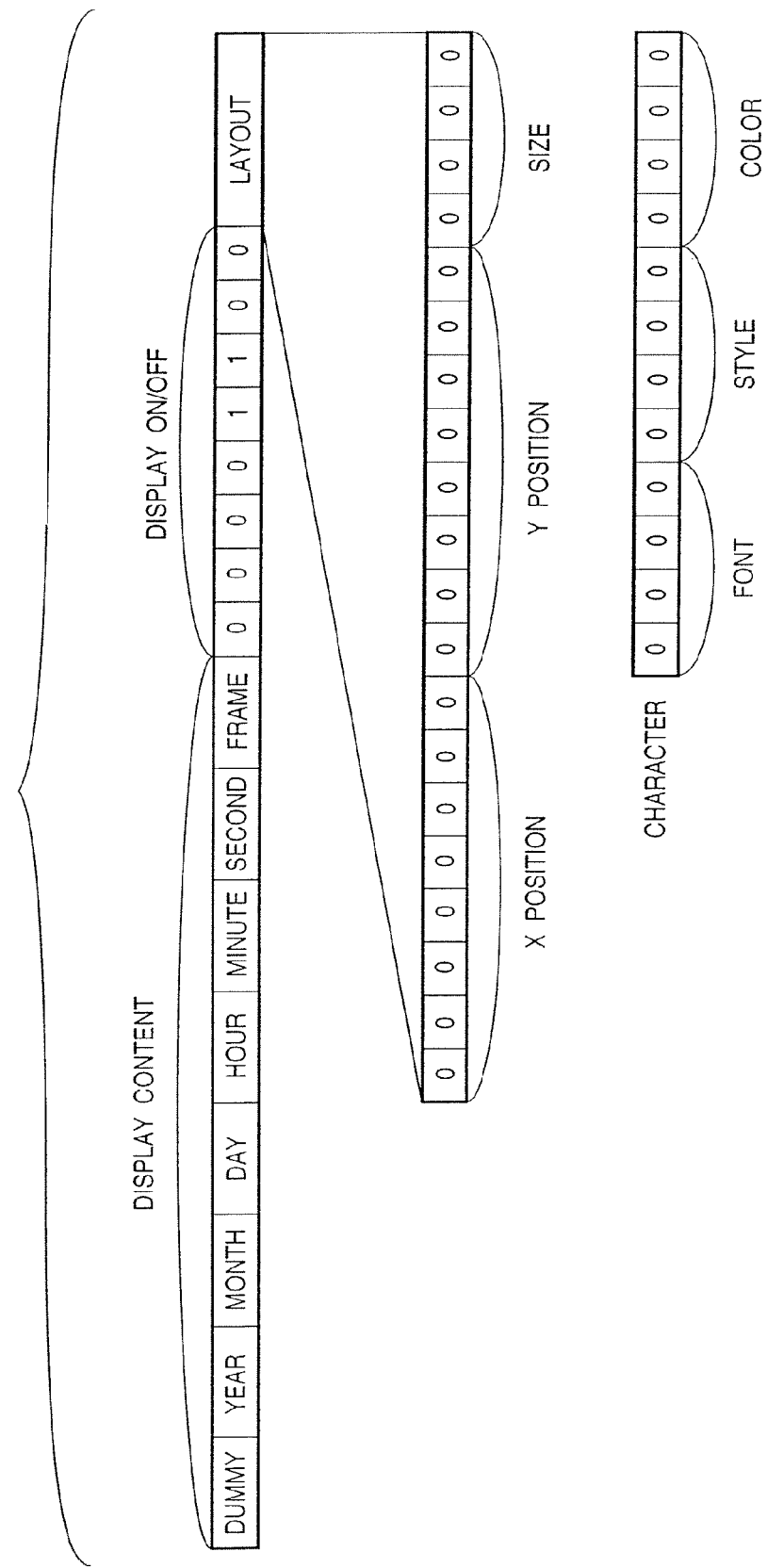
FIG. 29 is a view showing the format of time data and its setting data upon setting display of a time indication image in more detail.

The format of the layout setting data has already been explained using FIG. 22. FIG. 29 shows an example of the format of time data and its setup data used when display of the time indication image 103 is set in more detail.

The time data shown in FIG. 29 has ON/OFF flags indicating display/non-display of display contents, i.e., (dummy), year, month, day, hour, minute, second, and display frame (number). In this manner, time information to be displayed on a given image can be set in detail. Furthermore, by holding display data upon two-dimensionally expressing display position by the x- and y-axes, and data indicating size, the time data can be used as layout setting data. As additional data, unique data to be added as character options such as a font, style, color, alignment, and the like may be held in terms of display of character information such as time or the like.

Since the second embodiment is applied to MPEG 4 TV broadcast multiplexed with an MPEG 2 image, when the system of the second embodiment is combined with an image relay system used to relay MPEG 2 contents, e.g., a live image from a given spot, the output from an MPEG 2 device can be used in the MPEG 4 broadcast system without requiring complicated data conversion, and such system is easy to use due to affinity between MPEG 2 and MPEG 4. The present invention can be applied not only to a relay image but also to a multiplexed image output example such as reference video display using a DVD as a typical MPEG 2 video device or an example using another MPEG 2 device.

Since there are a large number of encoding/decoding circuits that can be commonly used for MPEG 2 and MPEG 4, no complicated circuit arrangement is required in addition to high system efficiency. Of course, the system efficiency can be improved even in case of a software decoder. In the second embodiment, an MPEG 2 datastream is multiplexed as one MPEG 4 object. Also, when layout information is multiplexed as additional data in MPEG 2 system data, the same effect can be provided.

Furthermore, according to the second embodiment, since TV information encoded by MPEG 2 can also be used in an MPEG 4 TV system in addition to the effect of the first embodiment, existing contents can be directly used, and MPEG 2 data need not be converted into MPEG 4 data, thus providing a very effective system which is easy to use.

In this manner, digital TV broadcast can be easily combined with a personal computer (PC), and layout setups which are currently done on the desktop of a PC can also be used to customize TV video data. Hence, compatibility between TV broadcast and PC can be improved, and the market in the field of digital hybrid products can be expected to be broadened.

Third Embodiment

[Arrangement]

Figure 30:
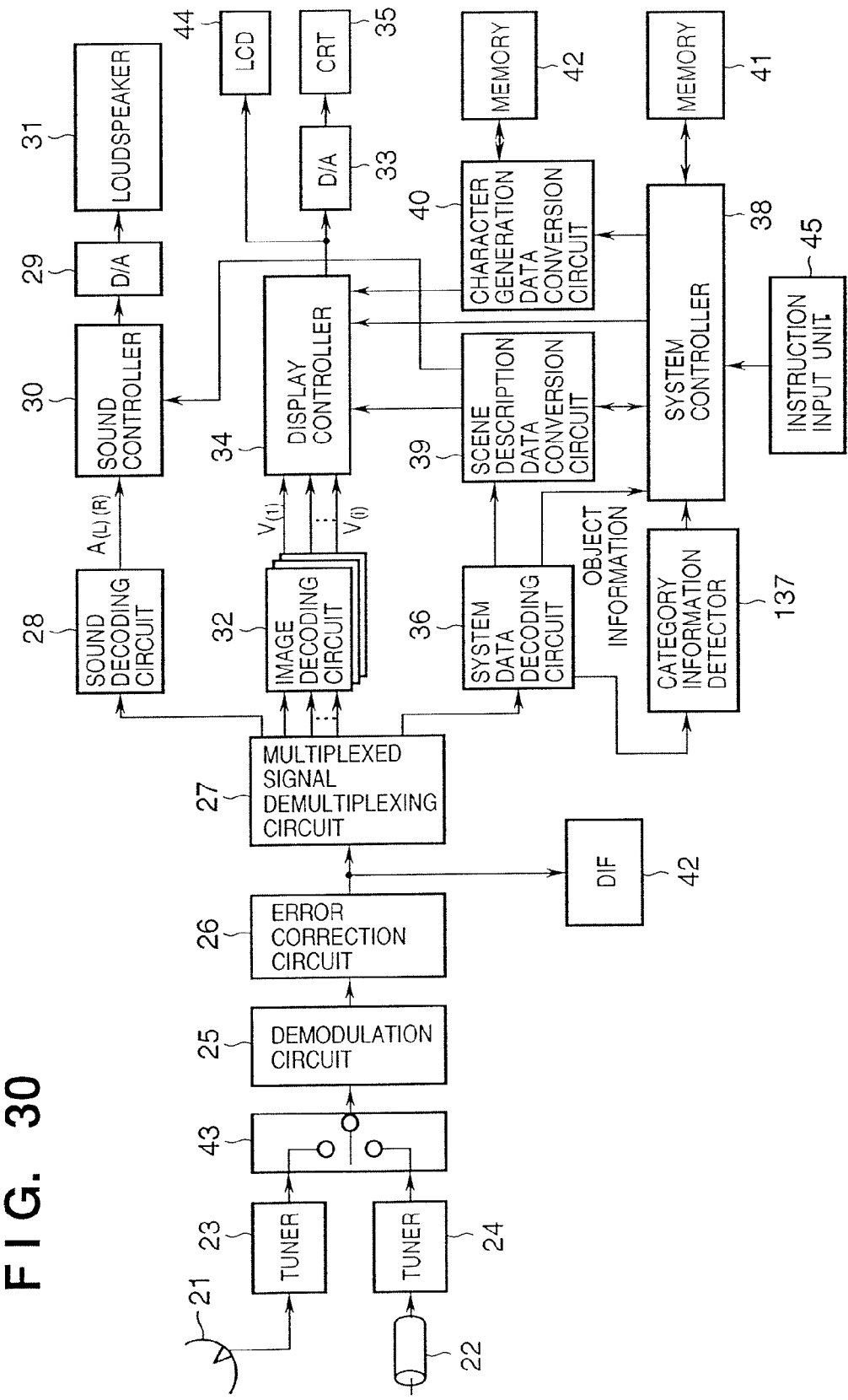
FIG. 30 is a block diagram showing the arrangement of a TV broadcast receiving apparatus according to the third embodiment of the present invention.

A TV broadcast receiving apparatus according to the third embodiment of the present invention will be described in detail below with reference to the accompanying drawings. FIG. 30 is a block diagram showing the arrangement of a TV broadcast receiving apparatus of the third embodiment. Note that the same reference numerals in the third embodiment denote the same parts as those in the first embodiment, and a detailed description thereof will be omitted.

In the third embodiment as well, system data (including scene description data and additional data) is decoded by the system data decoding circuit 36. A category information detector 137 detects category information appended to a program from the decoded system data. The detected category information is input to the system controller 38, which generates commands in layout setups with reference to this information. Also, of the decoded system data, data that pertains to scene description is input to the scene description data conversion circuit 39. The remaining system data (including object information that represents the contents of objects by commands) are input as various commands to the system controller 38. Note that the additional data may contain a document or the like such as a title index of a program or the like.

Object information is assigned to each object like a title by a command set commonly used by respective TV stations. Upon reception, the contents of the object can be discriminated and classified by analyzing the object information. This embodiment implements a layout setting function for laying out an object having designated object information at a set position using the object information.

Using the scene description data obtained by the scene description data conversion circuit 39, layout and composition of objects in the display controller 34, and setups of the sound volume, sound field lateralization, and the like in the sound controller 30 are made. By adjusting the scene description data conversion circuit 39 and controlling the display controller 39 under the control of the system controller 38, objects can be laid out at positions different from a basic layout, i.e., layout control upon setting an arbitrary layout can be done. The layout setting method will be explained later.

The user can input various commands via the instruction input unit 45. Position adjustment in a layout setting process can be done based on the user instruction input. That is, correction of the layout position and input of new setting values are made via the instruction input unit 45. The system controller 38 appropriately controls the operations of the respective units in accordance with input instruction values to obtain a desired output (display, reproduction) pattern.

[Layout Setups]

Layout setups for setting objects at predetermined positions in units of categories by discriminating category information can be implemented by two methods. The first method sets a layout using layout setting data held as a pre-programmed factory default in the memory 41. The second method uses layout setting data of layouts which are arbitrary set by the user and held in the memory 41 in units of categories.

Since the layout setting method has already been exemplified in the first embodiment, a detailed description thereof will be omitted.

Object information used to discriminate an object to be processed is necessary as a part of layout setting data. A display process is controlled by the system controller 38, and control data at that time, object information for discriminating the object to be processed, and layout setting data are held in the memory 41 as user layout setting data corresponding to a given category.

TV broadcast data contains category information. Using this category information, layouts set in units of programs can be converted into data in correspondence with category information, and the converted data can be stored as layout setting data. As the storage location of layout setting data, the nonvolatile memory 41 such as an EEPROM or the like is used. Upon detection of category information stored in the memory 41 from TV broadcast data, the system controller 38 controls the scene description data conversion circuit 39 and display controller 34 on the basis of the layout setting data corresponding to the detected category information to make image display and sound reproduction in a layout set by the user.

Layout setting data will be explained next. As layout setting data, default setting data which is pre-programmed and held, and data set by the user are available. As the user setting data, the object position upon setting a layout by the user is converted into data in addition to object layout information on the basis of the object layout information obtained from scene description data, and the converted data is stored as layout setting data together with control data of respective units and object information to be processed. As has already been described previously with reference to FIG. 12, the scene description data is information for laying out objects that form each scene in a tree pattern, and designating the display times and positions of the individual objects.

As another format of layout setting data, as shown in FIG. 22, when ON/OFF data indicating whether or not the object of interest is displayed, display position data obtained when the display position is two-dimensionally expressed by the x- and y-axes, and data indicating size are held, they can be used as layout setting data.

In the general format of an MPEG 4 bitstream shown in FIG. 24, the program contents, photo image object, sound object, CG object, and the like (although the types of objects vary depending on programs) are multiplexed in a database of objects 1 to 4. For example, in a live program of a baseball game, these objects correspond to a background object (sprite), photo image objects of players and the like, a synthetic image object of score indication, a sound object, and the like. In addition, scene description information and additional data are multiplexed as system data in the bitstream. The additional data includes category information and object information.

Figure 31:
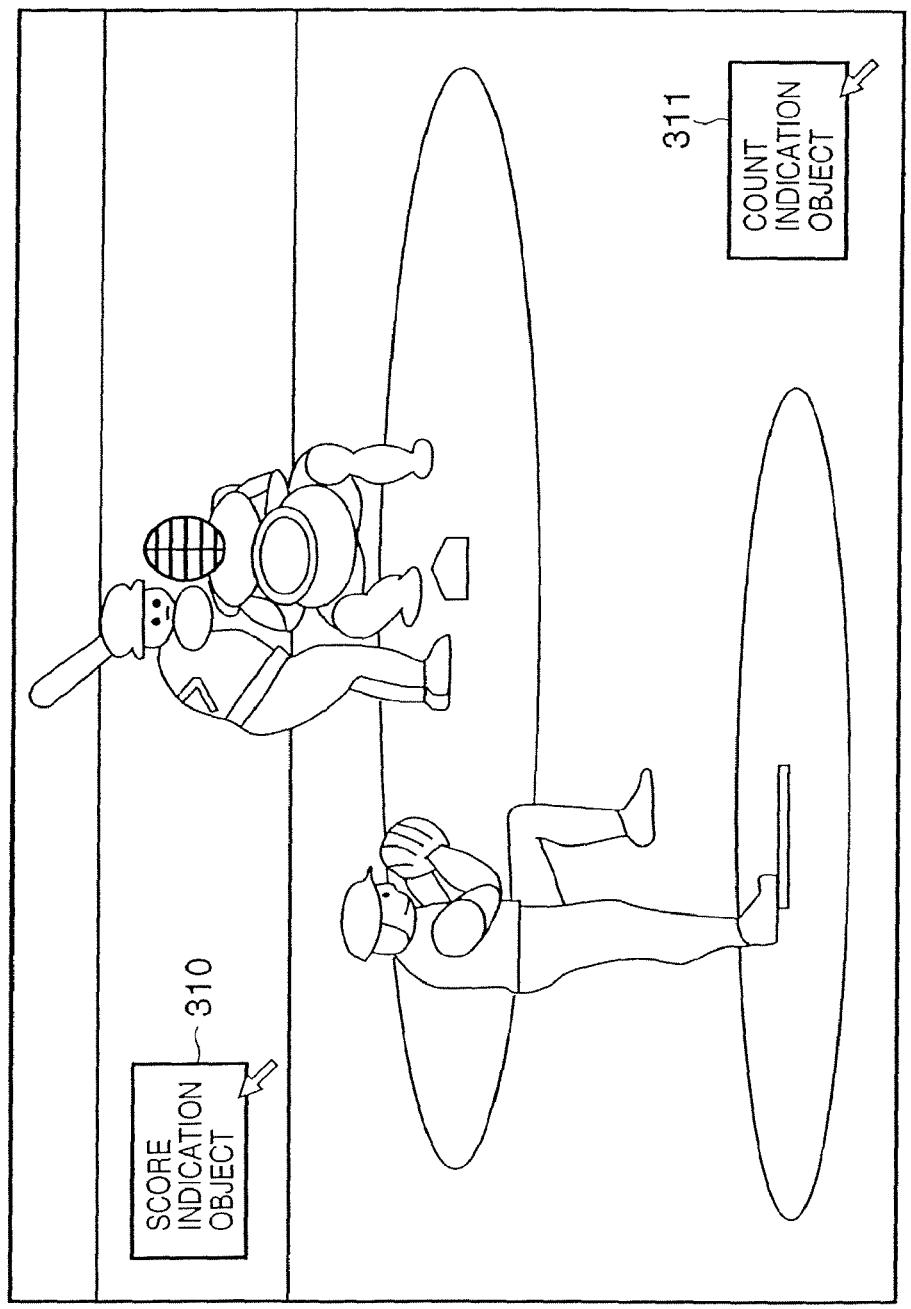
Figure 32:
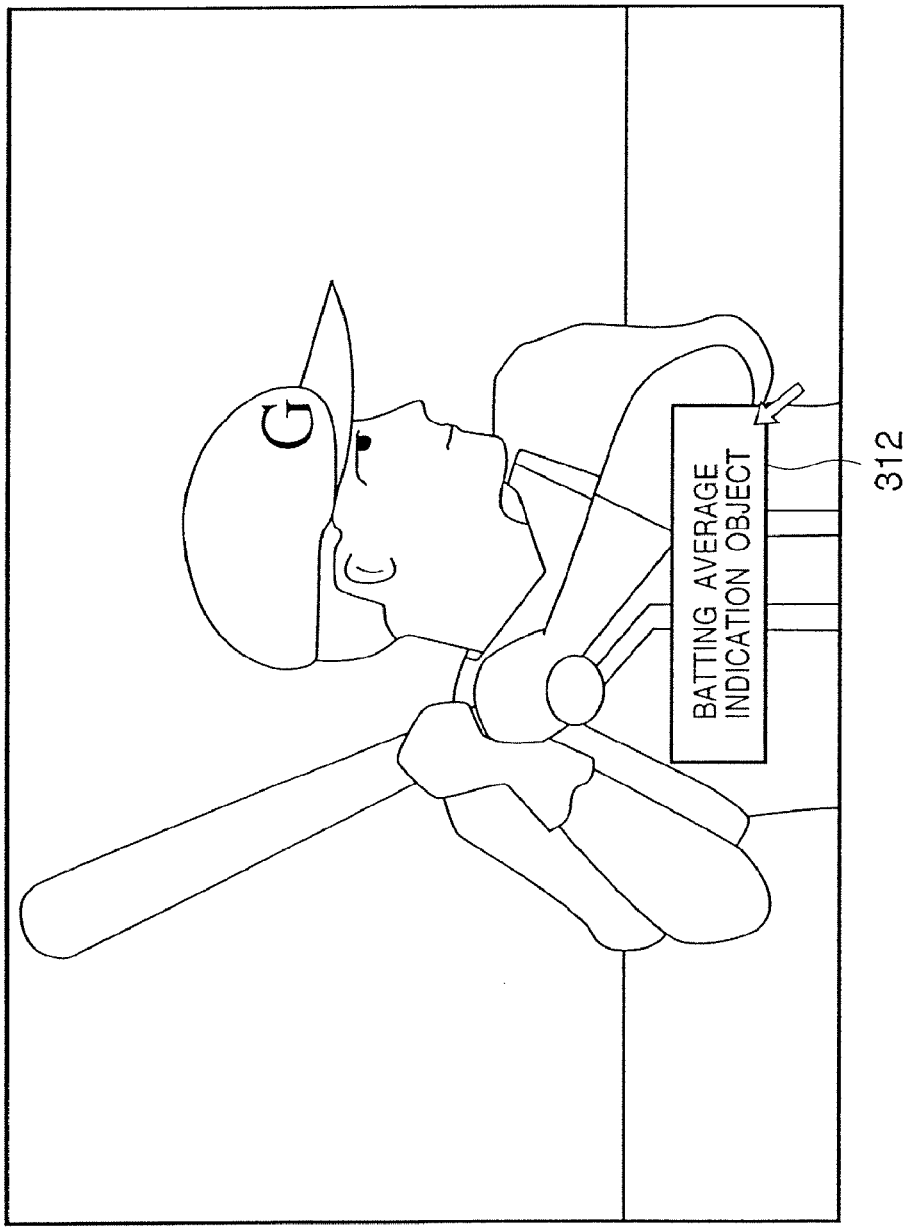
Figure 33:
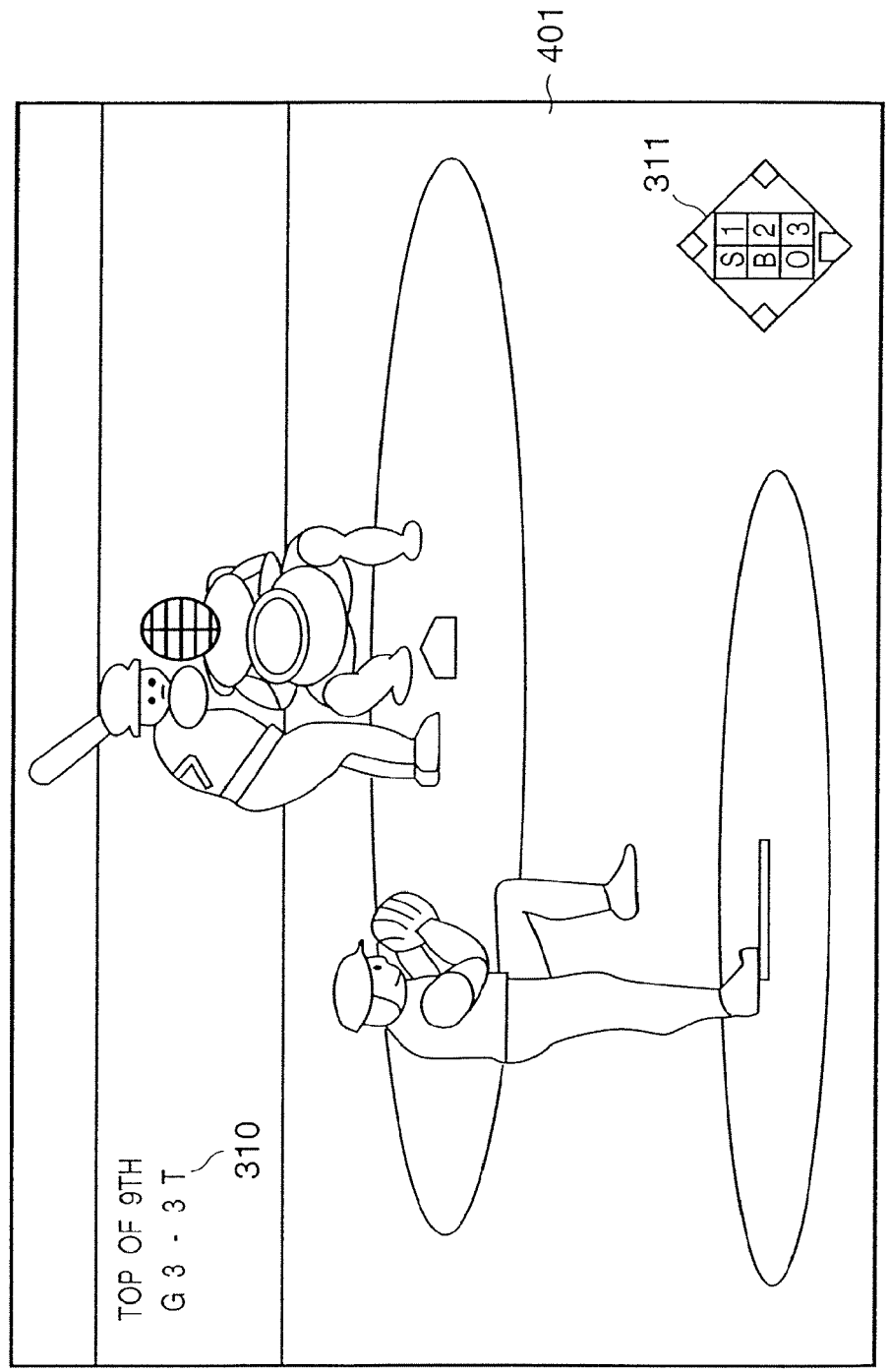

FIGS. 31 and 32 show frame setup examples in a live program of a baseball game, and FIGS. 33 and 34 show display example of the live program of the baseball game.

In the live program of the baseball game, assume that objects for which a layout can be set include a score indication object 310 and count indication object 311 shown in FIGS. 31 and 33, and a batting average indication object 312 shown in FIGS. 32 and 34. Since these three objects are indispensable in the live program of the baseball game, but their display positions vary depending on broadcast stations, these objects are suitable upon setting a layout. These objects are synthetic image objects created by CG data or the like, but this embodiment is not limited to specific object types.

After the layout setting mode is started, the user can lay out these objects at arbitrary positions on the TV screen, i.e., desired positions or easy-to-see positions by the aforementioned method while watching the screen.

In this manner, using the layout setting function of this embodiment, the score indication object 310, count indication object 311, and batting average indication object 312 can be displayed at default positions or positions set by the user in units of timings (scenes) at which those objects are displayed, as shown in one scene of the live program of the baseball game shown in FIGS. 31 to 34. This layout display is set independently of broadcast stations.

Once the layout setting data is held, the layout setting function operates upon detection of identical category information, and an object to be processed is discriminated from object information. If the object to be processed is detected, it is automatically displayed at a position based on the held layout setting data at that display timing (scene). When the data configuration of object information varies in units of broadcast stations, the object information may be re-set.

[Operation Sequence]

Figure 35:
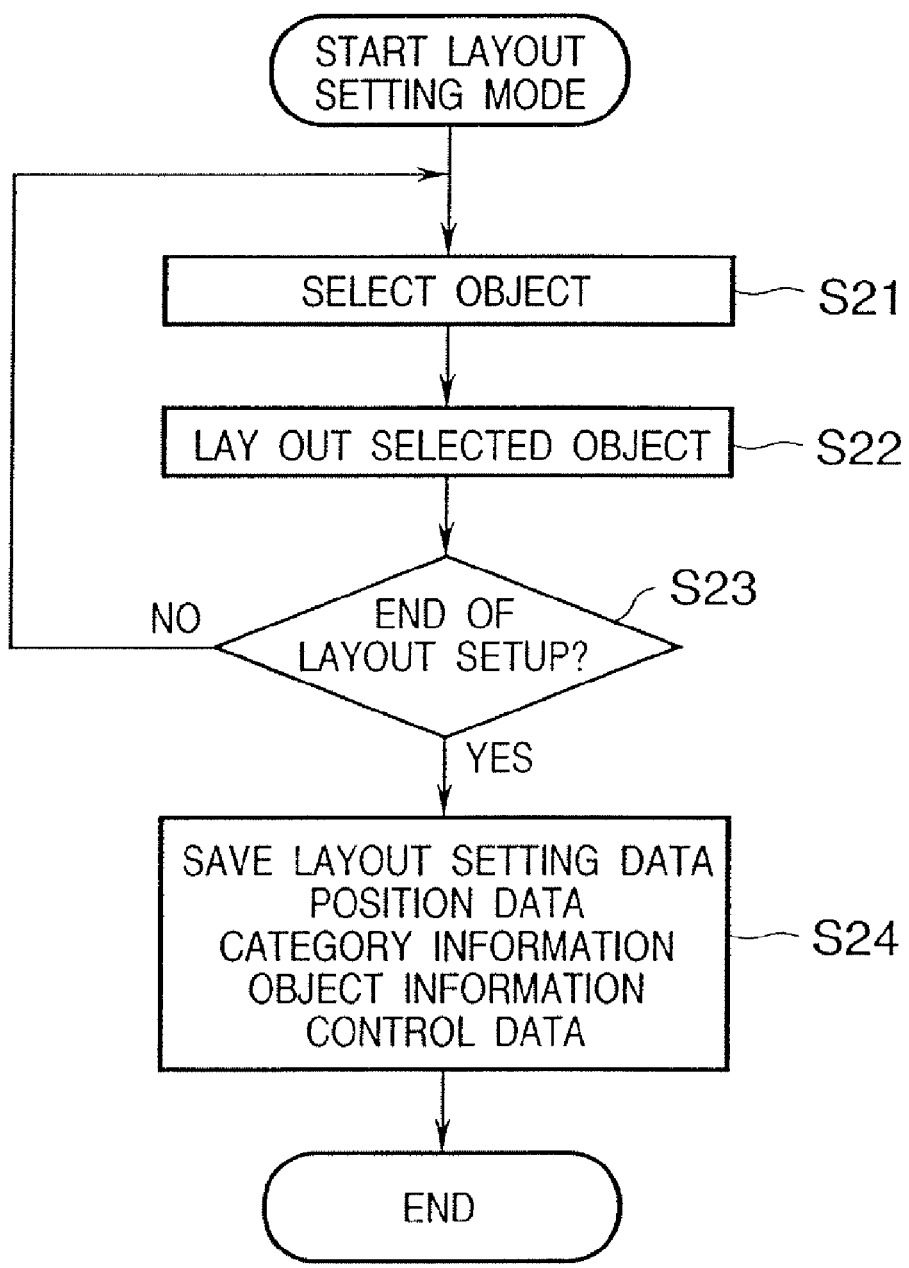
FIGS. 35 and 36 are flow charts for explaining the operation sequence of the TV broadcast receiving apparatus according to the third embodiment.
Figure 36:
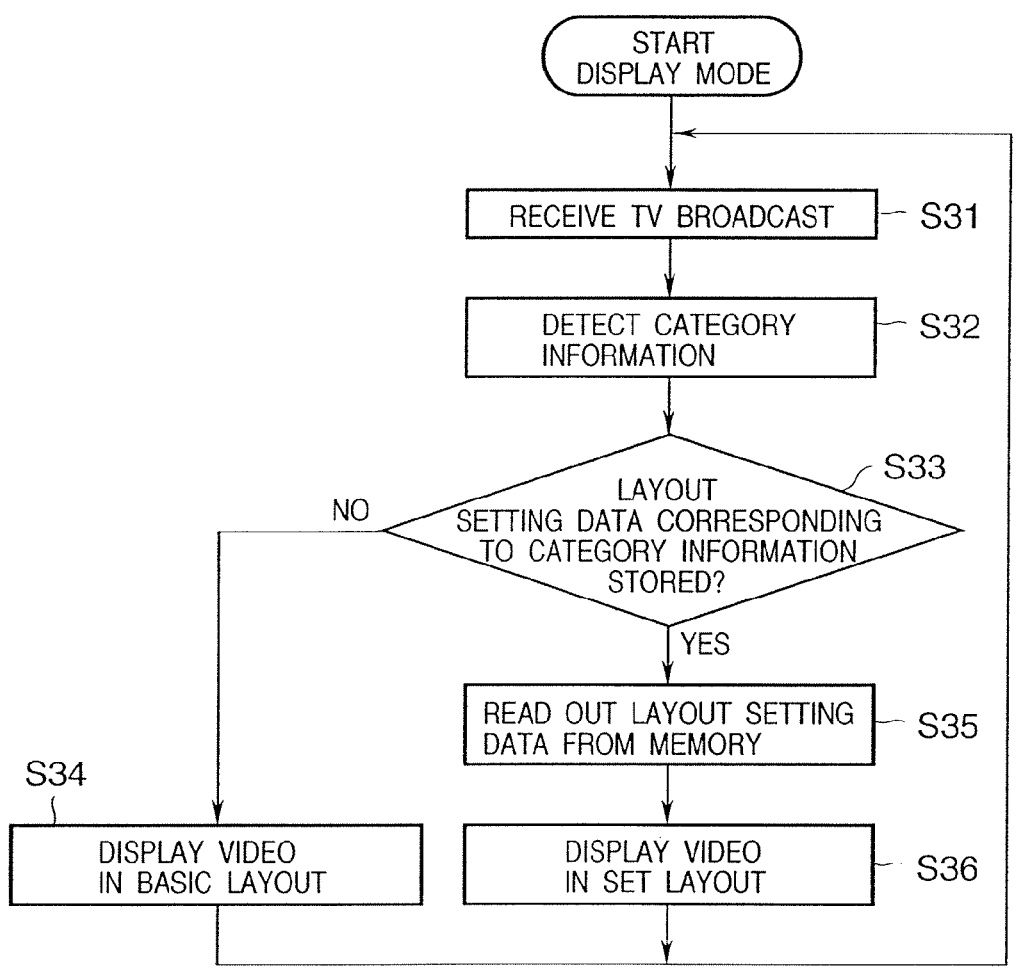

FIGS. 35 and 36 are flow charts for explaining the operation sequence of the TV broadcast receiving apparatus of this embodiment FIG. 35 shows the flow upon setting a layout by the user, and FIG. 36 shows the flow upon displaying TV video data.

In the layout setting mode shown in FIG. 35, an object for which a layout is set is selected from objects which form image data in TV information (step S21). The user lays out the selected (designated) object at an arbitrary position (step S22). Upon completion of layout of the selected object, it is checked if layout setups are to end (step S23). if a layout is to be set for another object, the flow returns to step S21 to repeat selection and layout of an object. Upon completion of layout setups, the positions of the objects for which the layout has been set are converted into data. Then, category information, object information, position data, and control data for the respective units of those objects are combined, and are stored as layout setting data in the memory 41 (step S24).

In the display mode shown in FIG. 36, TV information is received (step S31), and category information of a program is detected from system data appended to the TV information (step S32). The category information is sent from each broadcast station by appending information corresponding to the category (genre) of a program to system data using a command set or the like common to the respective broadcast stations, and is used to roughly classify the contents of programs. If program category information varies in units of broadcast stations, a re-setting means may be inserted to attain consistency among the broadcast stations.

It is then checked if layout setting data corresponding to the detected category information has already been saved (step S33). If no layout setting data is saved in correspondence with the category information, video data of TV broadcast is displayed in a basic layout sent from the broadcast station (step S34).

On the other hand, if layout setting data is saved in correspondence with the category information, the layout setting data corresponding to the detected category information is read out from the memory 41 (step S35), and the system controller stands by to start control for changing the layout of the object to be processed when object information recorded in that layout setting data appears. Hence, in step S36, objects other than those for which the layout is to be changed are displayed in the basic layout, and a given object for which the layout is to be changed is displayed in the set layout at a display timing (scene) of that object.

The display state in step S34 or S36 is maintained until the program comes to an end or the user selects another channel to start reception of a new program. When reception of a new program is started, the current layout is reset, and the flow repeats itself from the initial state of TV broadcast reception in step S31.

The third embodiment has exemplified the "live program of the baseball game" as a category of a program. However, the present invention is not limited to such specific category and can be similarly applied to a "live program of a soccer game" or categories of programs other than sports.

As described above, according to the third embodiment, the viewer of digital TV broadcast can arbitrarily set the layout of objects in correspondence with category information of a program. Hence, video display can be made in correspondence with the category of a program and user's favor, the quality of the audiovisual user interface can be improved, and more flexible TV program display can be presented to the user.

When a layout is set for each category information of a program with reference to object information that indicates the contents of an object, the layout can be set for only a designated object by making classification and layout control of objects.

Programs of an identical category can be prevented from being displayed in different layouts depending on broadcast stations, and common objects can be displayed in a layout standardized in units of program categories independently of broadcast stations.

Fourth Embodiment

A TV broadcast receiving apparatus according to the fourth embodiment of the present invention will be explained below. Note that the same reference numerals in the fourth embodiment denote the same parts as those in the first to third embodiments, and a detailed description thereof will be omitted.

The fourth embodiment will explain layout setups of objects in TV broadcast that uses an image encoded by a coding scheme other than MPEG 4, e.g., an MPEG 2 image, as one MPEG 4 object instead, as in the second embodiment.

A case will be exemplified below with reference to FIG. 33 wherein video display of MPEG 4 TV broadcast including an MPEG 2 image is made using the layout setting method described in the third embodiment. In the fourth embodiment, assume that a relay image 401 as an image of the entire baseball live program, which includes a background and players, as shown in FIG. 33, is an MPEG 2 image. The score indication object 310, count indication object 311, and objects other than those described above according to the progress of the game as other objects are MPEG 4 data. That is, FIG. 33 shows a video display example of MPEG 4 TV broadcast including an MPEG 2 image. FIG. 28 shows an example of an MPEG 4 bitstream at that time.

The MPEG 4 bitstream shown in FIG. 28 is multiplexed as object 2 with data of the baseball live image 401 as an MPEG 2 datastream. The MPEG 2 datastream normally consists of three types of data, i.e., audio data, video data, and system data (MPEG 2 additional information). In object 2, the MPEG 2 datastream segments each having a predetermined size are multiplexed in accordance with predetermined timing adjustment that pertains to transmission. Since some MPEG 4 encoding/decoding circuits have downward compatibility to MPEG 2, common circuits are used if necessary so as to avoid wasteful use of resources that pertain to encoding/decoding.

In this manner, a layout can be set even for MPEG 4 TV broadcast containing image data and/or sound data encoded by MPEG 2, as has been described in the third embodiment.

As for layout setting data of a display image, as in the third embodiment, position data of an object for which the layout has been changed by the user is calculated on the basis of object layout information obtained from scene description information, and is stored as layout setting data in correspondence with category information of a program, object information to be processed, and control data for the respective units. Also, operations that pertain to display are the same as the third embodiment.

According to the fourth embodiment, in addition to the effects of the third embodiment, since TV information encoded by MPEG 2 can be used in the MPEG 4 TV system, existing contents can be directly used, and MPEG 2 data need not be converted into MPEG 4 data, thus providing a very effective system which is easy to use.

Fifth Embodiment

[Arrangement]

Figure 37:
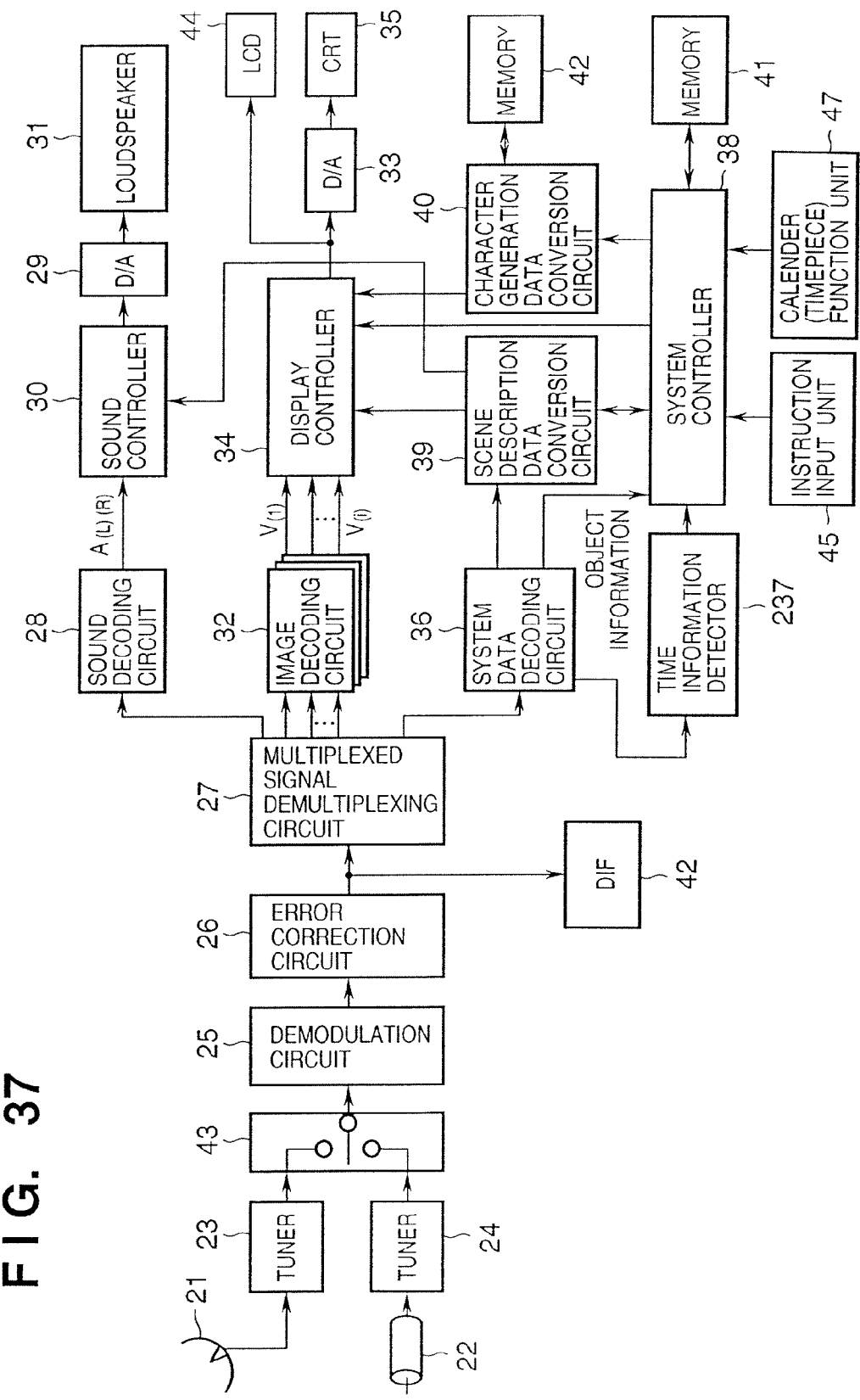
FIG. 37 is a block diagram showing the arrangement of a TV broadcast receiving apparatus according to the fifth embodiment of the present invention.

A TV broadcast receiving apparatus according to the fifth embodiment of the present invention will be described in detail below with reference to the accompanying drawings. FIG. 37 is a block diagram showing the arrangement of a TV broadcast receiving apparatus of the fifth embodiment. Note that the same reference numerals in the fifth embodiment denote the same parts as those in the first embodiment, and a detailed description thereof will be omitted.

In the fifth embodiment as well, system data (including scene description data and additional data) is decoded by the system data decoding circuit 36. A time information detector 237 detects time information (clock data) included in additional information in the system data from the decoded system data. The detected time information is input to the system controller 38, which generates commands in layout setups with reference to this information. Also, of the decoded system data, data that pertains to scene description is input to the scene description data conversion circuit 39. The remaining system data (including object information that represents the contents of objects by commands) are input as various commands to the system controller 38. Note that the additional data may contain a document or the like such as a title index of a program or the like.

Object information is assigned to each object like a title using a command set (code) common to the respective TV stations, a command set (code) set for each station, or the like. Upon reception, by analyzing the object information, the contents of the corresponding object can be discriminated and classified. This embodiment implements a layout setting function for laying out an object having designated object information at a set position using the object information.

Using the scene description data obtained by the scene description data conversion circuit 39, layout and composition of objects in the display controller 34, and setups of the sound volume, sound field lateralization, and the like in the sound controller 30 are made. By adjusting the scene description data conversion circuit 39 and controlling the display controller 39 under the control of the system controller 38, objects can be laid out at positions different from a basic layout, i.e., layout control upon setting an arbitrary layout can be done. The layout setting method will be explained later.

When a display image which is not received as an object, for example, a time indication frame, title index, or the like is generated inside the receiving apparatus, the character generation circuit 40 is used. Under the control of the system controller 38, a time indication character is generated using the memory 42 such as a ROM or the like that stores character data, on the basis of time data contained in the additional data, time information acquired from a calendar (timepiece) function unit 47 in the receiving apparatus, or the like. The same applies to a title index. The generated image is synthesized in the display controller 34.

[Layout Setups]

Layout setups in this embodiment are classified based on the time base as a combination of units such as a time band, days of the week, or the like. Upon making actual display in the set layout, if layout setting data classified in a time band including the current time is found, predetermined setting operation is executed in correspondence with the found data. There are two sources of time information used to discriminate the current time, which serves as a key upon classifying layout setups. One source is the calendar (timepiece) function unit 47 in the receiving apparatus, and the other source is time information contained in the system data. This embodiment can be implemented using either one of these sources.

A layout setup that displays a designated object contained in an image in a predetermined layout in correspondence with a predetermined time band or day of the week can be executed by the following method. That is, layout setting data arbitrarily set by the user are held in the memory 41 while being classified based on predetermined time bands or days of the week, and are used.

Since the layout setting method has already been exemplified in the first embodiment, a detailed description thereof will be omitted. Object information used to discriminate an object to be processed is necessary as a part of layout setting data. The display process is controlled by the system controller 38, and control data at that time, object information for discriminating the object to be processed, layout setting data, and a time unit command of the time band or day of the week at which the set layout display is executed are input and held in the memory 41 as user layout setting data in correspondence with each other.

Figure 38:
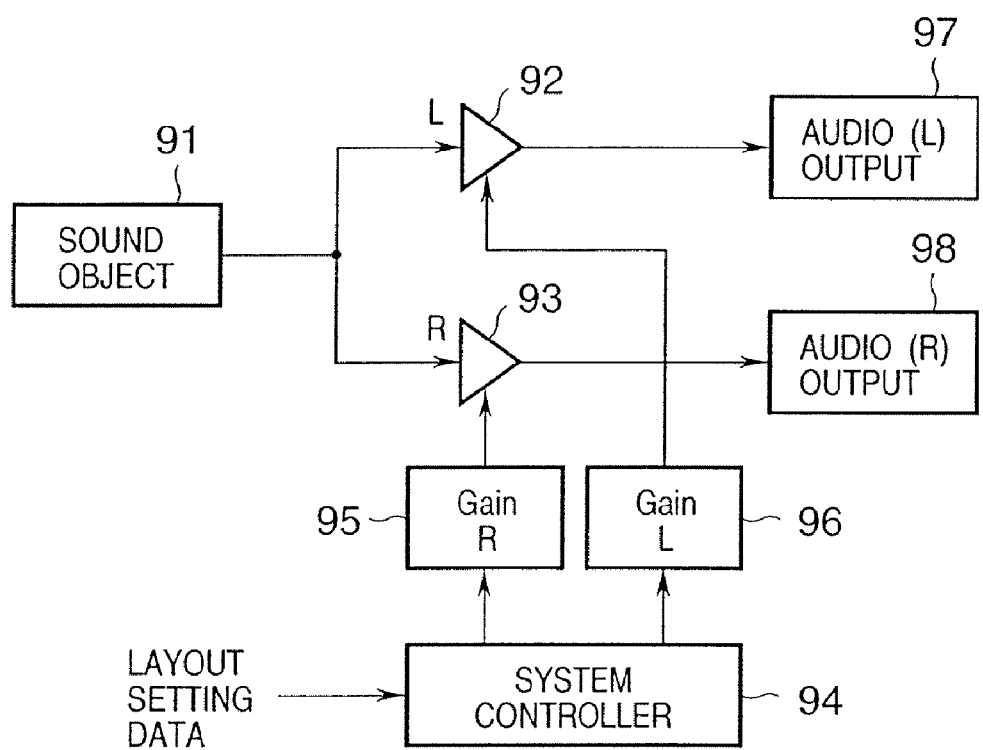
FIG. 38 is a diagram for explaining output control of a sound object in accordance with layout setting data.

A process for a sound object will be explained below. FIG. 38 is a diagram for explaining the output control of a sound object in correspondence with layout setting data. The right and left levels of an input stereo sound object 91 are respectively adjusted by amplifiers 93 and 92 on the basis of gains 95 and 96 controlled by a system controller 94. Audio (R) and (L) outputs 98 and 97 are obtained from the outputs of these amplifiers 93 and 92. When the system controller 94 adjusts the gains 95 and 96 in accordance with the layout setting data, the balance between the right and left audio output levels and the sound volume can be adjusted, and sound field lateralization between the right and left channels can be controlled. That is, by adjusting these gain values upon layout setups, a change in layout of the sound object is implemented. In this manner, the sound volume adjustment and sound field lateralization setups can be achieved.

Figure 39:
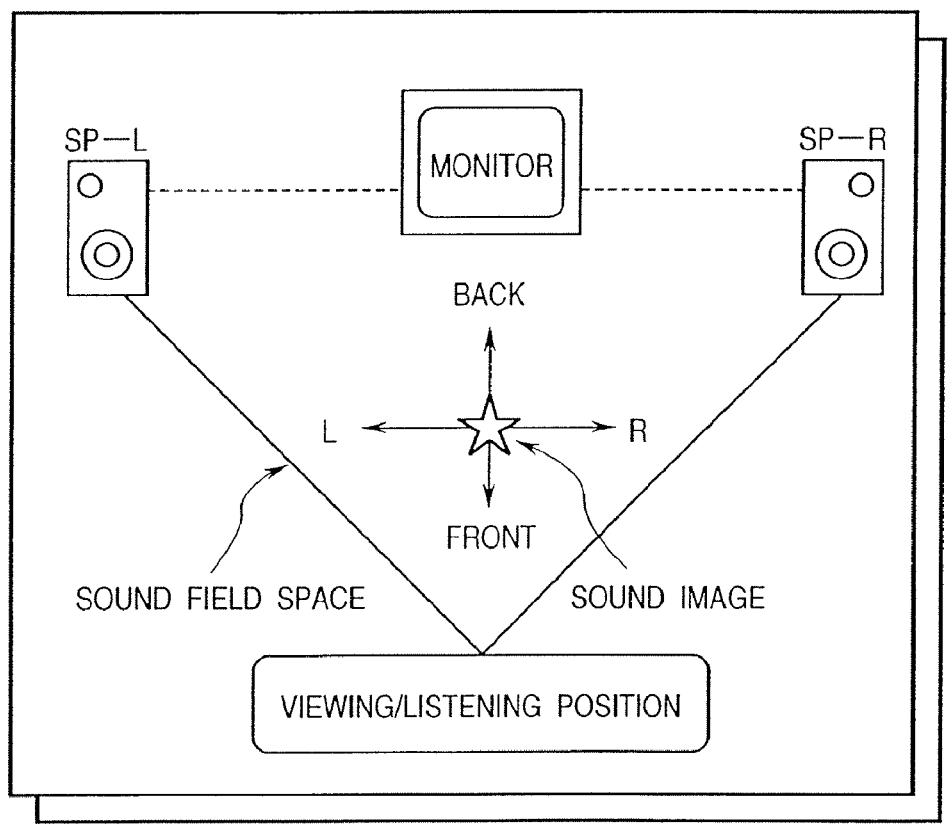
FIG. 39 is a view for supplementarily explaining a sound image and sound field lateralization.

A sound image and sound field lateralization will be supplementarily explained with reference to FIG. 39. Sound field lateralization is to form a sound image in a sound field space by adjusting the balance (ratio) between sound volumes output from the right and left loudspeakers (SP-R and SP-L) shown in FIG. 39 and the overall sound volume. The sound field space is located in a space that connects the viewing/listening position and the right and left loudspeakers, and the sound image moves on two axes, i.e., the right-and-left and back-and-forth axes and can be set at an appropriate position in the sound field space. By exploiting this concept, the right and left audio output levels (sound volume balance) and sound volume are adjusted based on layout setting data to adjust the outputs from the right and left loudspeakers, thus setting sound field lateralization upon change in layout. By adjusting phase and reverberation components using a surround speaker system or the like, sound field lateralization can be freely three-dimensionally set through 360°.

As described above, the user can set a layout. The set layout setting data can be stored while being classified in units of predetermined periods (time bands, days of the week, or the like). As the storage location of layout setting data, the nonvolatile memory 41 such as an EEPROM or the like is used. Upon detection of a time corresponding to the time band or day of the week set by the user to change the layout or to the default time band or day of the week from time information, the system controller 38 reads out layout setting data stored in the memory 41 and corresponding to the time band or day of the week. The system controller 38 controls the scene description data conversion circuit 39 and display controller 34 on the basis of the readout layout setting data to make image display and sound reproduction in a layout set by the user.

Figure 40:
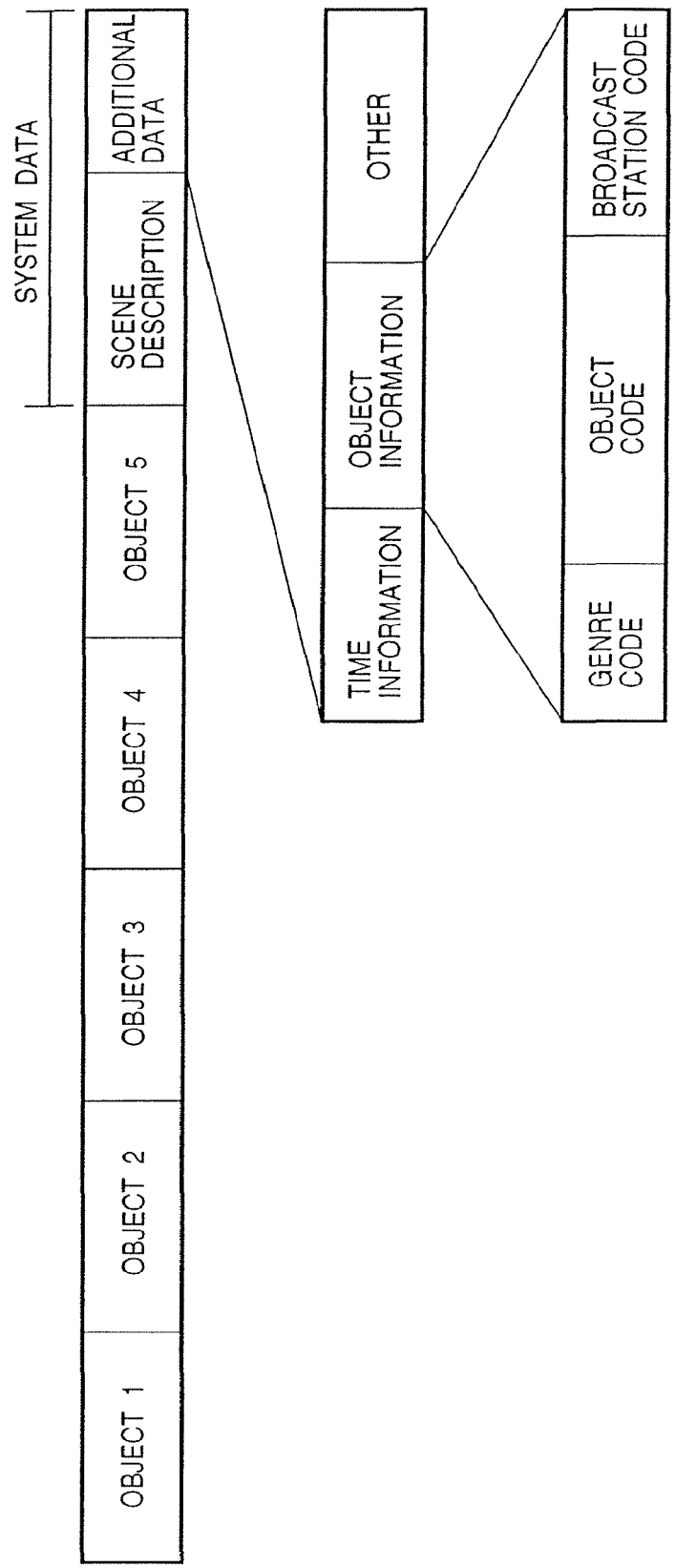
FIG. 40 shows the format of a general MPEG 4 bitstream.

FIG. 40 shows the format of a general MPEG 4 bitstream. The program contents, photo image object, sound object, CG object, and the like (although the types of objects vary depending on programs) are multiplexed in a database of objects 1 to 5. For example, in a news program, these objects correspond to a background object (sprite), photo image objects of a newscaster and the like, synthetic image objects such as a weather forecast, time indication, and the like, a sound object, and the like. In addition, scene description information and additional data are multiplexed as system data in the bitstream. The additional data includes time information, object information, and other information. Object information includes a genre code indicating a genre to which each of objects corresponding to objects 1 to 5 belongs, an object code indicating the details of the object, and a broadcast station code required when the object is unique to a given broadcast station.

Figure 41:
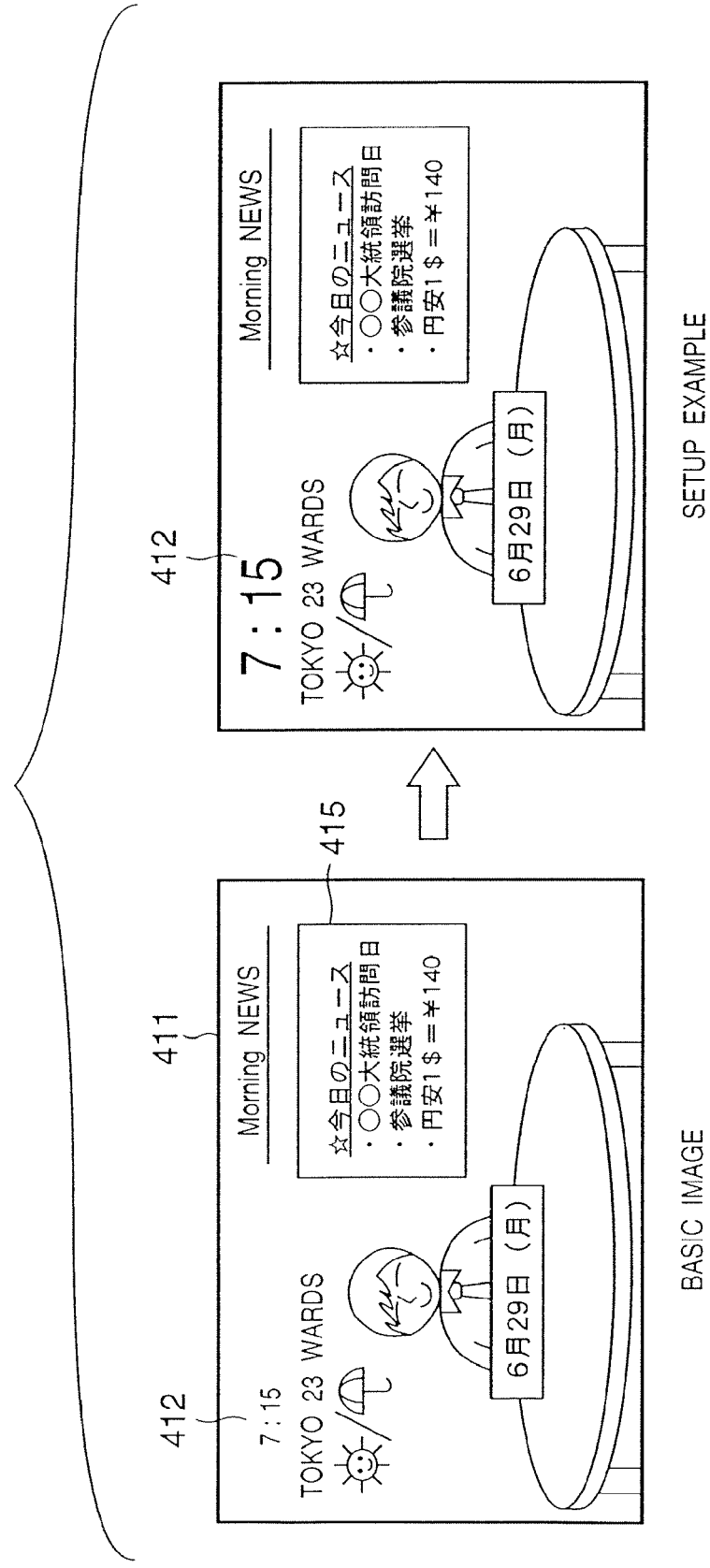
FIGS. 41 and 42 show video display layout examples according to the fifth embodiment.
Figure 42:
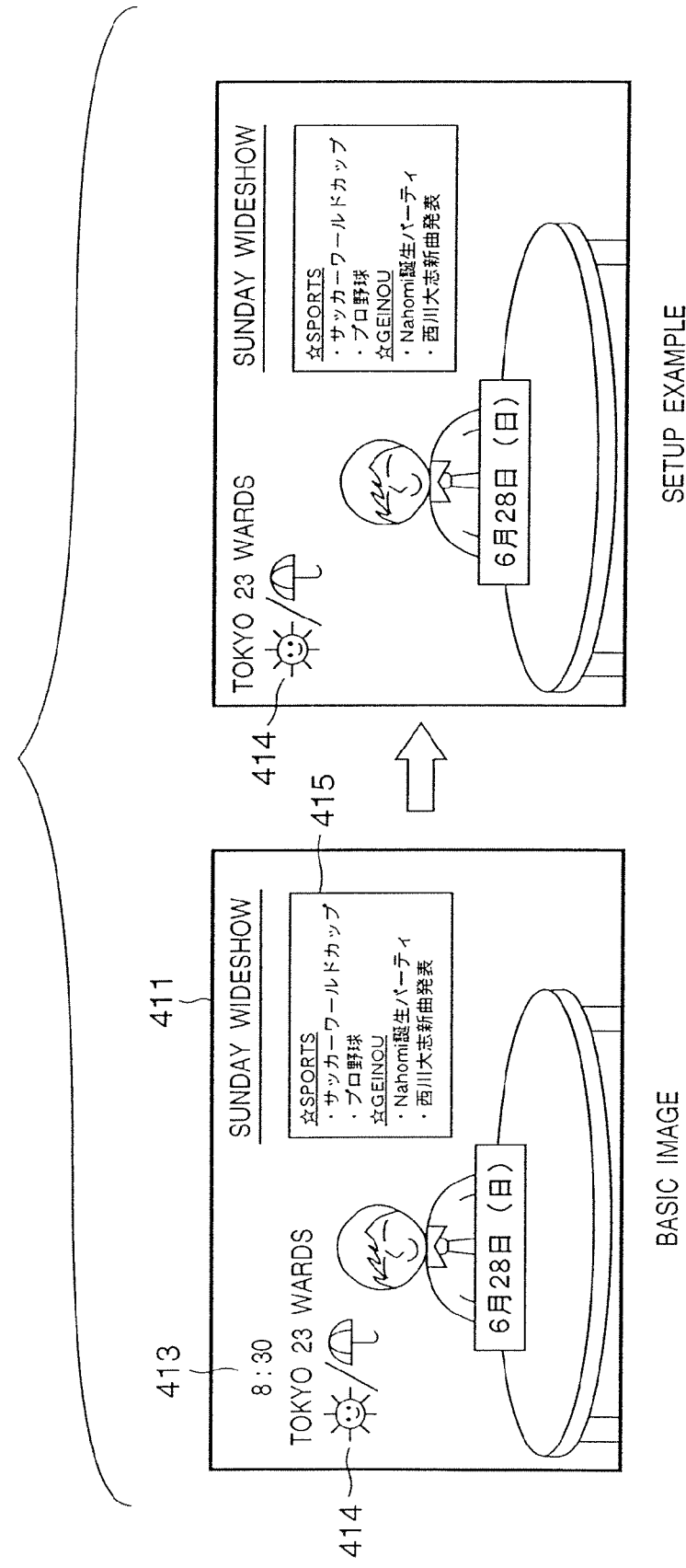

FIGS. 41 and 42 show frame setup examples by the user. After the layout setting mode is started, the user executes layout setups by the aforementioned method while watching the screen.

A basic image 411 shown in FIGS. 41 and 42 is obtained by normally displaying an image sent from the broadcast station. According to this embodiment, since a layout can be arbitrarily set, the user can set a layout in advance so that a time indication object 412 in the basic image 411 is displayed in an enlarged scale in the time band of weekday mornings (e.g., am 7 to 8), as shown in FIG. 41. Note that this time band can be arbitrarily set, as described above.

Also, the user can set a layout so that a time indication object 413 is cleared from the basic image 411, and a weather forecast object 414 is displayed in an enlarged scale at a changed position in the time band of holiday mornings, as shown in FIG. 42.

In this manner, the day of the week and time band can be appropriately combined with various objects, and a frame whose layout has been changed can be displayed in units of time bands to be set. Once the layout is set, when the current time is included in the set time band, the held layout setting data is read out to activate the layout change function. An object to be processed is discriminated based on its object information, and the layout is changed to automatically display that object at a predetermined position.

Note that the aforementioned layout setting data are not limited to those set by the user but may be default ones, which were set upon delivery of the receiving apparatus from a factory so as to function in a predetermined time band.

Figure 43:
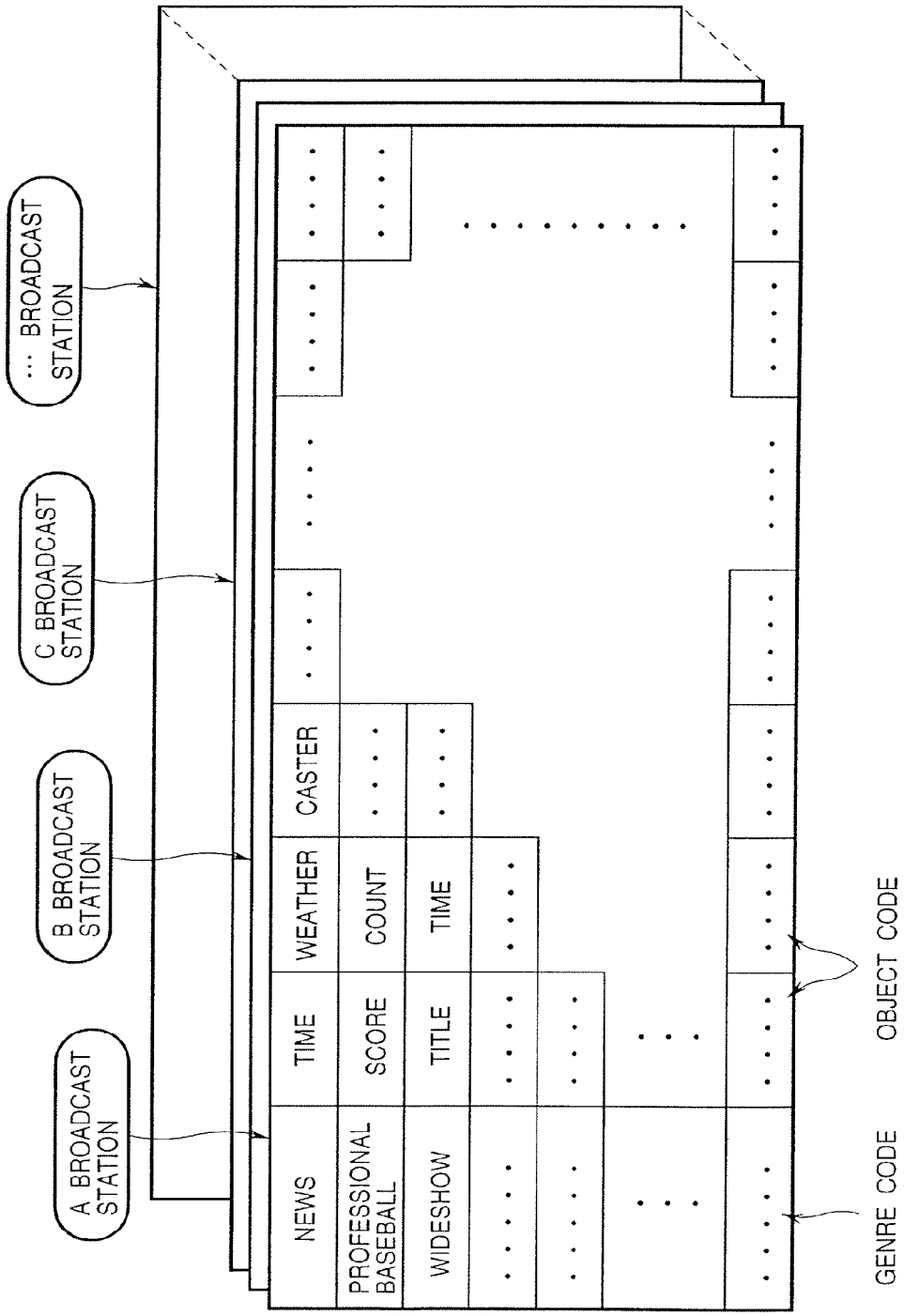
FIG. 43 shows the concept of the code format of object information.

Object information and layout setting data will be described in detail below with reference to FIGS. 43 and 44. FIG. 43 shows the detailed code configuration of object information in units of broadcast stations. FIG. 44 shows the structure of layout setting data.

The detailed configuration of object information that has been explained using FIG. 40 is classified, as shown in, e.g., FIG. 43. As shown in FIG. 43, genre codes are classified into, e.g., "news", "professional baseball", "wideshow", and the like. When the genre code is, e.g., "news", object codes are classified into "time indication object", "weather forecast object", "newscaster image object", and the like. When the genre code is "professional baseball" or "wideshow", object codes shown in FIG. 43 are stored. Such detailed configurations of object information are present in units of broadcast stations. Code lists for various objects that represent the configuration of object information are prepared in advance using codes in units of broadcast stations or those common to the respective stations. In addition, the broadcast stations and receiving apparatuses on the viewer side are set to be able to understand identical codes.

Also, the layout setting data may have both "default setting modes" and "user setting modes", as shown in FIG. 44.

The default setting modes include a "good morning" mode (functions: displaying time indication in enlarged scale, increasing sound volume, and the like) for mornings, "good night" mode (functions: setting a relatively low sound volume, and the like) for nights, a "go out out" mode (functions: displaying time indication and weather forecast in enlarged scale, and the like) for weekday mornings, a "holiday" mode (functions: clear time indication, and the like) for weekend mornings, and the like in correspondence with the days of week and time bands. Object information indicating an object for which the layout is to be changed, default position data, control data of the respective units, broadcast station data, and the like are saved as necessary data in units of default setting modes.

In each user setting mode, the user sets a layout by the aforementioned setting method in units of arbitrary time bands or days of the week, and saves object information indicating an object for which the layout is to be changed, set position data, control data of the respective units, broadcast station data, and the like as layout setting data. In FIG. 44, user setting modes are set in time bands, i.e., user setup 1 "19:00 to 21:00 on Monday", user setup 2 "21:00 to 22:00 on Wednesday", user setup 3 "12:00 to 13:00 on Monday, Wednesday, and Friday", and user setup 4 "7:30 to 8:30 everyday". In the user setting modes, arbitrary layouts can be set for various image objects such as a person, telop, and the like, and a sound object. Using broadcast station data, the system can be activated using a given broadcast station as a designation condition.

[Operation Sequence]

Figure 45:
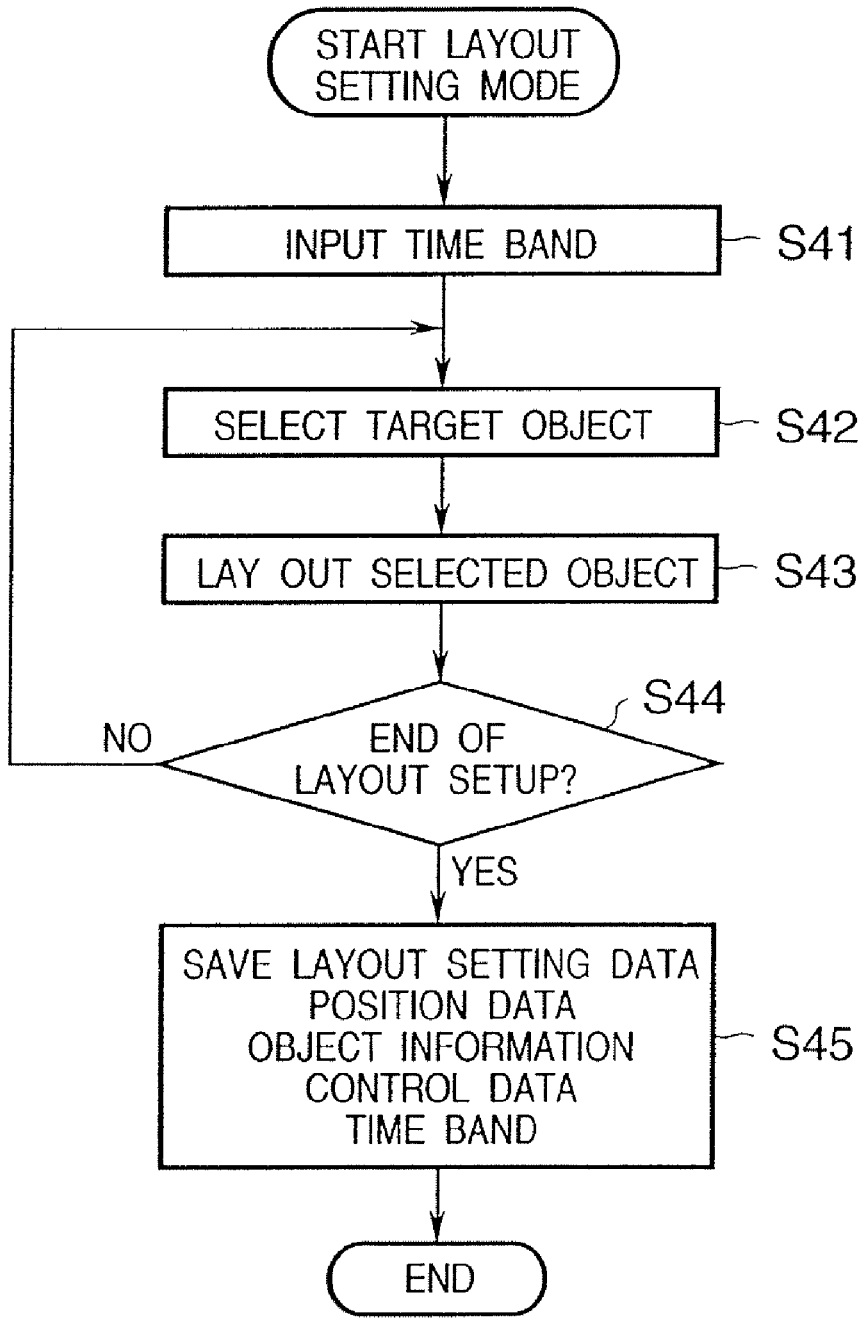
FIGS. 45 and 46 are flow charts for explaining the operation sequence of the TV broadcast receiving apparatus of the fifth embodiment.
Figure 46:
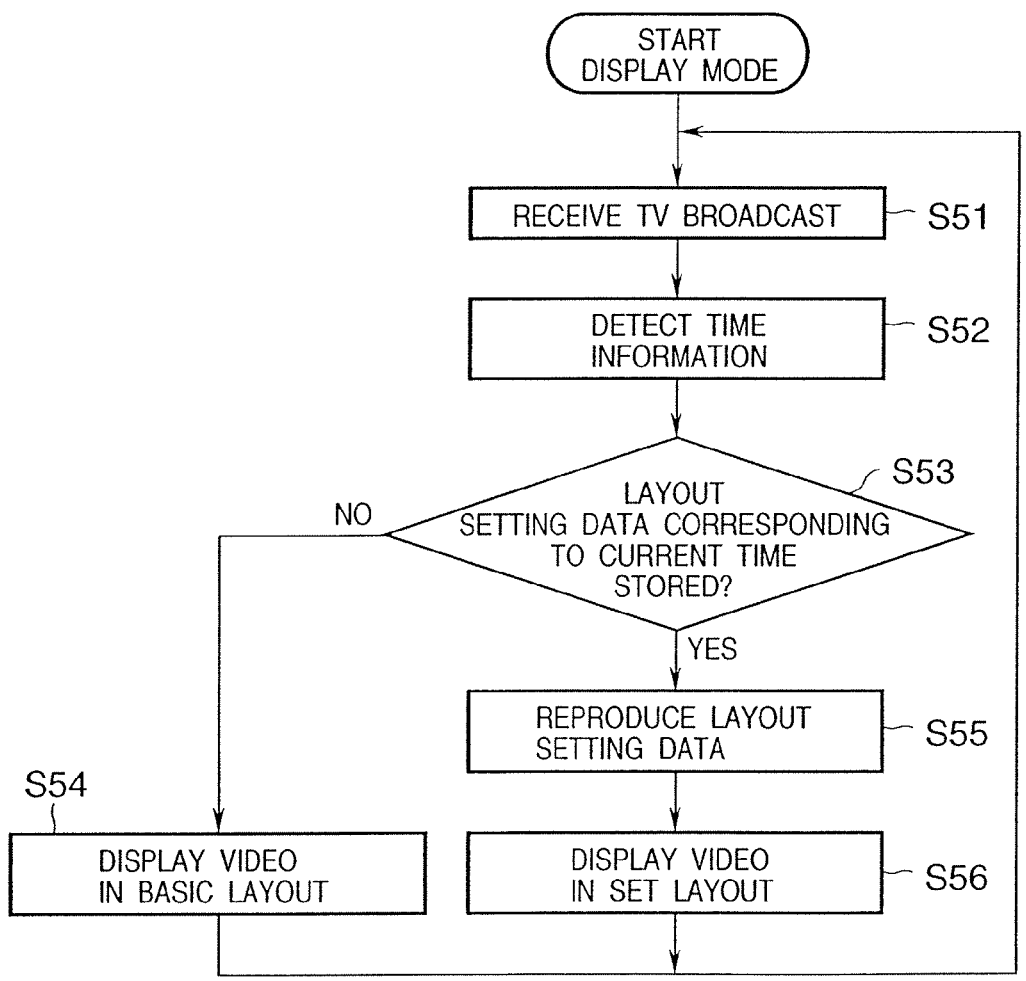

FIGS. 45 and 46 are flow charts for explaining the operation sequence of the TV broadcast receiving apparatus of this embodiment. FIG. 45 shows the flow upon setting a layout by the user, and FIG. 46 shows the flow upon displaying TV video data.

In the layout setting mode shown in FIG. 45, a time band in which the layout is to be changed is input (step S41). The user sets the time band by inputting one or a plurality of combinations of setups such as in units of days of the week, in units of dates, start to end times, and the like using units such as year, month, day of the week, date, time, minute, and the like. Furthermore, the user can input periods such as every week, every other week, a certain number of days, and the like.

Subsequently, the user selects an object for which the layout is to be changed from objects that form image data in TV information (step S42). The user lays out the selected (designated) object at an arbitrary position (step S43). At this time, display ON/OFF of the object is simultaneously set. Upon completion of setting of the selected object, it is checked if layout setups ar to end (step S44). In a layout is to be set for another object, the flow returns to step S42 to repeat selection and layout of an object. Upon completion of layout setups, the positions of the objects for which the layout has been set are converted into data. Then, object information, position data, and control data for the respective units of each object are combined, and are stored in the memory 41 as layout setting data in correspondence with the input time band (step S45). Note that broadcast station (channel) data may be appended as layout setting data.

In the display mode shown in FIG. 46, TV information is received (step S51), and time information indicating the current time is detected (step S52). The time information is acquired and detected from the calendar (timepiece) function unit 47 in the receiving apparatus or TV broadcast system data.

It is then checked based on the detected time information if layout setting data corresponding to the current time as a command has already been stored in the memory 41 (step S53). If no layout setting data corresponding to the current time is stored, video data of TV broadcast is displayed in a basic layout sent from the broadcast station (step S54).

If layout setting data corresponding to the current time is stored, that layout setting data is read out from the memory 41 (step S55), and the system controller stands by to start control for changing the layout of the object to be processed when object information recorded in that layout setting data appears. That is, in step S56, objects other than those for which the layout is to be changed are displayed in the basic layout, and a given object for which the layout is to be changed is displayed in the set layout at the display timing (scene) of that object.

The display state in step S54 or S56 is maintained until the program comes to an end or the user selects another channel to start reception of a new program. When reception of a new program is started, the current layout is reset, and the flow repeats itself from the initial state of TV broadcast reception in step S51.

As described above, according to the fifth embodiment, TV frame display in a display layout which gives priority to arbitrary information can be made in correspondence with the day of the week or time band. Hence, video display according to user's favor can be achieved, the quality of the audiovisual user interface can be improved, and more flexible TV program display can be presented to the user by easy operations.

Sixth Embodiment

A TV broadcast receiving apparatus according to the sixth embodiment of the present invention will be described below. Note that the same reference numerals in the sixth embodiment denote the same parts as those in the first to fifth embodiments, and a detailed description thereof will be omitted.

The sixth embodiment will explain layout setups of objects in TV broadcast that uses an image encoded by a coding scheme other than MPEG 4, e.g., an MPEG 2 image, as one MPEG 4 object instead, as in the second embodiment.

A case will be exemplified below using FIGS. 41 and 42 wherein video display of MPEG 4 TV broadcast including an MPEG 2 image is made using the layout setting method described in the fifth embodiment. In the sixth embodiment, assume that a relay image object displayed on a region 415 is an MPEG 2 image as an example of a photo image object handled in a news program shown in FIG. 41 or 42. Other objects are MPEG 4 data. That is, FIGS. 41 and 42 show video display examples of MPEG 4 TV broadcast including an MPEG 2 image. FIG. 28 shows an example of an MPEG 4 bitstream at that time.

The MPEG 4 bitstream shown in FIG. 28 is multiplexed as object 2 with data of the relay image 415 as an MPEG 2 datastream. The MPEG 2 datastream normally consists of three types of data, i.e., audio data, video data, and system data (MPEG 2 additional information). In object 2, the MPEG 2 datastream segments each having a predetermined size are multiplexed in accordance with predetermined timing adjustment that pertains to transmission. Since some MPEG 4 encoding/decoding circuits have downward compatibility to MPEG 2, common circuits are used if necessary so as to avoid wasteful use of resources that pertain to encoding/decoding.

In this manner, a layout can be set even for MPEG 4 TV broadcast containing image data and/or sound data encoded by MPEG 2, as has been described in the fifth embodiment.

As for layout setting data of a display image, as in the fifth embodiment, position data of an object for which the layout has been changed by the user is calculated on the basis of object layout information obtained from scene description information, and is stored as layout setting data in correspondence with the time band, object information to be processed, control data for the respective units, and broadcast station (channel) data if necessary. Also, operations that pertain to display are the same as the fifth embodiment.

In case of a system using both MPEG 2 and MPEG 4, time information may be acquired based on the time stamp inserted in MPEG 2 system data.

As described above, according to the sixth embodiment, in addition to the effects of the fifth embodiment, since TV information encoded by MPEG 2 can be used in the MPEG 4 TV system, existing contents can be directly used, and MPEG 2 data need not be converted into MPEG 4 data, thus providing a very effective system which is easy to use Modifications In the sixth embodiment described above, a datastream multiplexed with MPEG 2 data as one MPEG 4 object is received. Furthermore, the present invention can be applied even when various kinds of information that pertain to layout setups are included as additional data in MPEG 2 system data, and substantially the same effects as those obtained by an MPEG 4 bitstream can be obtained.

A method of multiplexing an MPEG 4 datastream on an MPEG 2 datastream as TV information will be explained below.

Figure 47:
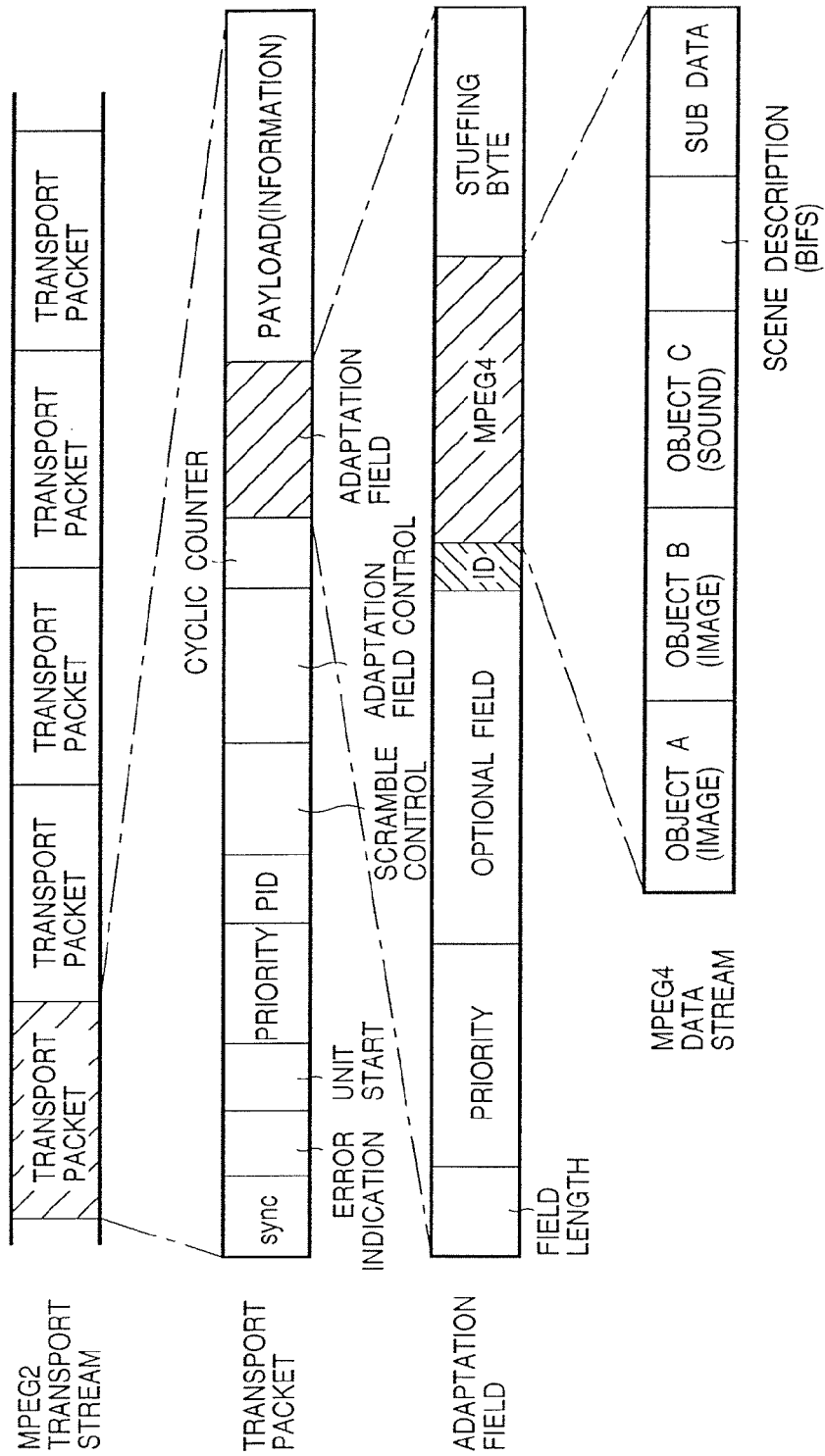
FIG. 47 is a view for explaining a method of multiplexing an MPEG 4 datastream on an MPEG 2 datastream.

The general MPEG 4 datastream format is as shown in FIG. 40 above. FIG. 47 shows the MPEG 2 transport stream structure, i.e., the transmission format of an MPEG 2 datastream. A method of multiplexing an MPEG 4 datastream on an MPEG 2 datastream will be explained below using FIG. 47.

An MPEG 2 transport stream is obtained by multiplexing into transport packets each having a fixed length. The data structure of each transport packet is hierarchically expressed, as shown in FIG. 47, and includes items shown in FIG. 47. These items will be explained in turn below.

That is, each transport packet includes an 8-bit "sync signal (sync)", an "error indicator" indicating the presence/absence of any bit error in a packet, "unit start" indicating that a new unit starts from the payload of this packet, "priority (packet priority)" indicating the importance level of this packet, "PID (packet Identification)" indicating an attribute of an individual stream, "scramble control" indicating the presence/absence and type of scramble, "adaptation field control" indicating the presence/absence of an adaptation field and the presence/absence of a payload in this packet, a "cyclic counter" as information for detecting whether some packets having identical PID are discarded in the middle of transmission, an "adaptation field" that can store additional information or stuffing byte as an option, and a payload (image or sound information).

The adaptation field consists of a field length, various items pertaining to other individual streams, an optional field, and stuffing byte (invalid data byte).

For example, an MPEG 4 datastream as sub image or sound data of TV information, and an ID for identifying that datastream are considered as ones of additional data in the optional field, and are multiplexed in the optional field. That is, main TV information is an MPEG 2 datastream (transport stream). As exemplified in FIG. 47, an MPEG 4 datastream is formed by combining image objects (objects A and B) such as a photo image, CG, character, and the like having a small data size, a sound object (object C), scene description information (BIFS), and other necessary data (sub data). By multiplexing this MPEG 4 datastream as a part of the optional field in the MPEG 2 system data, transmission of MPEG 21 MPEG 4 multiplexed datastream can be implemented.

Note that an arbitrary layout can be set for the image objects having a small data size like the aforementioned MPEG 4 objects. The method and operations that pertain to layout setups are the same as those in the aforementioned embodiments. An MPEG 2 time stamp may be used as time information upon layout setups.

Information for setting a layout for an image generated by character generation means in the receiving apparatus can also be multiplexed in MPEG 2 system data.

In this manner, the present invention can be applied not only to MPEG 4 TV broadcast but also to MPEG 2 and various other digital TV broadcast systems. Also, an MPEG 4 bitstream can be used in an MPEG 2 TV broadcast system. Hence, an existing TV broadcast system can be utilized.

As many apparently widely different embodiments of the present invention can be made without departing from the spirit and scope thereof, it is to be understood that the invention is not limited to the specific embodiments thereof except as defined in the appended claims.

What is claimed is:

1. A video program receiving apparatus comprising:
   a receiver, arranged to receive a digital data sequence related to a video program,
   wherein the digital data sequence is in a television broadcast, which broadcasts image data and sound data encoded by a predetermined encoding method for encoding the image data and the sound data, respectively, as an object;
   a decoder, arranged to decode image data and system data from the received digital data sequence, and to reproduce the decoded image including an image object according to the decoded system data;
   a layout setting section, arranged to perform a layout setting mode in response to a user instruction, and to change a reproduction pattern of the image object according to a user operation inputted in the layout setting mode by modifying scene description information contained in the decoded system data;
   a storage section, arranged to store, in a memory, layout setting data regarding the scene description information modified for the image object of which the reproduction pattern is changed in the layout setting mode, wherein the layout setting data contains object information to discriminate the image object and category information indicating a category of the video program which uses the image object; and
   a setting section, arranged to discriminate the image object included in the decoded image data according to the layout setting data stored in the memory, and to set the reproduction pattern of the discriminated image object according to the layout setting data, in a case that the video program, whose category is already stored in the memory as the layout setting data, is received.

2. The apparatus according to claim 1, wherein the image data and sound data are encoded by MPEG 4.

3. The apparatus according to claim 1, wherein the setting section obtains, from the decoded system data, the category information indicating the category of the video program.

4. The apparatus according to claim 1, further comprising: an operating section arranged to allow a user to (a) manually select a predetermined image object included in the decoded image data, and (b) manually move and/or manually resize the selected image object.

5. A method of receiving a video program, the method using a processor to perform the steps of:
receiving a digital data sequence related to a video program,
wherein the digital data sequence is in a television broadcast, which broadcasts image data and sound data encoded by a predetermined encoding method for encoding the image data and the sound data, respectively, as an object;
decoding image data and system data from the received digital data sequence;
reproducing the decoded image including an image object according to the decoded system data;
performing a layout setting mode in response to a user instruction;
changing a reproduction pattern of the image object according to a user operation inputted in the layout setting mode by modifying scene description information contained in the decoded system data;
storing, in a memory, layout setting data regarding the scene description information modified for the image object of which the reproduction pattern is changed in the layout setting mode, wherein the layout setting data contains object information to discriminate the image object, and category information indicating a category of the video program which uses the image object;
discriminating the image object included in the decoded image data according to the layout setting data stored in the memory; and
setting the reproduction pattern of the discriminated image object according to the layout setting data, in a case that the video program, whose category is already stored in the memory as the layout setting data, is received.

6. The method according to claim 5, wherein the image data and sound data are encoded by MPEG 4.

7. The method according to claim 5, wherein in the setting step, the category information indicating the category of the video program is obtained from the decoded system data.

8. The method according to claim 5, further comprising the steps of:

manually selecting, by a user, of a predetermined image object included in the decoded image; and
manually moving, by the user, and/or manually resizing, by the user, of the selected image object.

9. A non-transitory computer readable medium storing a computer-executable program for causing a computer to perform a method of receiving a video program, the method comprising the steps of:
receiving a digital data sequence related to a video program,
wherein the digital data sequence is in a television broadcast, which broadcasts image data and sound data encoded by a predetermined encoding method for encoding the image data and the sound data, respectively, as an object;
decoding image data and system data from the received digital data sequence;
reproducing the decoded image including an image object according to the decoded system data;
performing a layout setting mode in response to a user instruction;
changing a reproduction pattern of the image object according to a user operation inputted in the layout setting mode by modifying scene description information contained in the decoded system data;
storing, in a memory, layout setting data regarding the modified scene description information for the image object of which the reproduction pattern is changed in the layout setting mode, wherein the layout setting data contains object information to discriminate the image object, and category information indicating a category of the video program which uses the image object;
discriminating the image object included in the decoded image data according to the layout setting data stored in the memory; and
setting the reproduction pattern of the discriminated image object according to the layout setting data, in a case that the video program, whose category is already stored in the memory as the layout setting data, is received.

* * * * *